United States Patent
Abbaspourrad et al.

(10) Patent No.: US 12,484,605 B2
(45) Date of Patent: Dec. 2, 2025

(54) THICKENERS AND NUTRITIONAL PRODUCTS TO PROMOTE SAFE SWALLOWING FOR INDIVIDUALS WITH DYSPHAGIA AND METHODS OF MAKING AND USING SAME

(71) Applicant: SOCIETE DES PRODUITS NESTLE S.A., Vevey (CH)

(72) Inventors: Alireza Abbaspourrad, Ithaca, NY (US); Javad Amani, Ithaca, NY (US); Michael Jedwab, Lausanne (CH); Nancy Stevenson, Linwood, NJ (US)

(73) Assignee: Societe des Produits Nestle S.A., Vevey (CH)

( * ) Notice: Subject to any disclaimer, the term of this patent is extended or adjusted under 35 U.S.C. 154(b) by 898 days.

(21) Appl. No.: 17/753,150

(22) PCT Filed: Aug. 21, 2020

(86) PCT No.: PCT/EP2020/073570
§ 371 (c)(1),
(2) Date: Feb. 22, 2022

(87) PCT Pub. No.: WO2021/037767
PCT Pub. Date: Mar. 4, 2021

(65) Prior Publication Data
US 2022/0279828 A1  Sep. 8, 2022

Related U.S. Application Data

(60) Provisional application No. 63/068,173, filed on Aug. 20, 2020, provisional application No. 62/890,878, filed on Aug. 23, 2019.

(51) Int. Cl.
| | | |
|---|---|---|
| A23L 29/269 | (2016.01) |
| A23L 2/52 | (2006.01) |
| A23L 29/238 | (2016.01) |
| A23L 29/244 | (2016.01) |
| A23L 29/256 | (2016.01) |
| A23L 29/262 | (2016.01) |
| A23L 33/00 | (2016.01) |
| A23L 33/10 | (2016.01) |
| A61K 31/716 | (2006.01) |
| A61P 1/00 | (2006.01) |

(52) U.S. Cl.
CPC ............... *A23L 29/271* (2016.08); *A23L 2/52* (2013.01); *A23L 29/238* (2016.08); *A23L 29/244* (2016.08); *A23L 29/256* (2016.08); *A23L 29/262* (2016.08); *A23L 33/10* (2016.08); *A23L 33/40* (2016.08); *A61K 31/716* (2013.01); *A61P 1/00* (2018.01); *A23V 2002/00* (2013.01)

(58) Field of Classification Search
None
See application file for complete search history.

(56) References Cited

U.S. PATENT DOCUMENTS

| | | |
|---|---|---|
| 2011/0135568 A1 | 6/2011 | Holahan |
| 2015/0004149 A1 | 1/2015 | Burbidge et al. |
| 2016/0192686 A1 | 7/2016 | Burbidge et al. |

FOREIGN PATENT DOCUMENTS

| | | |
|---|---|---|
| CN | 104125779 A | 10/2014 |
| CN | 106535662 A | 3/2017 |
| JP | 2005534667 A | 11/2005 |
| JP | 2008504039 A | 2/2008 |
| JP | 2019522635 A | 8/2019 |
| WO | 2018224590 | 12/2018 |

OTHER PUBLICATIONS

Berggren, Sofia "Water holding capacity and viscosity of ingredients from oats" Linnaeus University, 2017, retrieved from the Internet: https://www.diva-portal.org/smash/get/diva2:1180722/FULLTEXT01.pdf, 33 pages, XP055749274.

Orejarena, Eva Gisselle Vasquez "Development of a Functional Shelf Stable High Protein Dairy Beverage with Oat-β-glucan" The Ohio State University, 2016, retrieved from the Internet: https://etd.ohiolink.edu/apexprod/rws_olink/r/1501/10?p10_accession_num=osu1468632216, XP055749455, 123 pages.

Japanese Office Action for Appl No. 2022-512402 dated Jul. 2, 2024, 6 pages.

Chinese Office Action for Appl No. 202080059731.7 dated Jul. 15, 2023.

Japense Office Action for Appl No. 2022-512402 dated Sep. 2, 2025, 4 pages.

*Primary Examiner* — Patrick T Lewis
(74) *Attorney, Agent, or Firm* — K&L Gates LLP

(57) ABSTRACT

A thickener is disclosed, as well as a nutritional product including the thickener, uses thereof, methods for the manufacture thereof, methods for improving the cohesiveness of a nutritional product, and related systems. The nutritional products have improved cohesiveness for promoting safer and more efficient swallowing of food boluses for individuals having swallowing difficulties such as dysphagia. In a preferred embodiment, the nutritional product includes a thickener comprising a beta-glucan and an additive. Preferably, the nutritional product has a relaxation time, determined by a Capillary Breakup Extensional Rheometry (CaBER) experiment, of from 10 ms to 2000 ms at a temperature of 20° C.

19 Claims, 78 Drawing Sheets

| Calypso Samples | Molecular Weights | Rheology |
|---|---|---|
| Unseparated UHT | 1,900,774 | Cohesive |
| Unseparated No heat Treatment | 2,091609 | Cohesive |
| Separated No heat Treatment | 1,547,025 | Not Cohesive |
| UHT 718907 | 1,217,630 | Not Cohesive |
| Solid discharge | 1,823,740 | Cohesive |

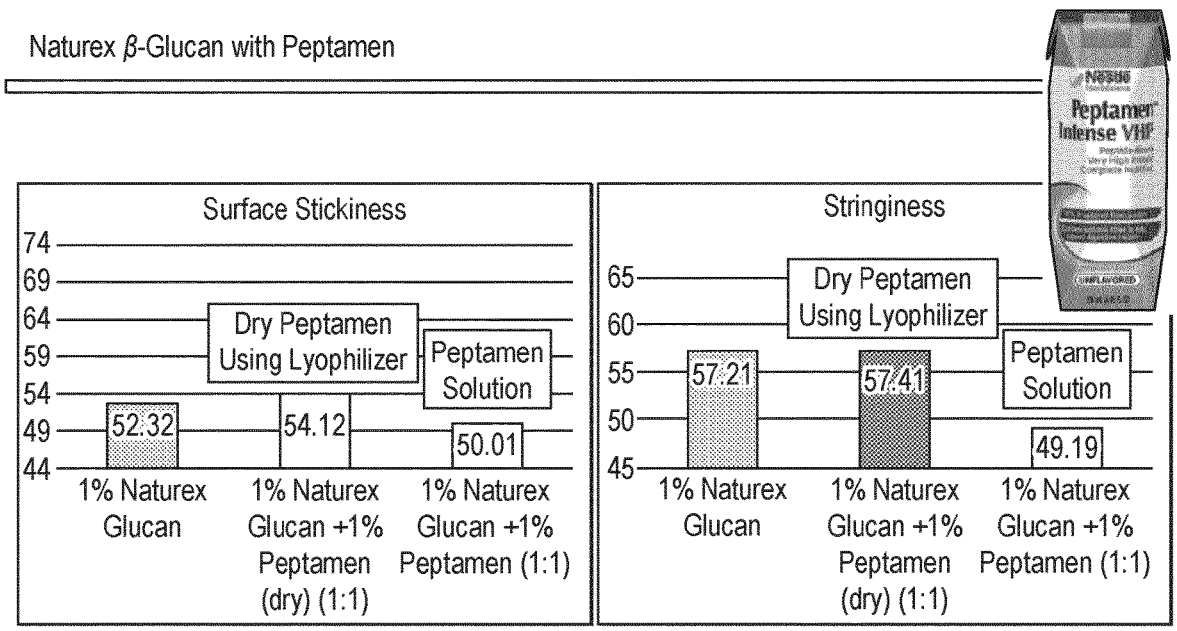
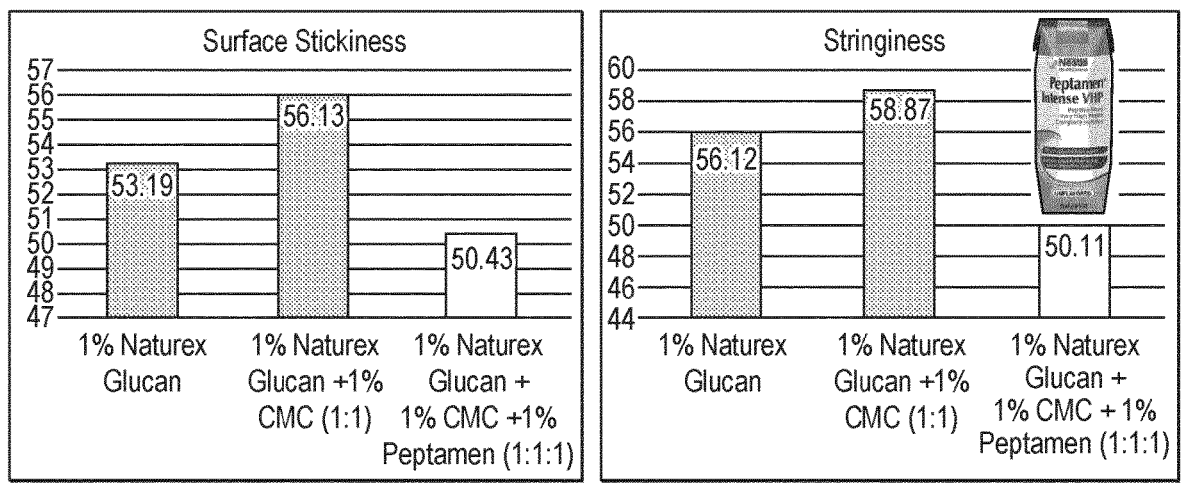
FIG. 2

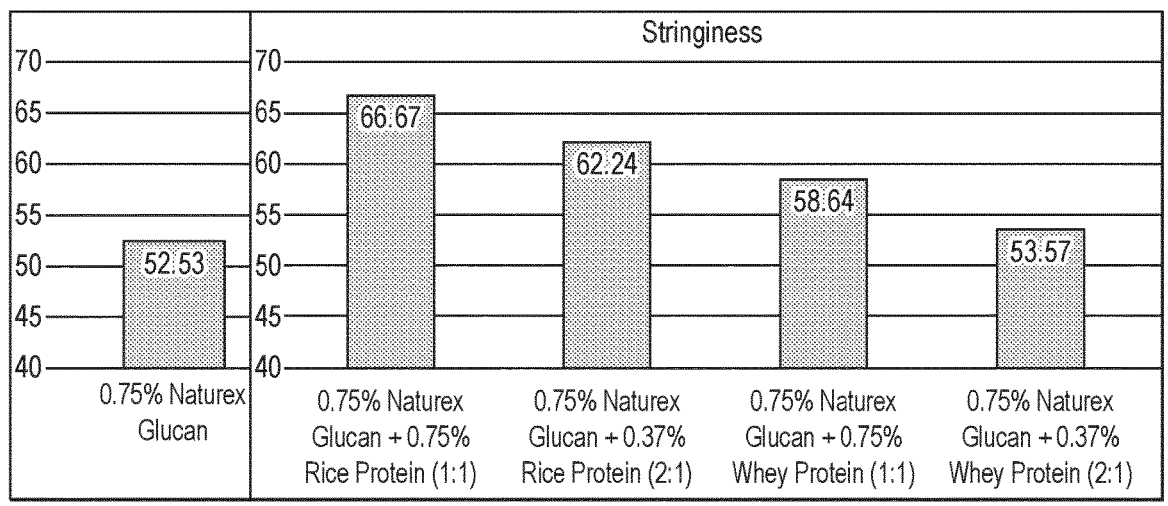
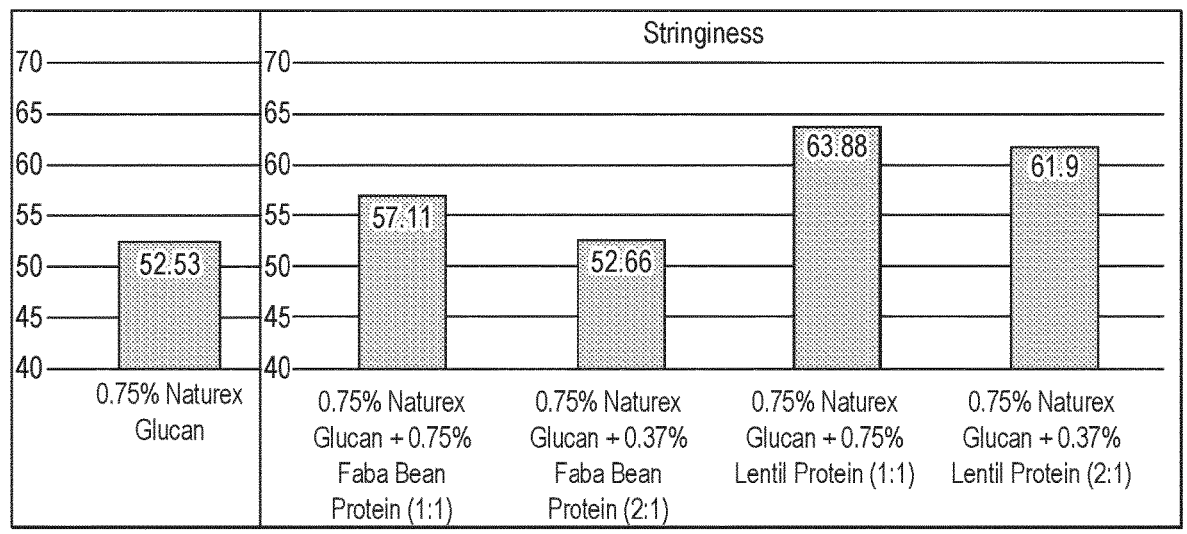
FIG. 2 (Cont.)

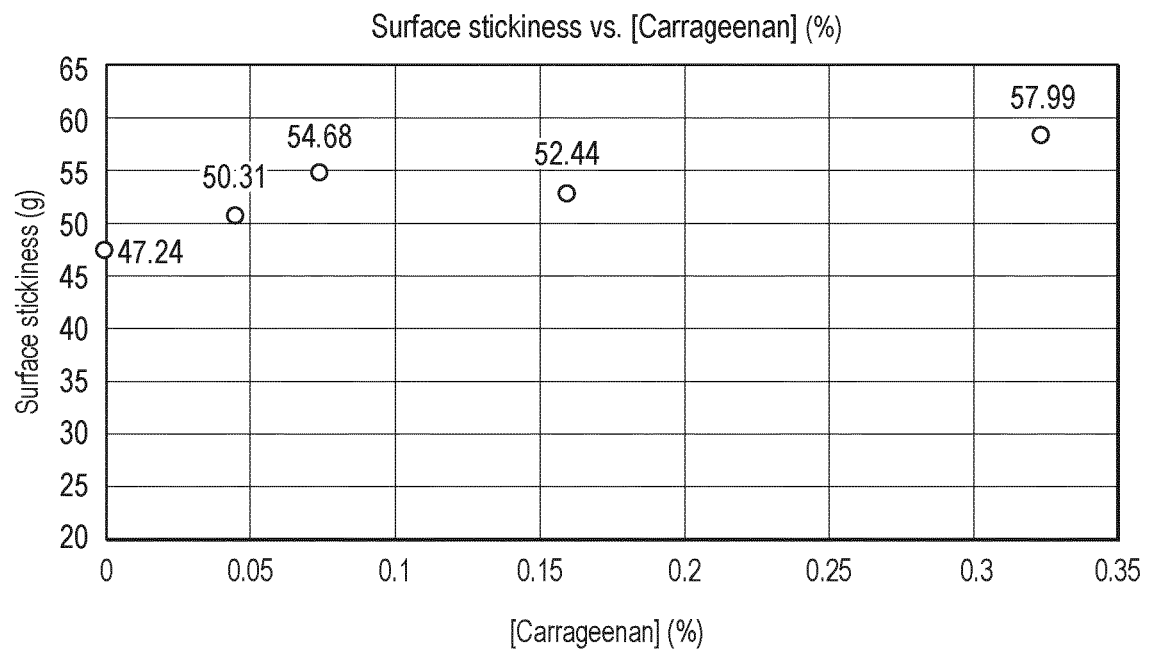
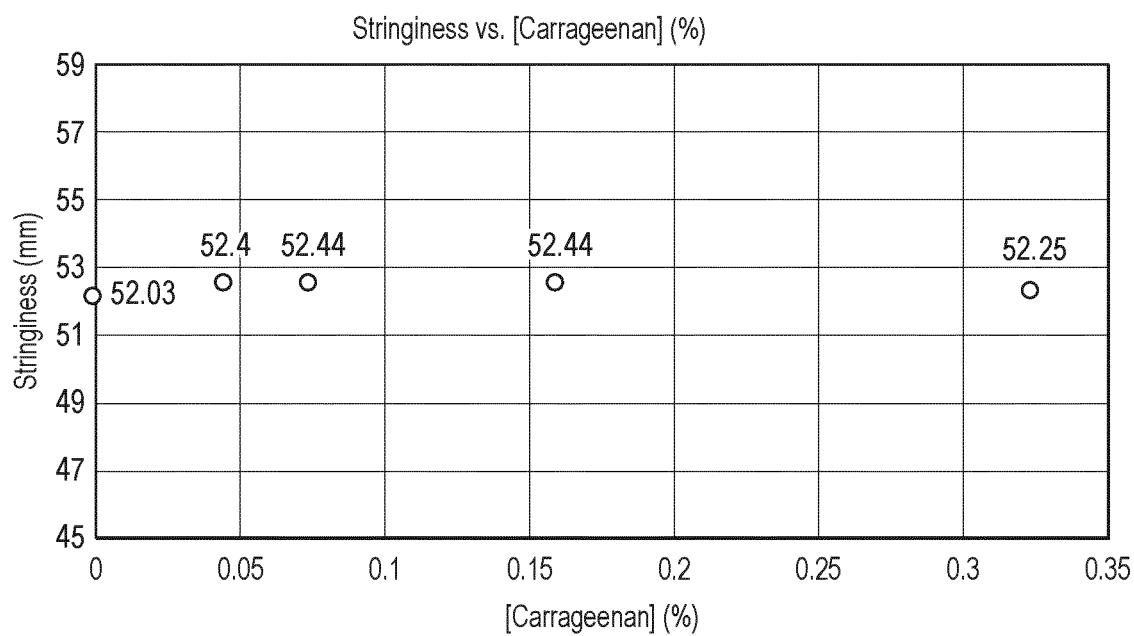
FIG. 3 (Cont.)

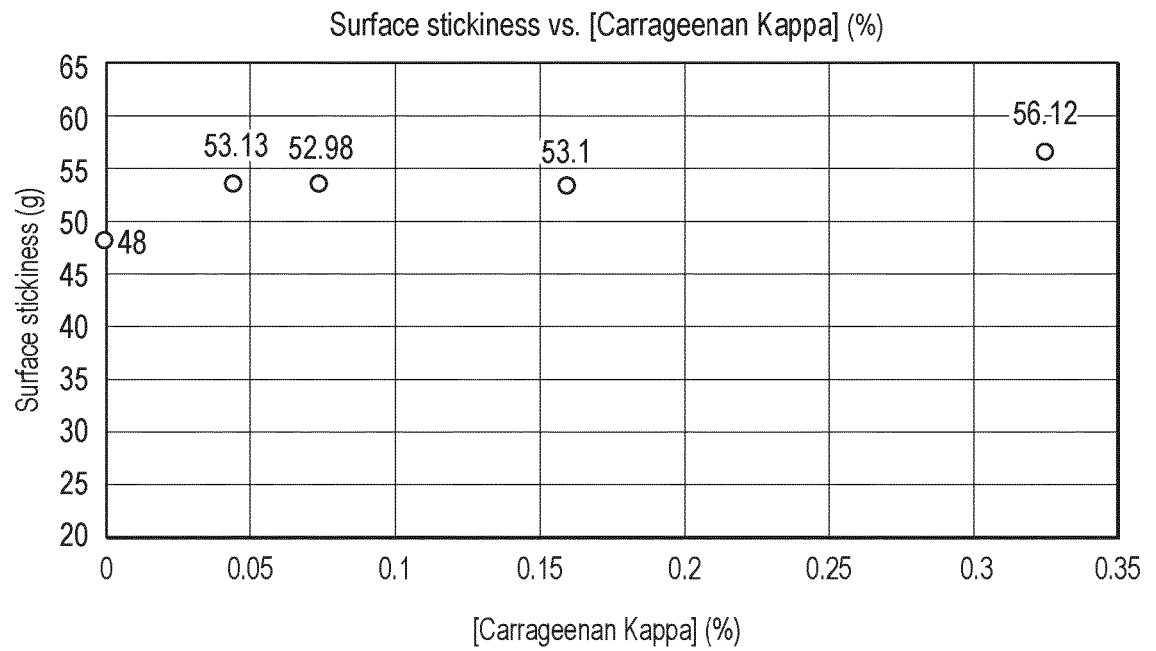
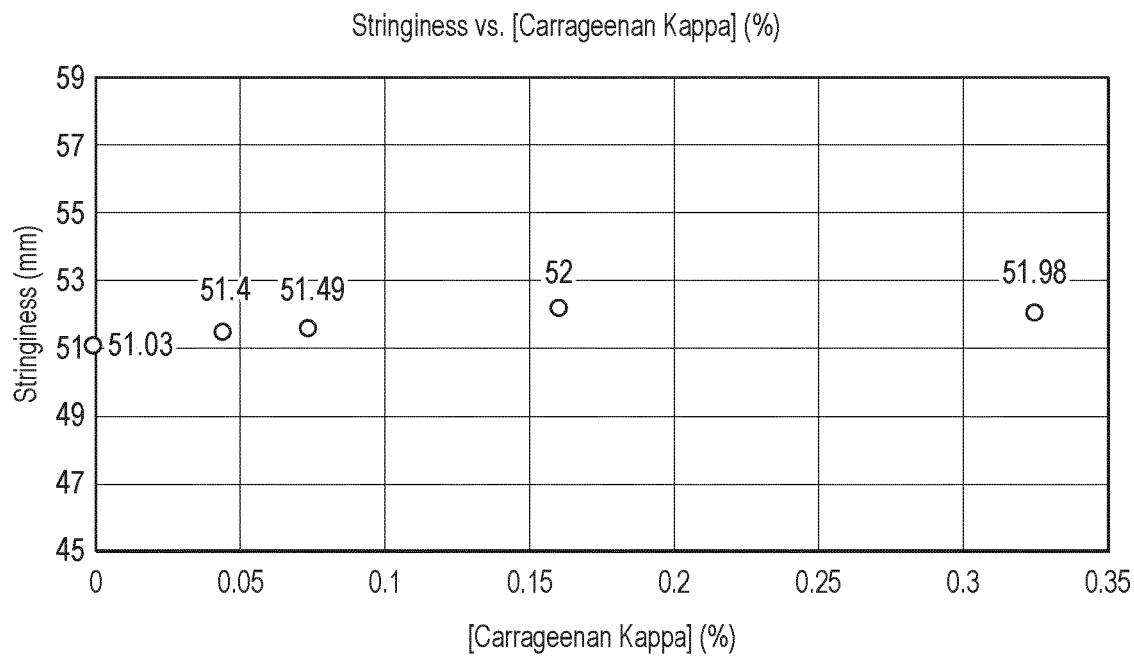
FIG. 3 (Cont.)

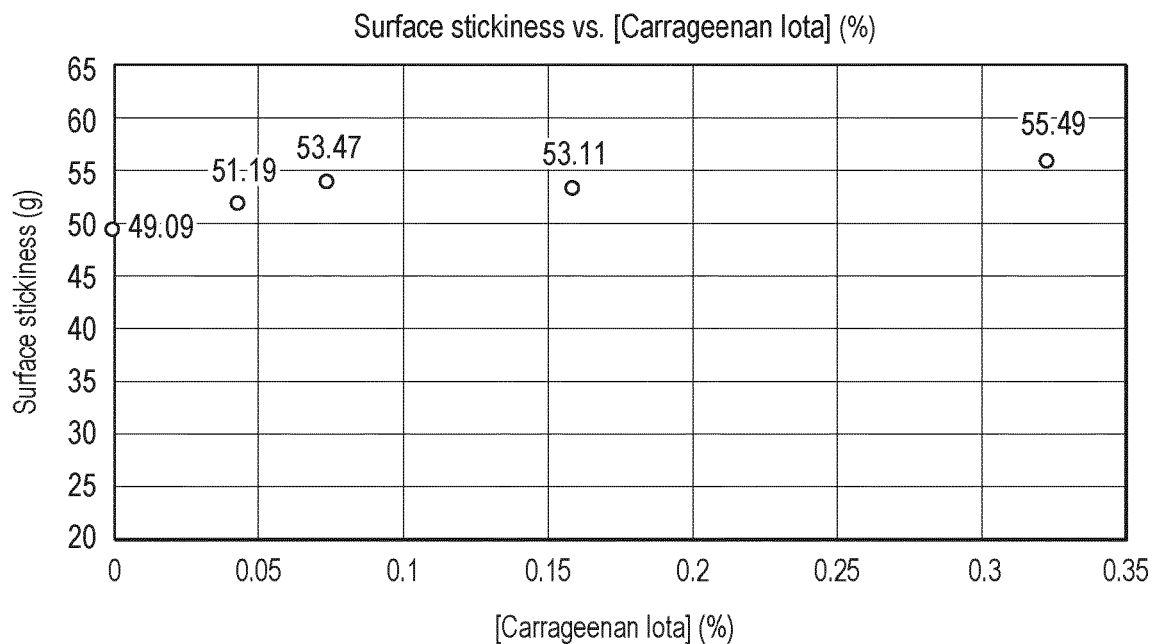
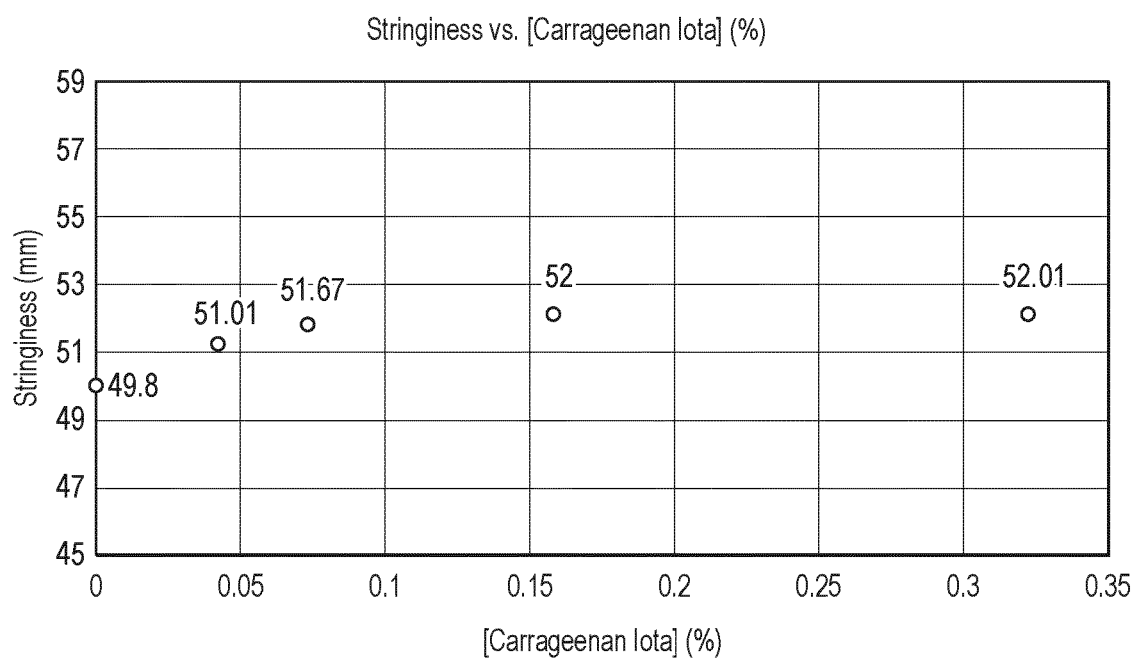
FIG. 3 (Cont.)

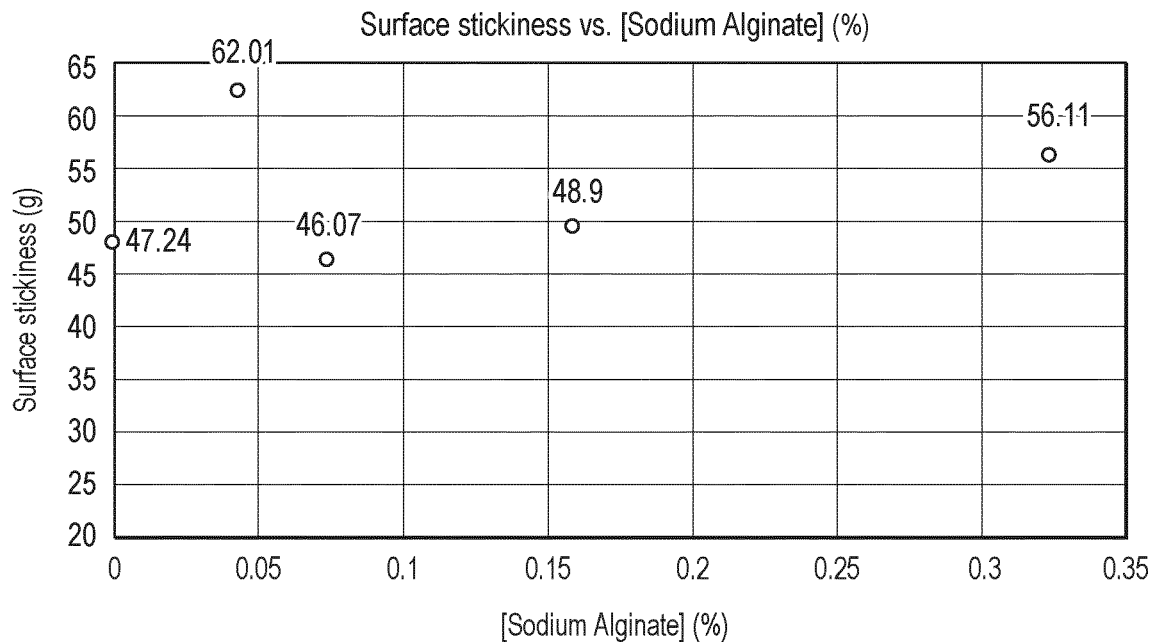
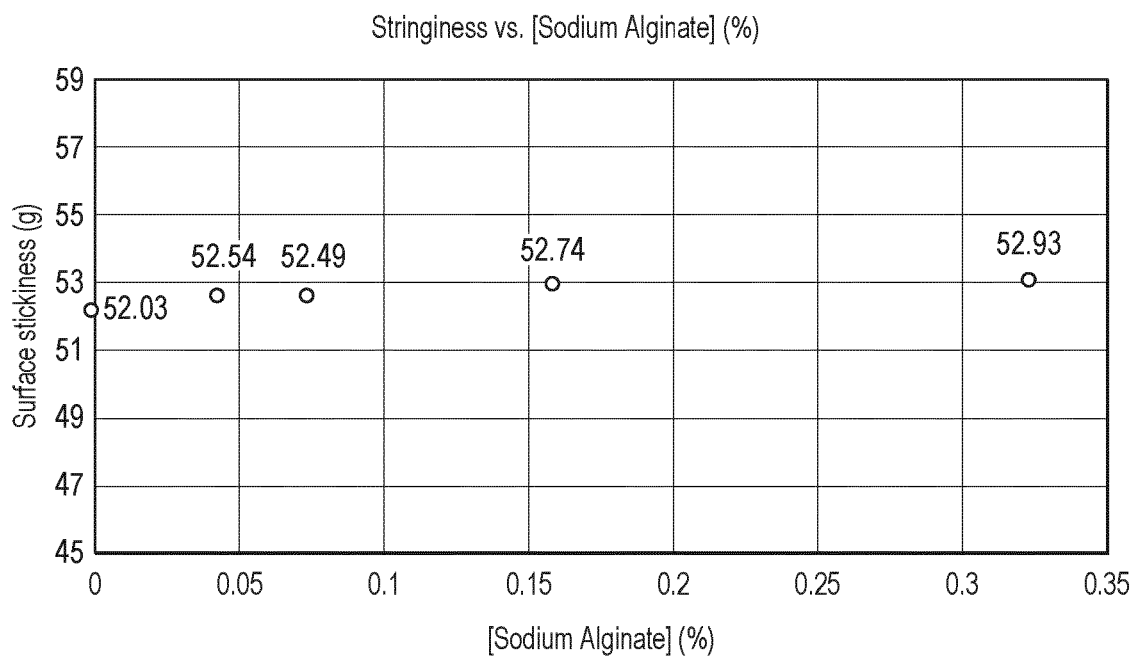
FIG. 3 (Cont.)

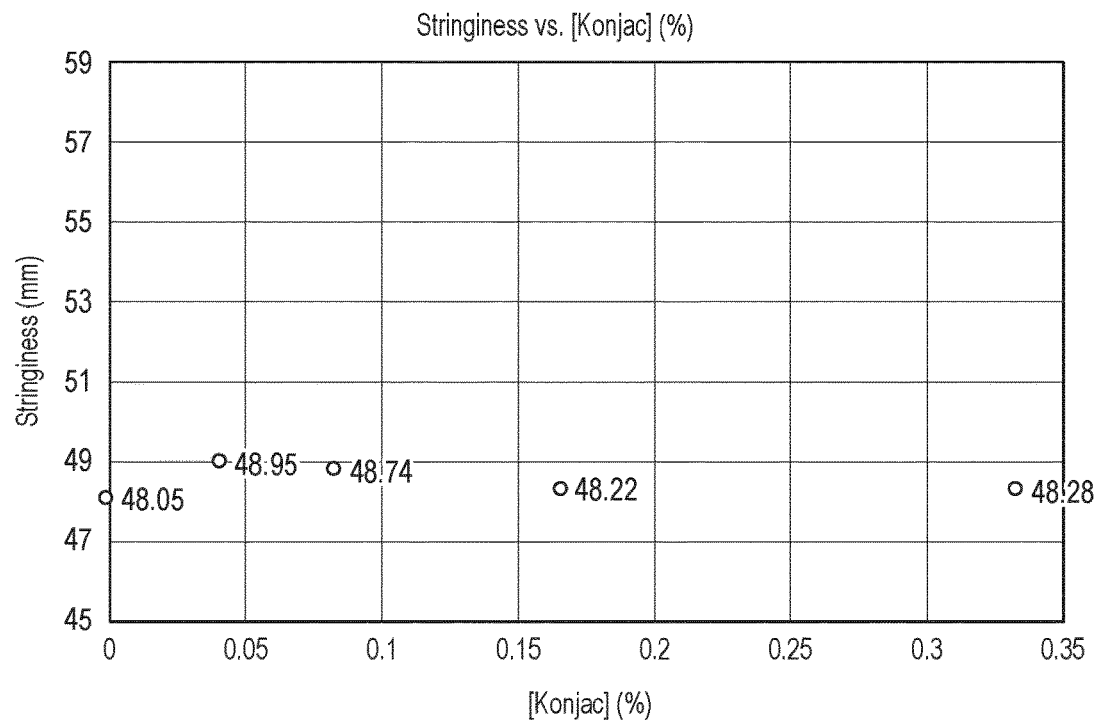
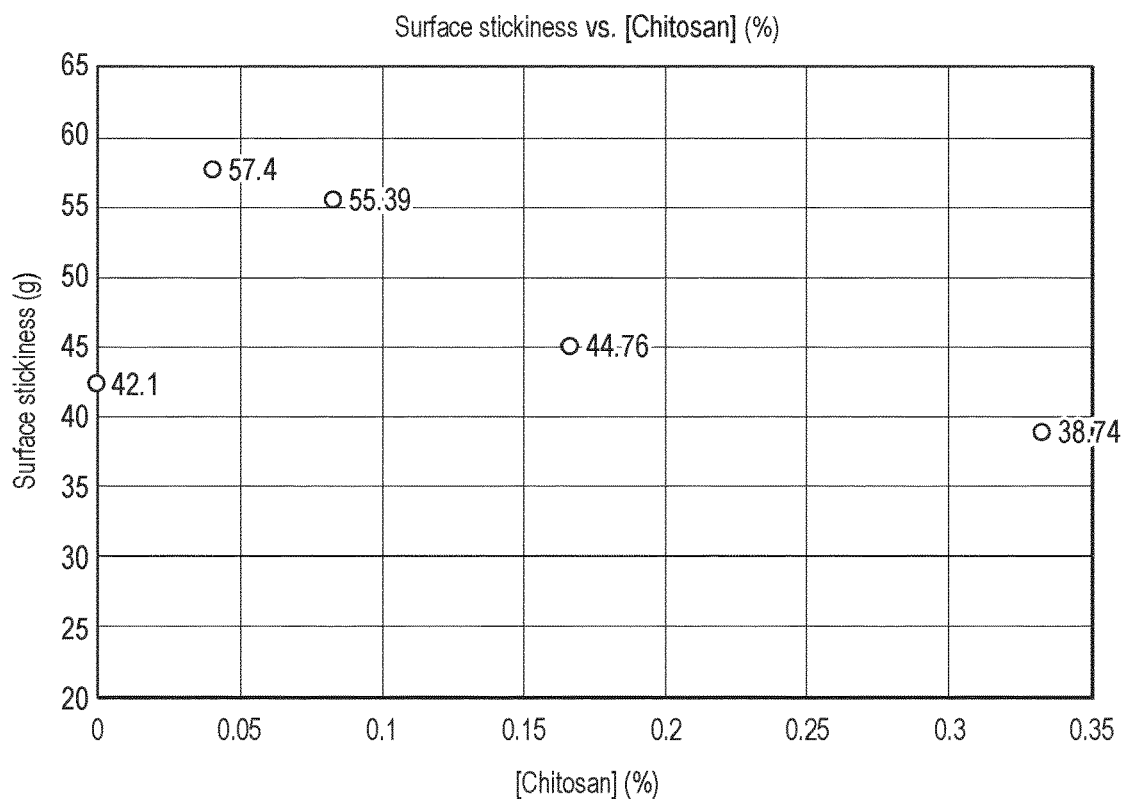
FIG. 3 (Cont.)

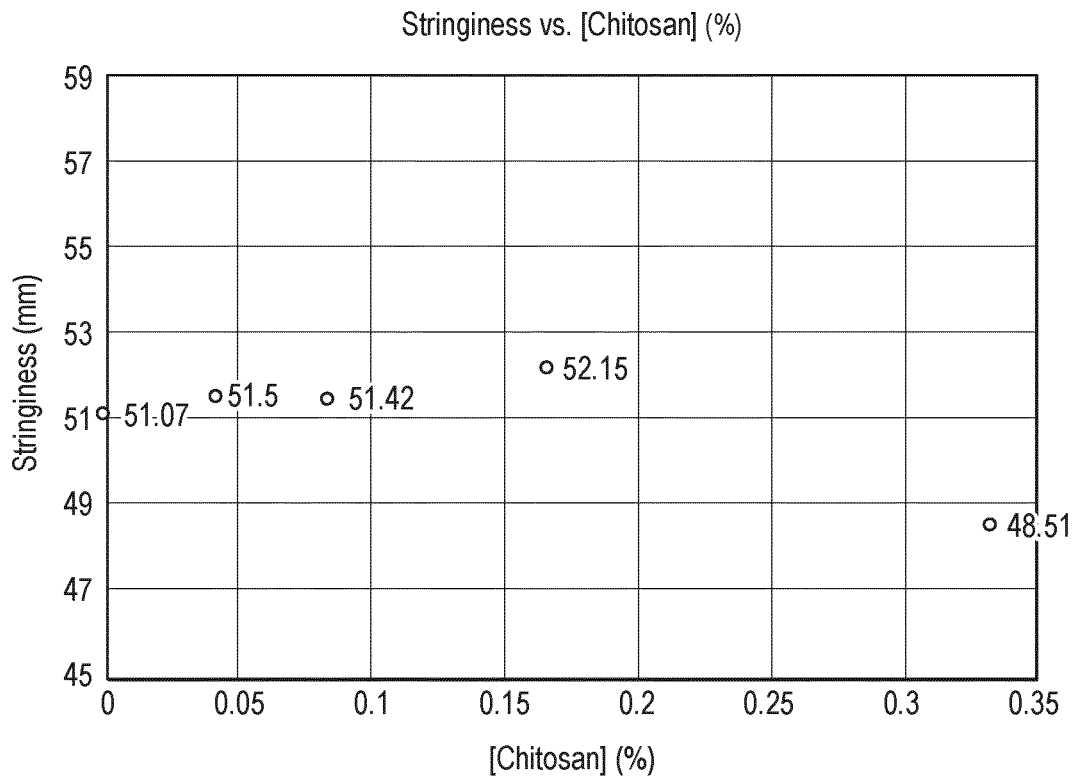
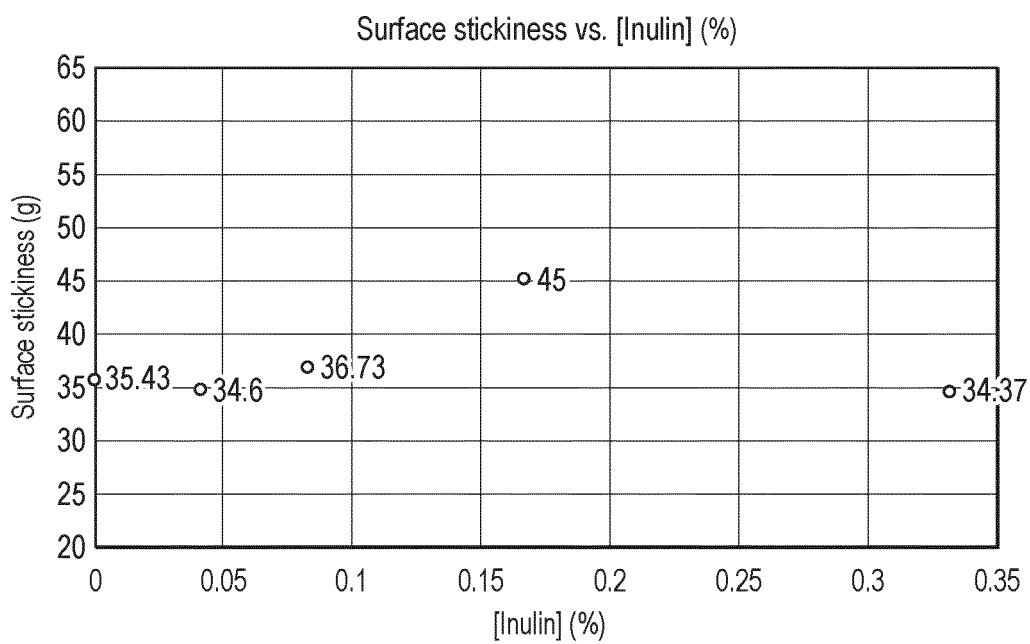
FIG. 3 (Cont.)

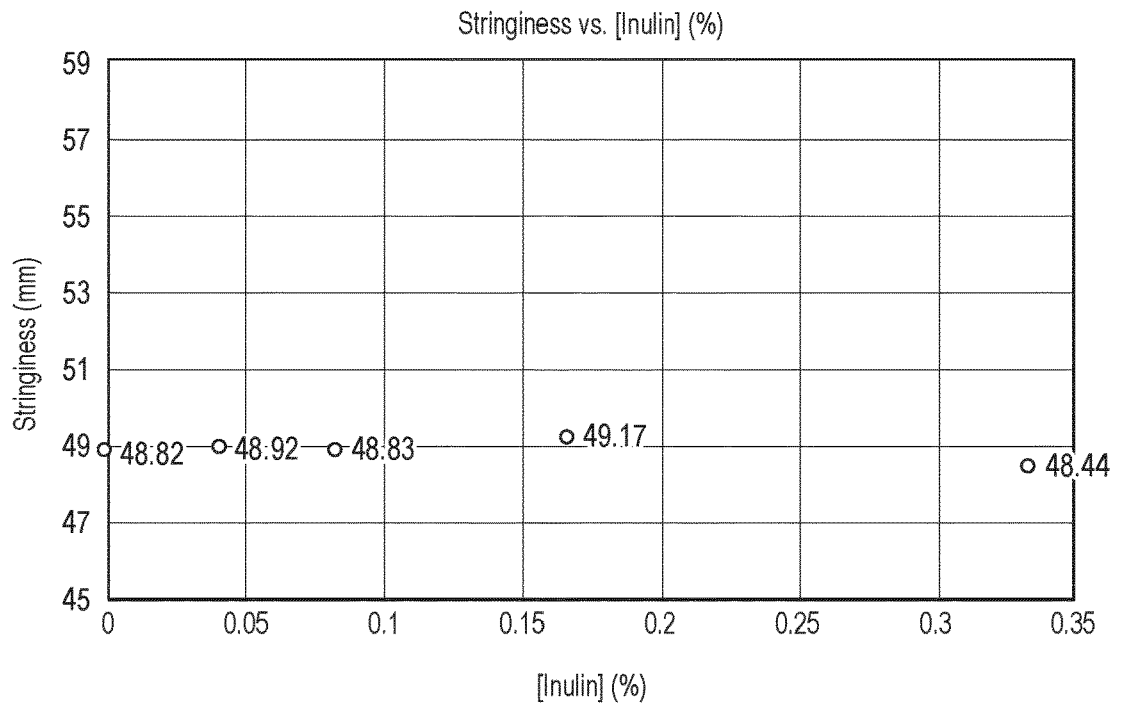
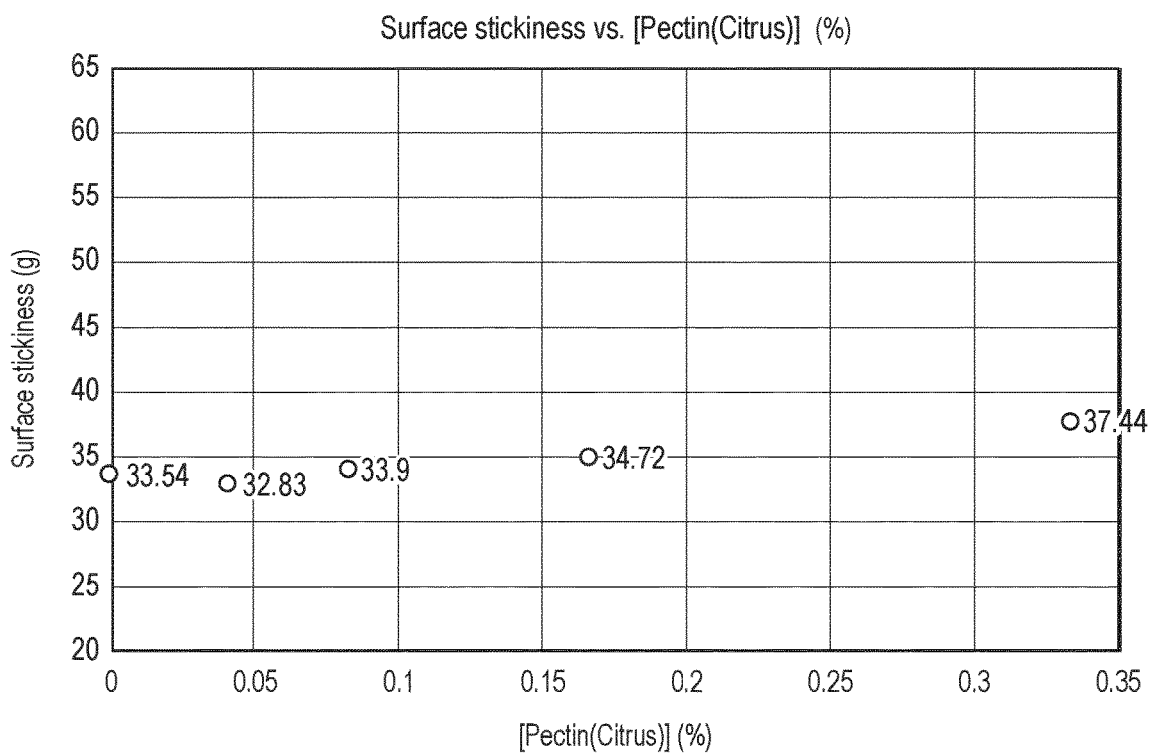
FIG. 3 (Cont.)

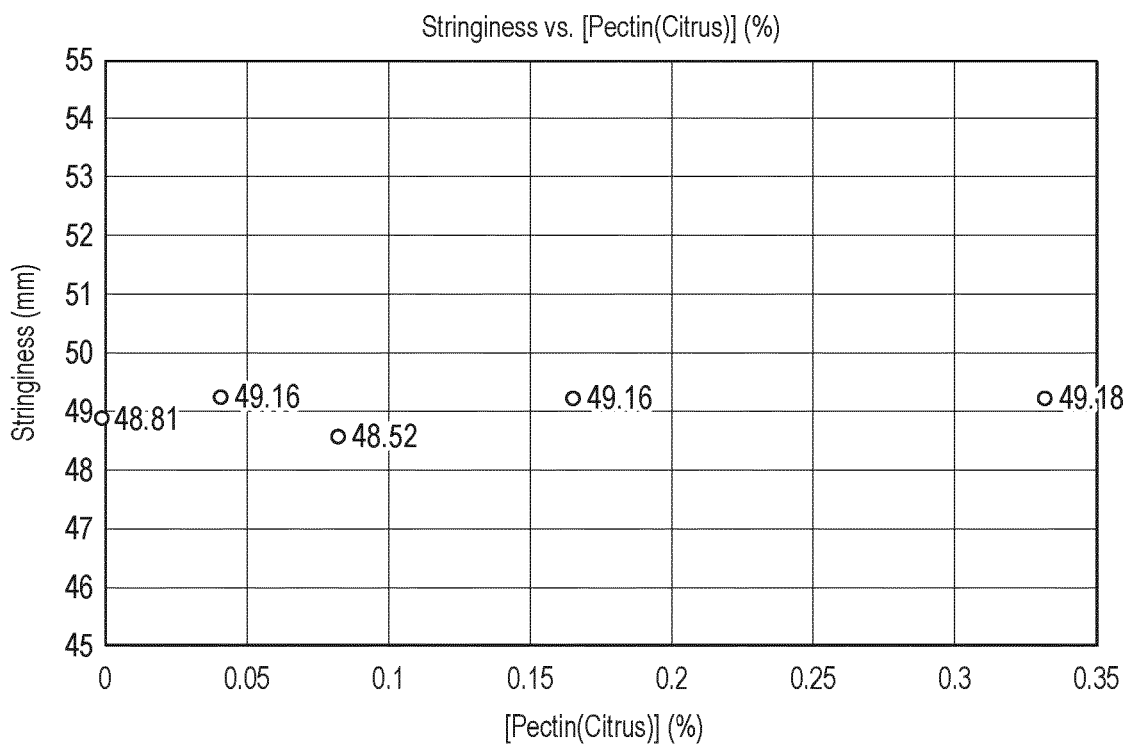
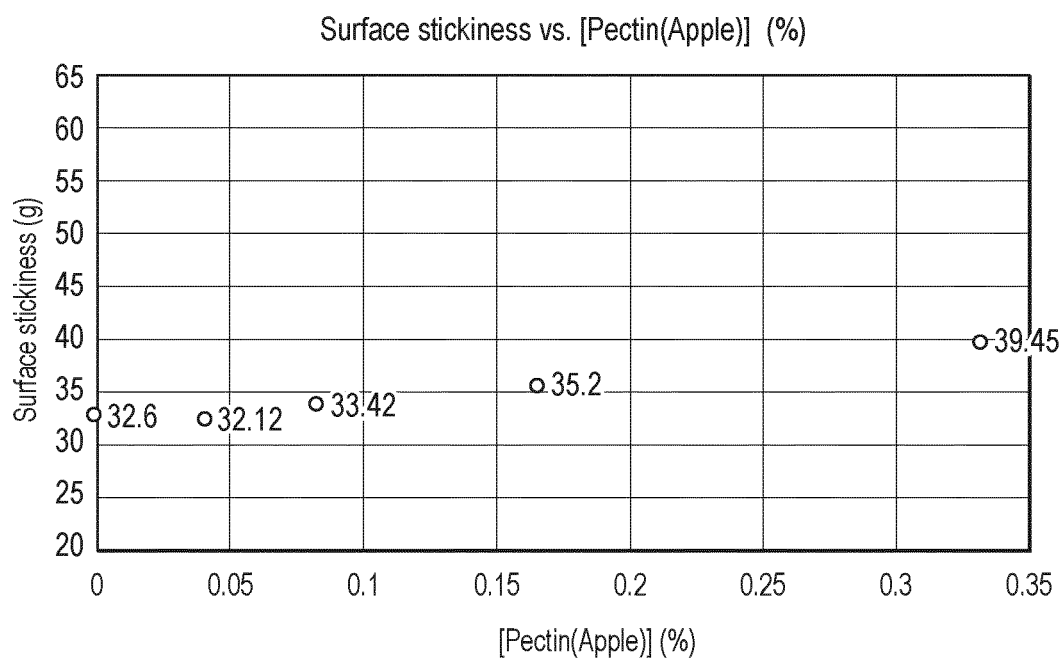
FIG. 3 (Cont.)

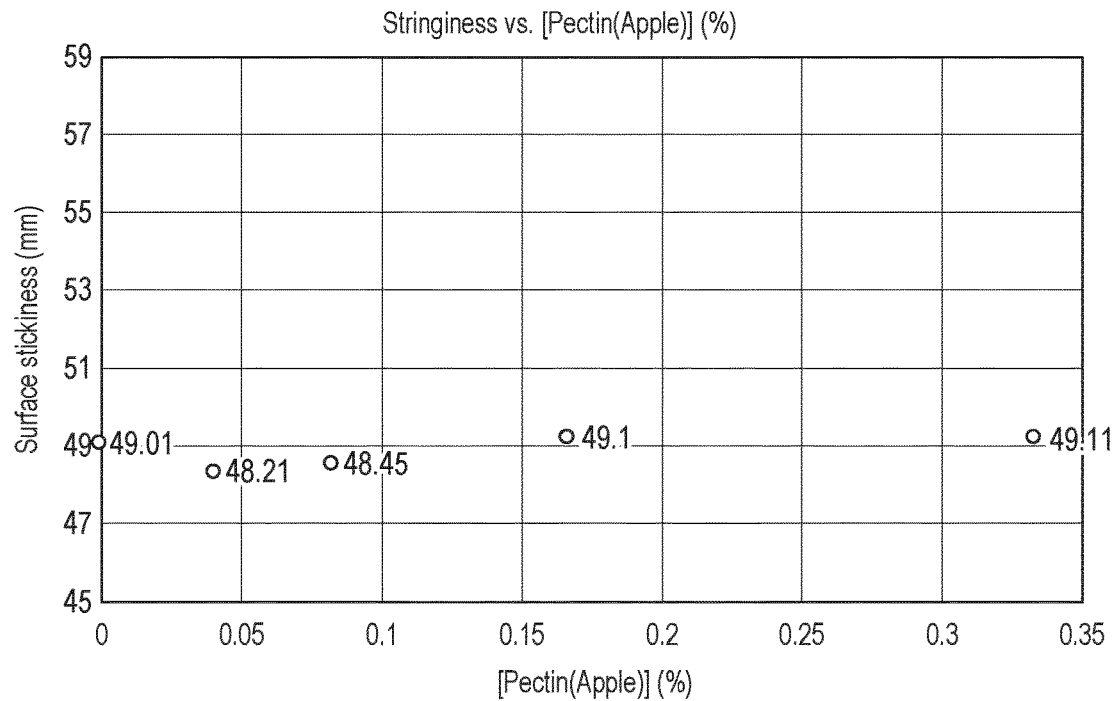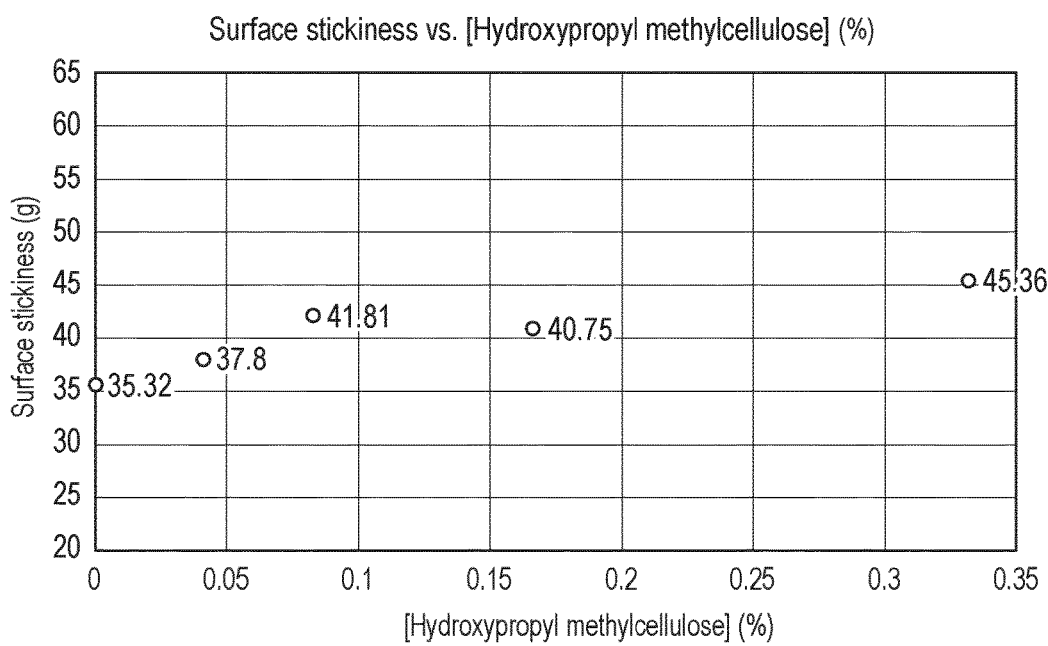
FIG. 3 (Cont.)

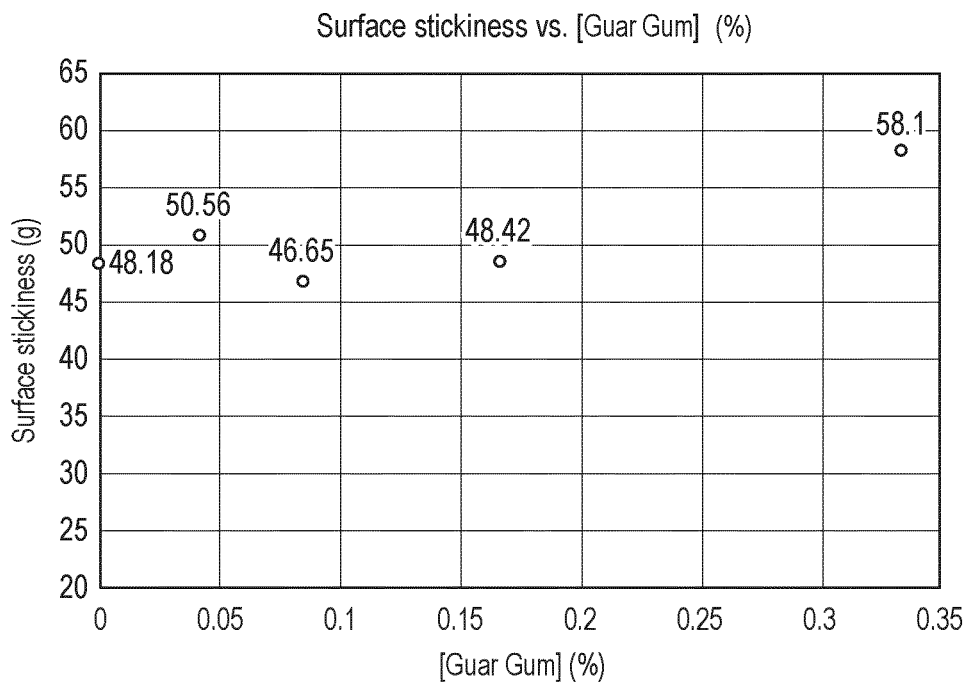
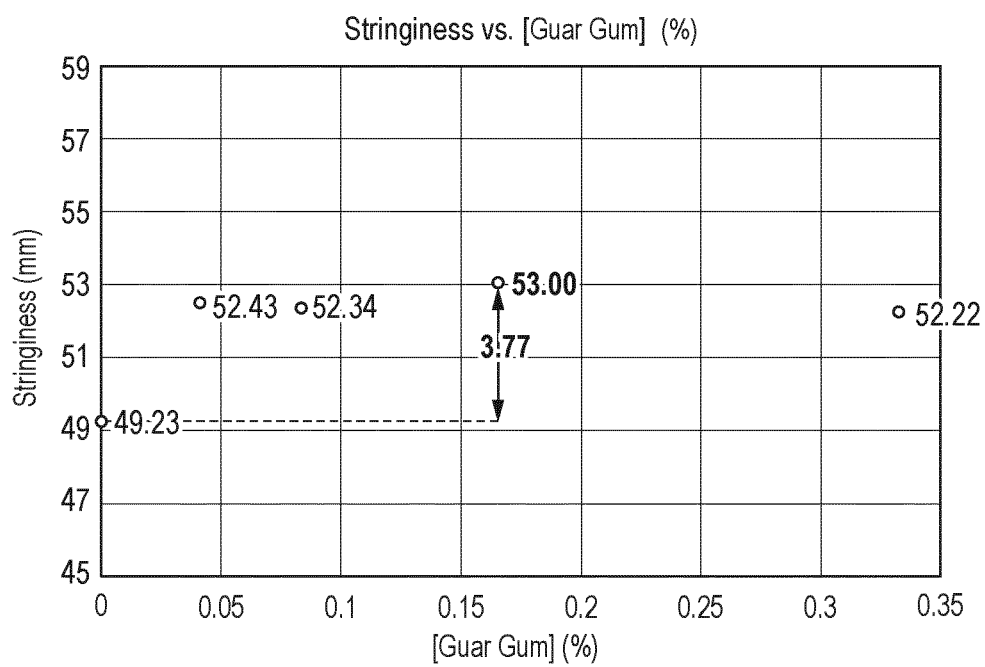
FIG. 3 (Cont.)

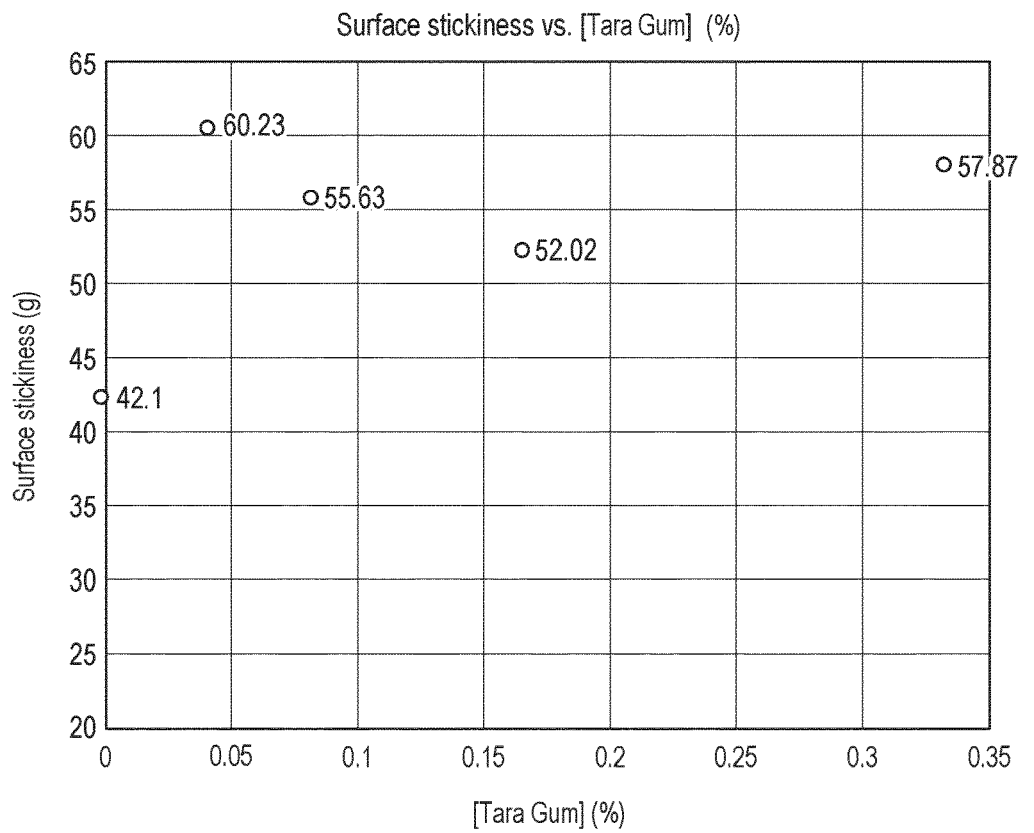
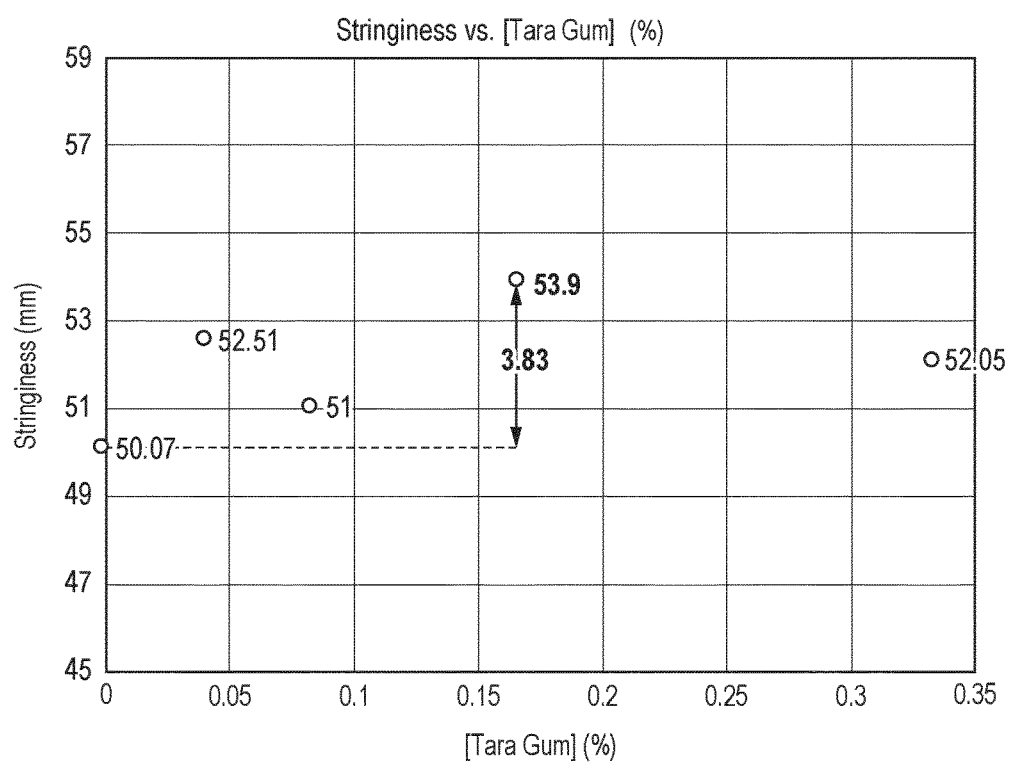
FIG. 3 (Cont.)

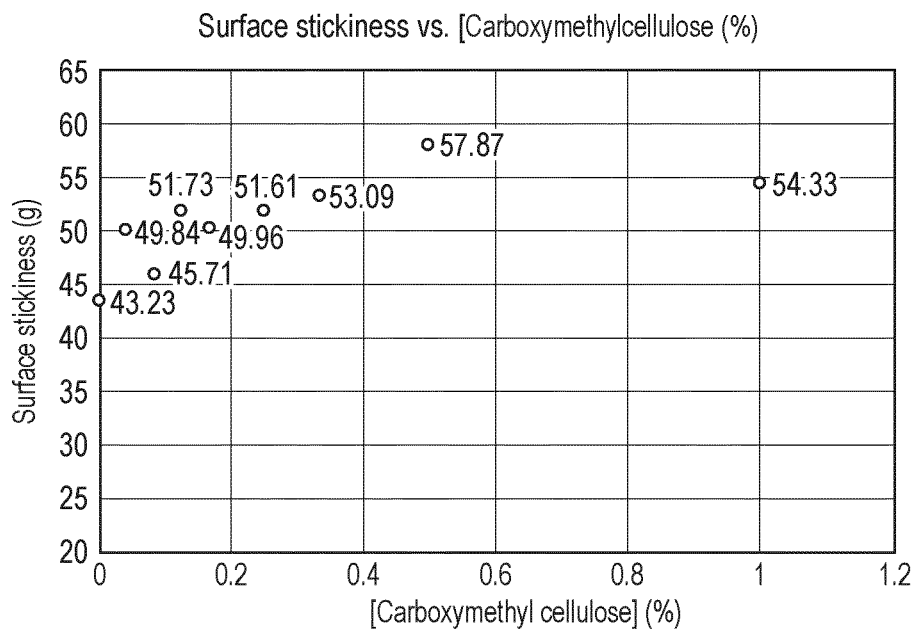
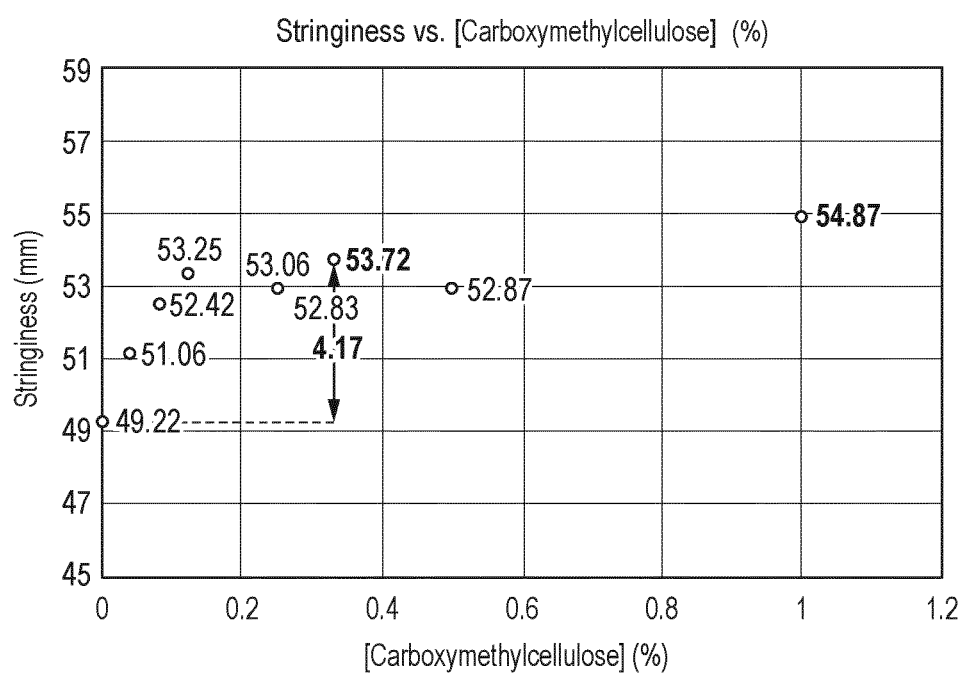
FIG. 3 (Cont.)

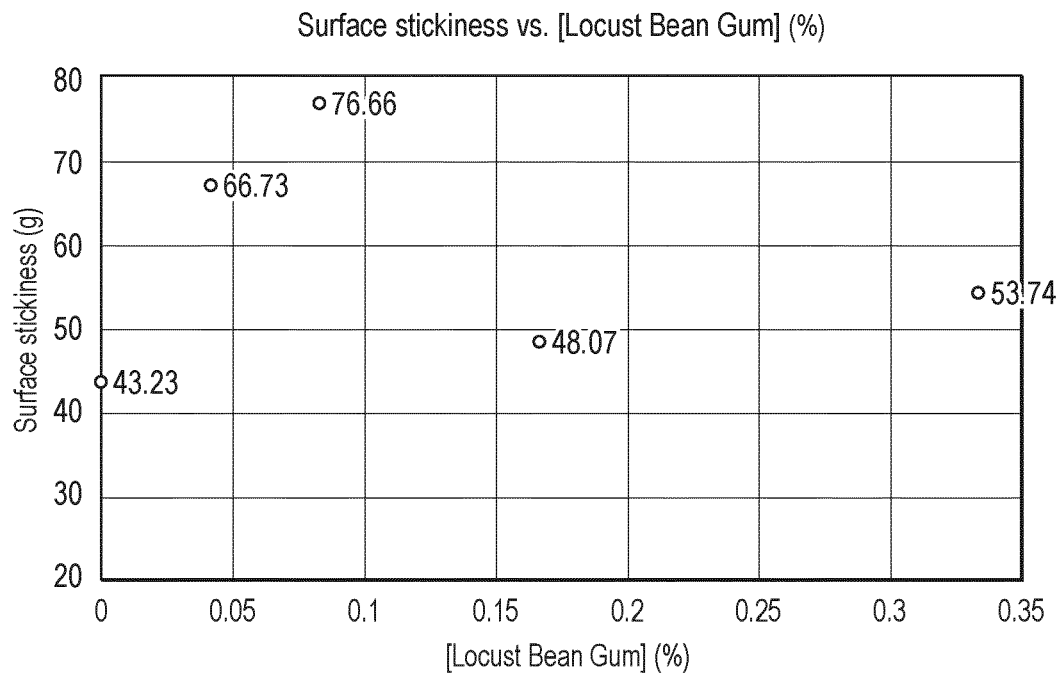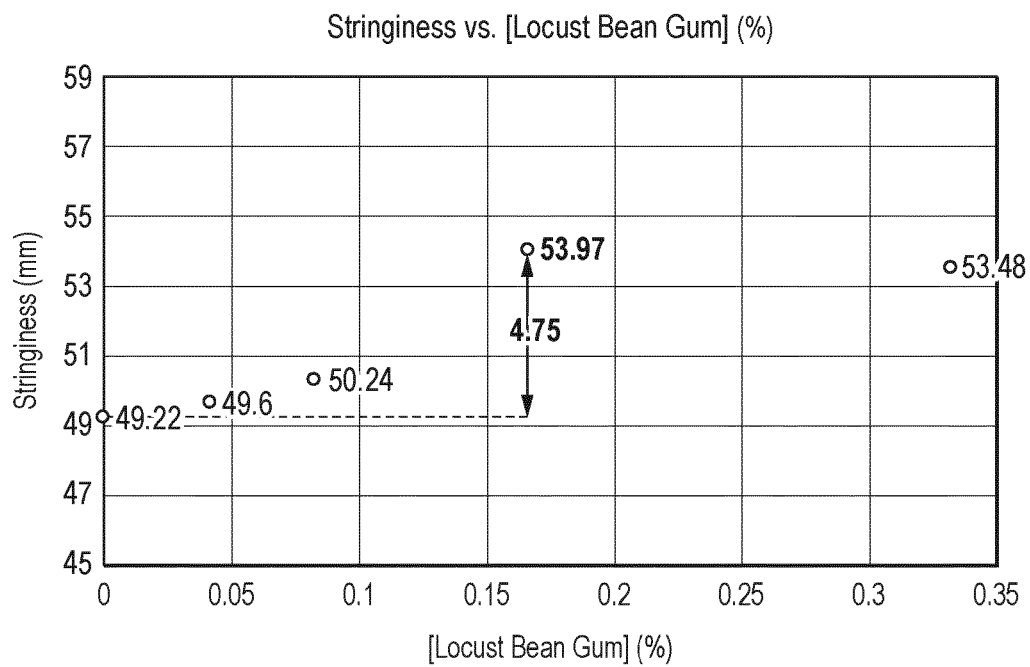
FIG. 3 (Cont.)

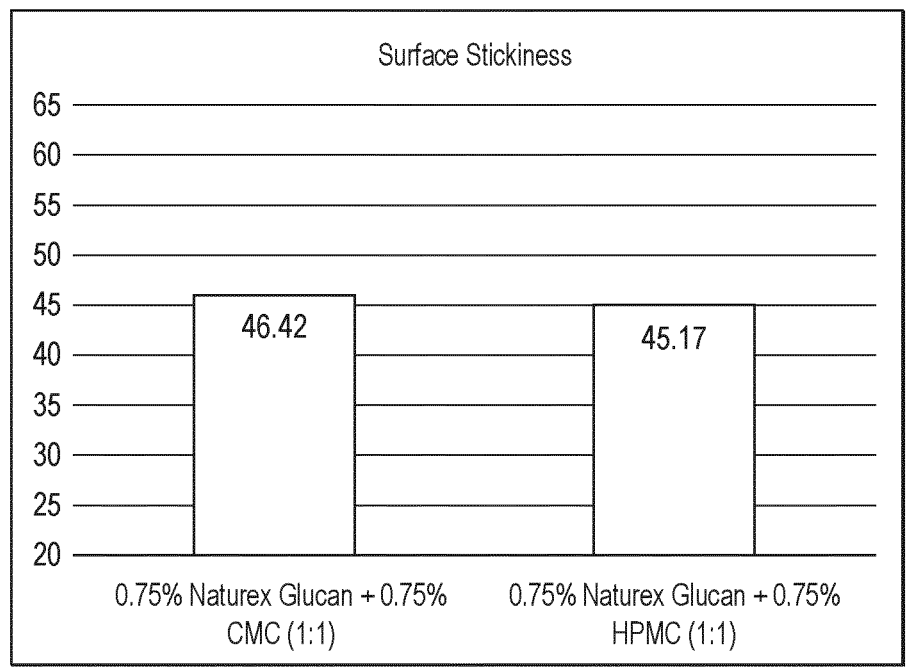
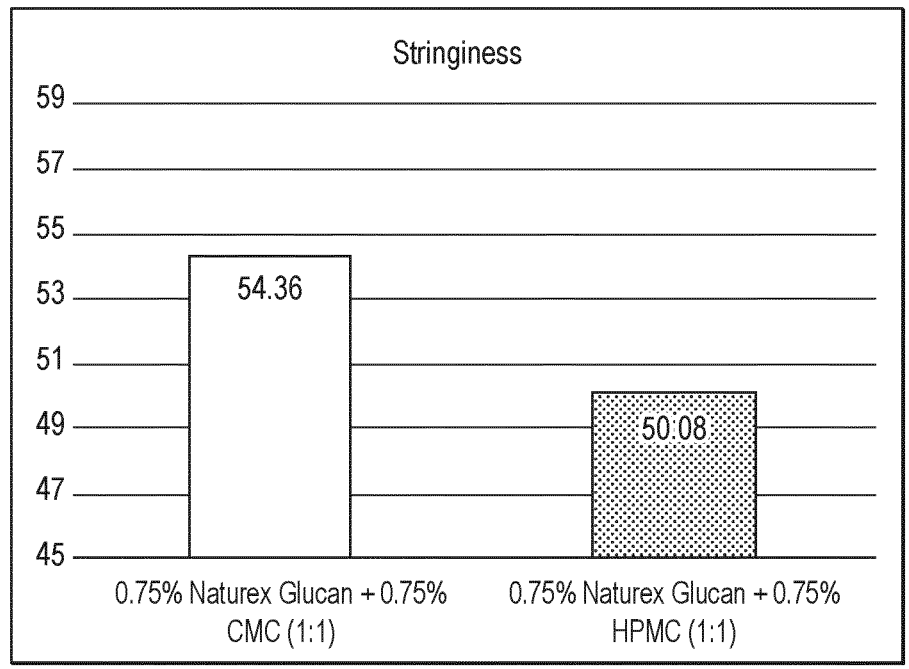
FIG. 4

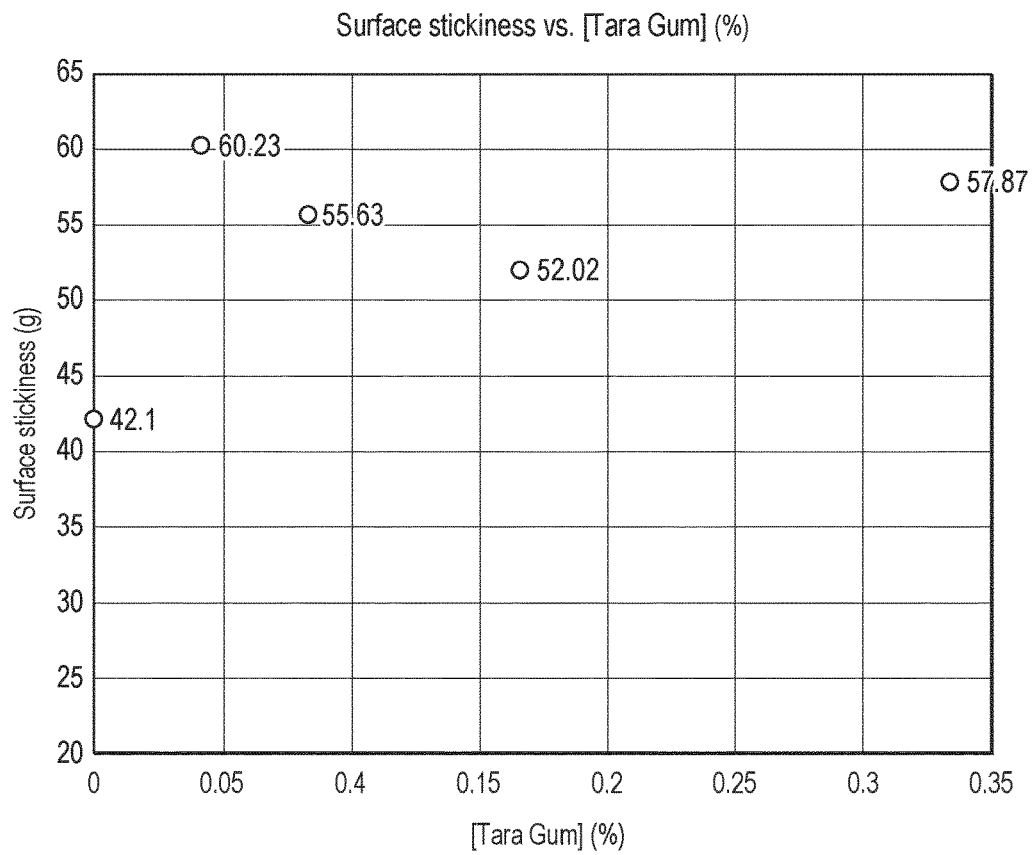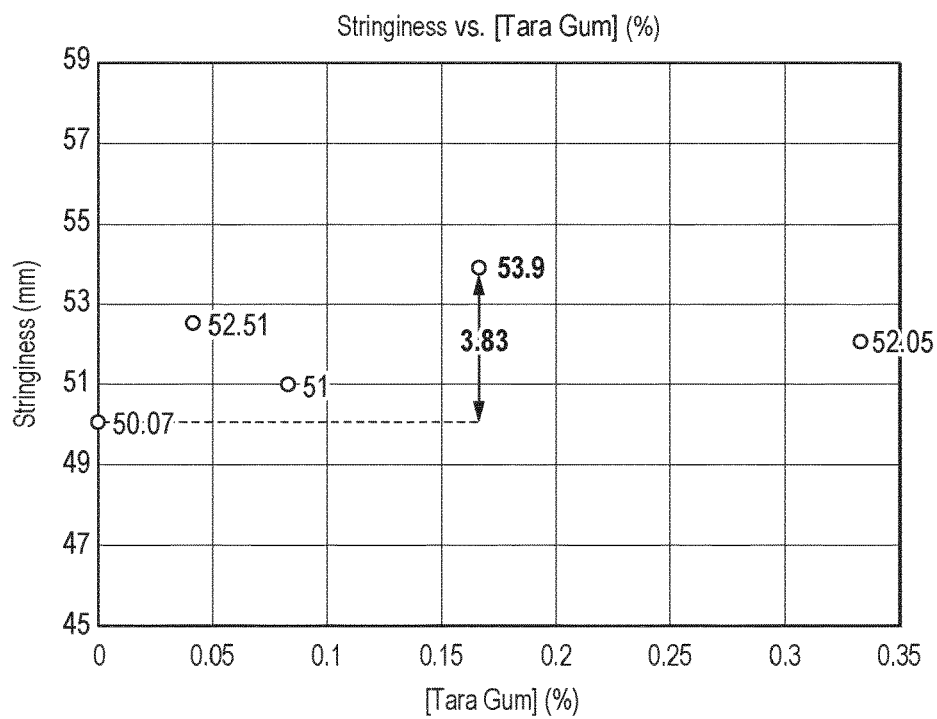
FIG. 4 (Cont.)

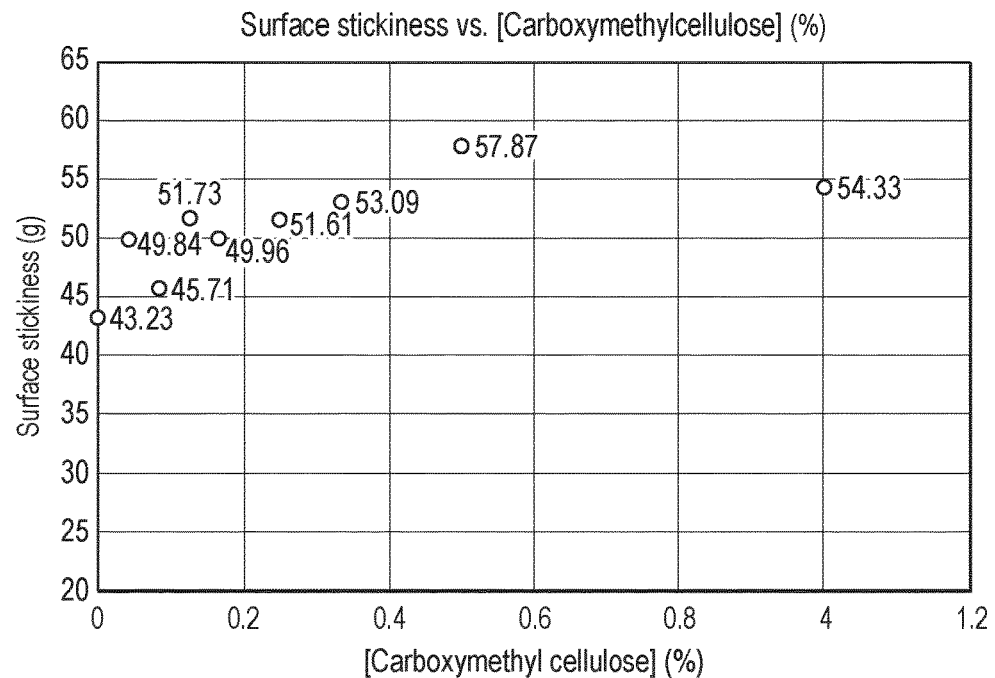
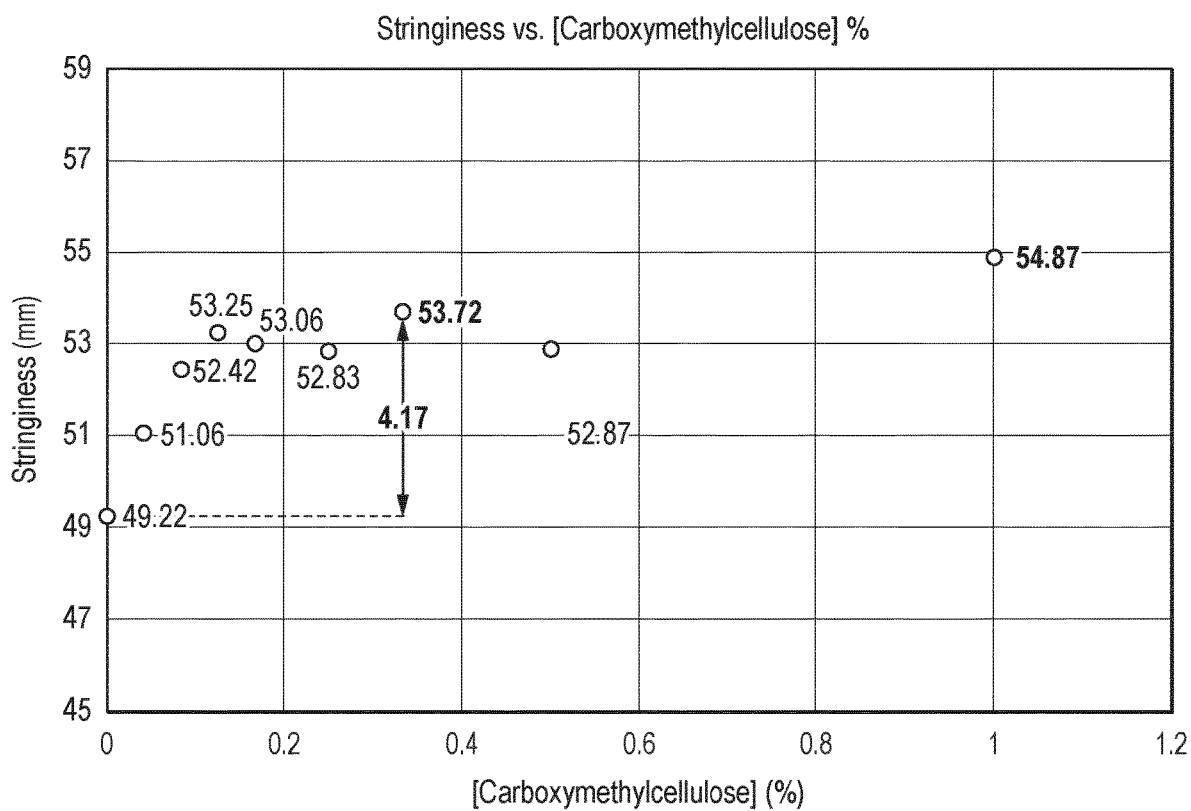
FIG. 4 (Cont.)

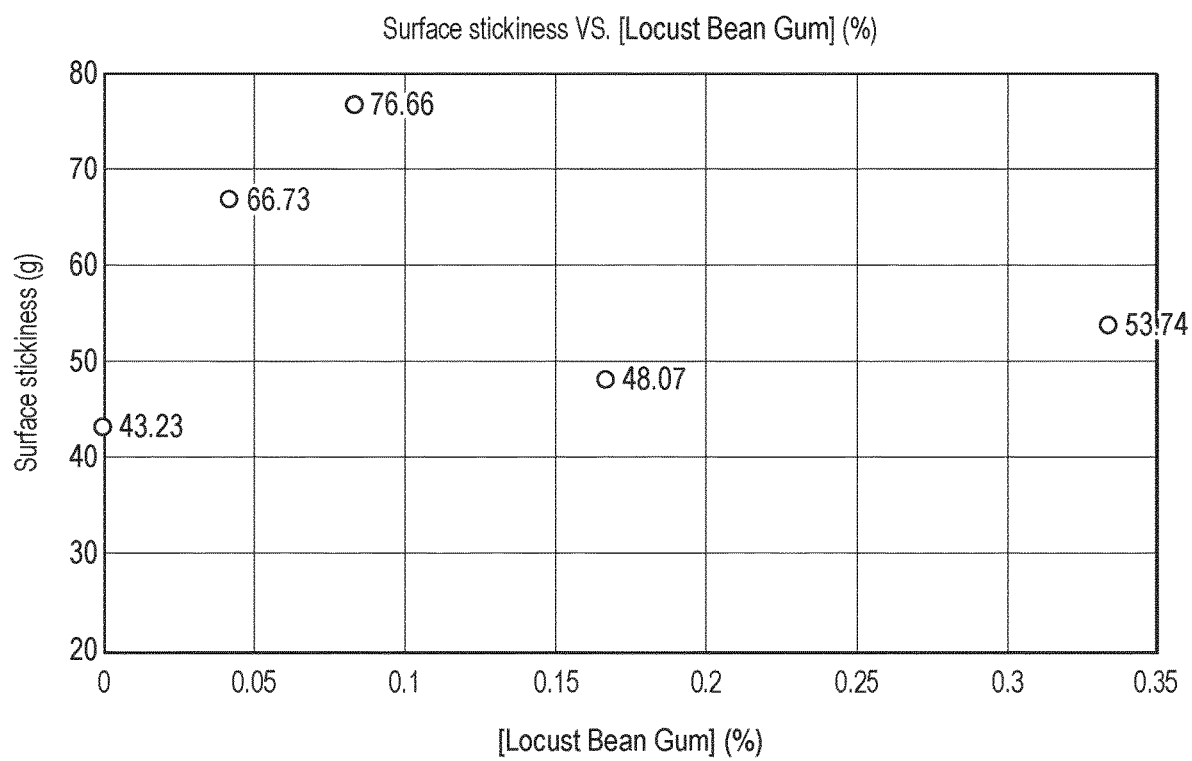
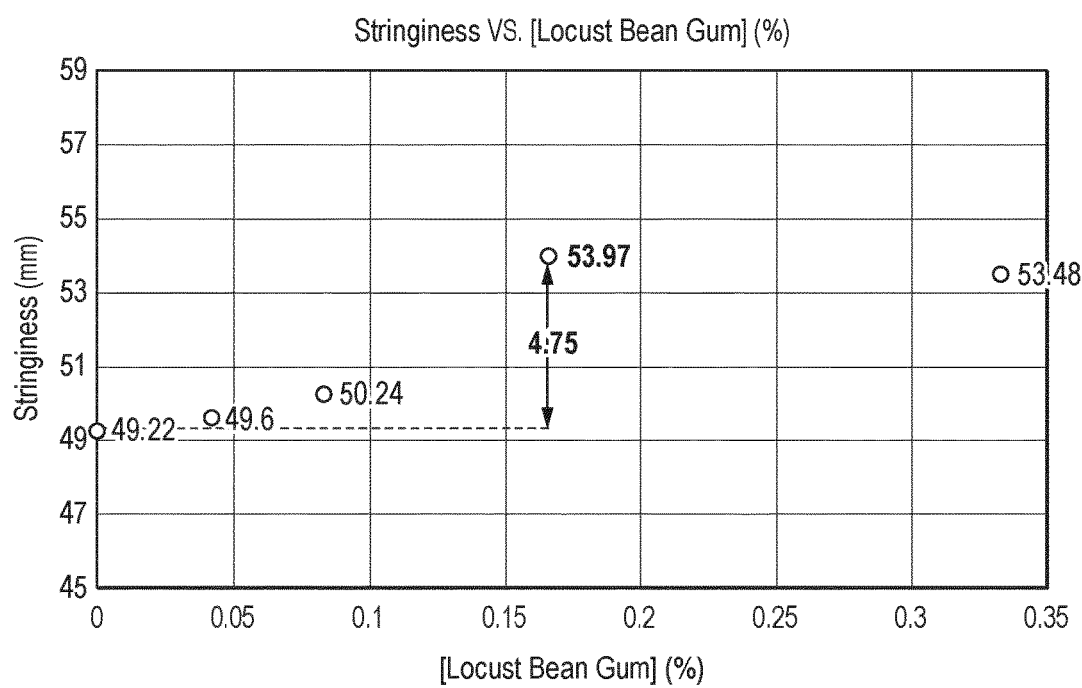
FIG. 4 (Cont.)

Table 1. Rheology of the 15 Mixtures of β-Glucans with CMC, and Locust Bean Gum

| Gums | Total Solid | Ratio | Effect on Stringiness |
|---|---|---|---|
| β-Glucan, CMC, and Locust Bean Gum | 1.00%<br>0.75%<br>0.50% | 5:4:1<br>5:3:2<br>2:1:1<br>5:2:3<br>5:1:4 | Stringy |

Table 2. Rheology of the 15 Mixtures of β-Glucans with Locust Bean Gum, and Tara Gum

| Gums | Total Solid | Ratio | Effect on Stringiness |
|---|---|---|---|
| β-Glucan, Locust Bean Gum, and Tara Gum | 1.00%<br>0.75%<br>0.50% | 5:4:1<br>5:3:2<br>2:1:1<br>5:2:3<br>5:1:4 | Some Stringy |

Table 3. Rheology of the 15 Mixtures of β-Glucans with Locust Bean Gum, and Guar Gum

| Gums | Total Solid | Ratio | Effect on Stringiness |
|---|---|---|---|
| β-Glucan, Locust Bean Gum, and Guar Gum | 1.00%<br>0.75%<br>0.50% | 5:4:1<br>5:3:2<br>2:1:1<br>5:2:3<br>5:1:4 | Stringy |

Table 4. Rheology of the 15 Mixtures of β-Glucans with Tara Gum, and Guar Gum

| Gums | Total Solid | Ratio | Effect on Stringiness |
|---|---|---|---|
| β-Glucan, Tara Gum, and Guar Gum | 1.00%<br>0.75%<br>0.50% | 5:4:1<br>5:3:2<br>2:1:1<br>5:2:3<br>5:1:4 | Stringy |

FIG. 6

Table 5. Rheology of the 15 Mixtures of β-Glucans with CMC, and Guar Gum

| Gums | Total Solid | Ratio | Effect on Stringiness |
|---|---|---|---|
| β-Glucan, CMC, and Guar Gum | 1.00%<br>0.75%<br>0.50% | 5:4:1<br>5:3:2<br>2:1:1<br>5:2:3<br>5:1:4 | Stringy |

Table 6. Rheology of the 15 Mixtures of β-Glucans with CMC, and Tara Gum

| Gums | Total Solid | Ratio | Effect on Stringiness |
|---|---|---|---|
| β-Glucan, CMC, and Tara Gum | 1.00%<br>0.75%<br>0.50% | 5:4:1<br>5:3:2<br>2:1:1<br>5:2:3<br>5:1:4 | No Significant Change |

Table 7. Rheology of the 15 Mixtures of β-Glucans with CMC, and Pectin (From Citrus)

| Gums | Total Solid | Ratio | Effect on Stringiness |
|---|---|---|---|
| β-Glucan, CMC, and Pectin (from Citrus) | 1.00%<br>0.75%<br>0.50% | 5:4:1<br>5:3:2<br>2:1:1<br>5:2:3<br>5:1:4 | No Significant Change |

Table 8. Rheology of the 15 Mixtures of β-Glucans with CMC, and Pectin (from Apple)

| Gums | Total Solid | Ratio | Effect on Stringiness |
|---|---|---|---|
| β-Glucan, CMC, and Pectin (From Apple) | 1.00%<br>0.75%<br>0.50% | 5:4:1<br>5:3:2<br>2:1:1<br>5:2:3<br>5:1:4 | No Significant Change |

FIG. 6 (Cont.)

Table 9. Rheology of the 15 Mixtures of β-Glucans with CMC, and Gum Arabic

| Gums | Total Solid | Ratio | Effect on Stringiness |
|---|---|---|---|
| β-Glucan, CMC, and Gum Arabic | 1.00%<br>0.75%<br>0.50% | 5:4:1<br>5:3:2<br>2:1:1<br>5:2:3<br>5:1:4 | No Significant Change |

Table 10. Rheology of the 15 Mixtures of β-Glucans with CMC, and Gum Konjac

| Gums | Total Solid | Ratio | Effect on Stringiness |
|---|---|---|---|
| β-Glucan, CMC, and Gum Konjac | 1.00%<br>0.75%<br>0.50% | 5:4:1<br>5:3:2<br>2:1:1<br>5:2:3<br>5:1:4 | No Significant Change |

Table 11. Rheology of the 15 Mixtures of β-Glucans with CMC, and Carrageenan (K)

| Gums | Total Solid | Ratio | Effect on Stringiness |
|---|---|---|---|
| β-Glucan, CMC, and Carrageenan (Kappa) | 1.00%<br>0.75%<br>0.50% | 5:4:1<br>5:3:2<br>2:1:1<br>5:2:3<br>5:1:4 | No Significant Change |

Table 12. Rheology of the 15 Mixtures of β-Glucans with CMC, and Carrageenan (I)

| Gums | Total Solid | Ratio | Effect on Stringiness |
|---|---|---|---|
| β-Glucan, CMC, and Carrageenan (Iota) | 1.00%<br>0.75%<br>0.50% | 5:4:1<br>5:3:2<br>2:1:1<br>5:2:3<br>5:1:4 | No Significant Change |

FIG. 6 (Cont.)

Table 13. Rheology of the 15 Mixtures of β-Glucans with CMC, and Chitosan

| Gums | Total Solid | Ratio | Effect on Stringiness |
|---|---|---|---|
| β-Glucan, CMC, and Chitosan | 1.00% 0.75% 0.50% | 5:4:1 5:3:2 2:1:1 5:2:3 5:1:4 | No Significant Change |

Table 14. Rheology of the 15 Mixtures of β-Glucans with CMC, and Inulin

| Gums | Total Solid | Ratio | Effect on Stringiness |
|---|---|---|---|
| β-Glucan, CMC, and Inulin | 1.00% 0.75% 0.50% | 5:4:1 5:3:2 2:1:1 5:2:3 5:1:4 | No Significant Change |

Table 3. Mixtures of β-glucan With two different gums that do not have the desired stringiness

| Gums | Total Solid | Ratio | Effect on Stringiness |
|---|---|---|---|
| β-Glucan, CMC, and Tara Gum<br>β-Glucan, CMC, and Pectin (from Citrus)<br>β-Glucan, CMC, and Pectin (From Apple)<br>β-Glucan, CMC, and Gum Arabic<br>β-Glucan, CMC, and Konjac<br>β-Glucan, CMC, and Carrageenan (*Kappa*)<br>β-Glucan, CMC, and Carrageenan (*Iota*)<br>β-Glucan, CMC, and Chitosan<br>β-Glucan, CMC, and Inulin<br>β-Glucan, Locust Bean Gum, and Tara Gum | 1.00% 0.75% 0.50% | 5:4:1 5:3:2 2:1:1 5:2:3 5:1:4 | No Significant Change |

FIG. 6 (Cont.)

Table 1. Mixtures of β-Glucan with two different gums that are stringy

| Gums | Total Solid | Ratio | Effect on Stringiness |
|---|---|---|---|
| β-Glucan, Locust Bean Gum and Guar Gum<br>β-Glucan, CMC, and Locust Bean Gum<br>β-Glucan, CMC, and Guar Gum<br>β-Glucan, Tara Gum and Guar Gum | 1.00%<br>0.75%<br>0.50% | 5:4:1<br>5:3:2<br>2:1:1<br>5:2:3<br>5:1:4 | Stringy |

FIG. 6 (Cont.)

| | Samples | Total Solid | | Relaxation Time [ms] |
|---|---|---|---|---|
| A9 | Naturex Glucan | 1% | 0.02gr | 51.7 |
| A10 | Naturex Glucan+CMC | 1% | 0.01gr+0.01gr | 51.7 |
| A11 | Naturex Glucan+CMC+Guar Gum | 1% | 0.01gr+0.005gr+0.005gr | 1674 |
| A12 | Naturex Glucan+CMC+Guar Gum | 1% | 0.01gr+0.007gr+0.003gr | stringy |
| A13 | Naturex Glucan+CMC+Guar Gum | 1% | 0.01gr+0.003gr+0.007gr | stringy |
| A14 | Naturex Glucan+CMC+Tara Gum | 1% | 0.01gr+0.005gr+0.005gr | 408.7 |
| A15 | Naturex Glucan+CMC+Tara Gum | 1% | 0.01gr+0.007gr+0.003gr | 97.2 |
| A16 | Naturex Glucan+CMC+Tara Gum | 1% | 0.01gr+0.003gr+0.007gr | 484.3 |
| A17 | Naturex Glucan+CMC+Locust Bean | 1% | 0.01gr+0.005gr+0.005gr | 87.4 |
| A18 | Naturex Glucan+CMC+Locust Bean | 1% | 0.01gr+0.007gr+0.003gr | 136.9 |
| A19 | Naturex Glucan+CMC+Locust Bean | 1% | 0.01gr+0.003gr+0.007gr | one glob |

FIG. 7

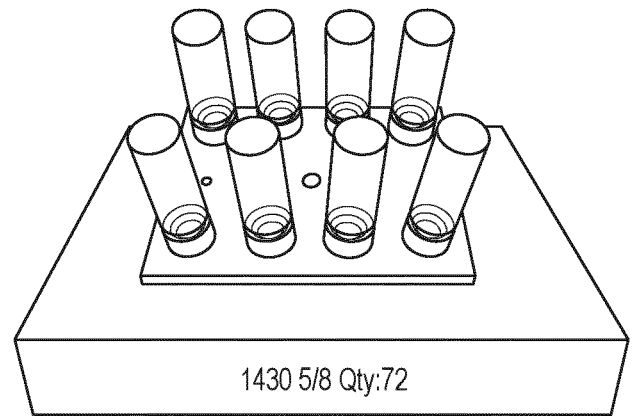
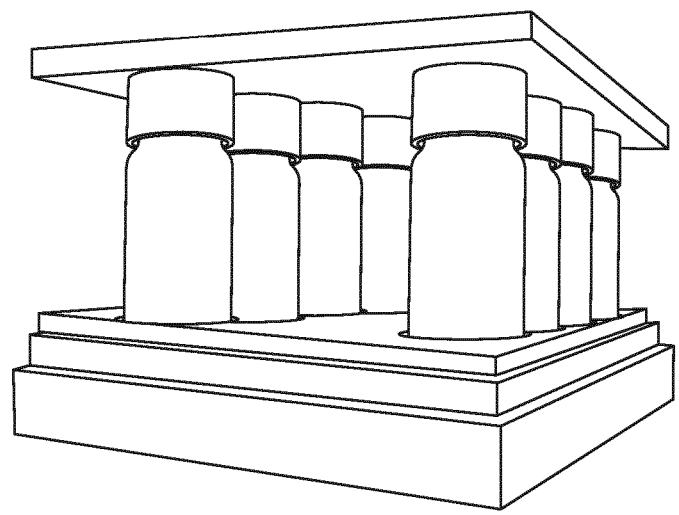
FIG. 8

| Samples | | Total Solid | |
|---|---|---|---|
| 1 | Naturex Glucan | 0.75% | 0.03gr |
| 2 | Naturex Glucan+CMC | 0.75% | 0.015gr+0.015gr |
| 3 | Naturex Glucan+CMC+Guar Gum | 0.75% | 0.015gr+0.0075gr+0.0075gr |
| 4 | Naturex Glucan+CMC+Guar Gum | 0.75% | 0.015gr+0.005gr+0.01gr |
| 5 | Naturex Glucan+CMC+Locust Bean | 0.75% | 0.015gr+0.005gr+0.01gr |
| 6 | Naturex Glucan+Locust Bean+Guar Gum | 0.75% | 0.015gr+0.005gr+0.01gr |
| 7 | Naturex Glucan+Tara Gum+Guar Bean | 0.75% | 0.015gr+0.01gr+0.005gr |
| 8 | Naturex Glucan+TaraGum+Guar Bean | 0.75% | 0.015gr+0.005gr+0.01gr |

| Sample | Gum 1 | Gum 2 | Gum 3 | Total Solid (%) | g/4mL | Stringiness Ranking |
|---|---|---|---|---|---|---|
| 1 | Naturex | HPMC | CMC | 0.75 | 0.0150+0.0075+0.0075 | |
| 2 | Naturex | HPMC | Locust Bean | 0.75 | 0.0150+0.0075+0.0075 | |
| 3 | Naturex | HPMC | Tara Gum | 0.75 | 0.0150+0.0075+0.0075 | |
| 4 | Naturex | HPMC | Carrageenan Lambda | 0.75 | 0.0150+0.0075+0.0075 | |
| 5 | Naturex | HPMC | Guar Gum | 0.75 | 0.0150+0.0075+0.0075 | |
| 6 | Naturex | HPMC | Carrageenan Iota | 0.75 | 0.0150+0.0075+0.0075 | 2 |
| 7 | Naturex | HPMC | Carrageenan Kappa | 0.75 | 0.0150+0.0075+0.0075 | 1 |
| 8 | Naturex | CMC | Guar Gum | 0.75 | 0.0150+0.0075+0.0075 | |

FIG. 10

| Sample | Gum 1 | Gum 2 | Gum 3 | Total Solid (%) | g/4mL | Stringiness Ranking |
|---|---|---|---|---|---|---|
| 1 | Naturex | CMC | Carrageenan Iota | 0.75 | 0.0150+0.0075+0.0075 | |
| 2 | Naturex | CMC | Carrageenan Kappa | 0.75 | 0.0150+0.0075+0.0075 | |
| 3 | Naturex | CMC | Locust Bean | 0.75 | 0.0150+0.0075+0.0075 | |
| 4 | Naturex | HPMC | Carrageenan Kappa | 0.75 | 0.0150+0.0075+0.0075 | 1 |
| 5 | Naturex | HPMC | Carrageenan Iota | 0.75 | 0.0150+0.0075+0.0075 | 2 |

FIG. 11

| Sample | Gum 1 | Gum 2 | Gum 3 | Total Solid (%) | g/4mL | Stringiness Ranking |
|---|---|---|---|---|---|---|
| 1 | Naturex | HPMC | CMC | 0.75 | | |
| 2 | Naturex | HPMC | Locust Bean | 0.75 | | |
| 3 | Naturex | HPMC | Tara Gum | 0.75 | | |
| 4 | Naturex | HPMC | Carrageenan Lambda | 0.75 | 0.0150+0.0050+0.0100 | |
| 5 | Naturex | HPMC | Guar Gum | 0.75 | & | |
| 6 | Naturex | HPMC | Carrageenan Iota | 0.75 | 0.0150+0.0100+0.0050 | 2 |
| 7 | Naturex | HPMC | Carrageenan Kappa | 0.75 | | 1 |
| 8 | Naturex | CMC | Guar Gum | 0.75 | | |

FIG. 12

| Sample | Gum 1 | Gum 2 | Gum 3 | Total Solid (%) | g/4mL | Stringiness Ranking |
|---|---|---|---|---|---|---|
| 1 | Naturex | HPMC | Carrageenan Kappa | 0.75 | 0.0100+0.0100+0.0100 | |
| 2 | Naturex | HPMC | Carrageenan Kappa | 0.75 | 0.0150+0.0075+0.0075 | |
| 3 | Naturex | HPMC | Carrageenan Kappa | 0.75 | 0.0150+0.0050+0.0100 | 1 |
| 4 | Naturex | HPMC | Carrageenan Kappa | 0.75 | 0.0150+0.0100+0.0050 | 2 |
| 5 | Naturex | HPMC | Carrageenan Iota | 0.75 | 0.0100+0.0100+0.0100 | |
| 6 | Naturex | HPMC | Carrageenan Iota | 0.75 | 0.0150+0.0075+0.0075 | |
| 7 | Naturex | HPMC | Carrageenan Iota | 0.75 | 0.0150+0.0050+0.0100 | |
| 8 | Naturex | HPMC | Carrageenan Iota | 0.75 | 0.0150+0.0100+0.0050 | |

| Sample | Gum 1 | Gum 2 | Gum 3 | Total Solid (%) | g/4mL | Stringiness Ranking |
|---|---|---|---|---|---|---|
| 1 | Naturex | HPMC | Carrageenan Kappa | 0.5 | 0.0067+0.0067+0.0067 | |
| 2 | Naturex | HPMC | Carrageenan Kappa | 0.5 | 0.0100+0.0050+0.0050 | |
| 3 | Naturex | HPMC | Carrageenan Kappa | 0.5 | 0.0100+0.0033+0.0067 | 1 |
| 4 | Naturex | HPMC | Carrageenan Kappa | 0.5 | 0.0100+0.0067+0.0033 | |
| 5 | Naturex | HPMC | Carrageenan Iota | 0.5 | 0.0067+0.0067+0.0067 | |
| 6 | Naturex | HPMC | Carrageenan Iota | 0.5 | 0.0100+0.0050+0.0050 | |
| 7 | Naturex | HPMC | Carrageenan Iota | 0.5 | 0.0100+0.0033+0.0067 | |
| 8 | Naturex | HPMC | Carrageenan Iota | 0.5 | 0.0100+0.0067+0.0033 | |

FIG. 13

| Sample | Gum 1 | Gum 2 | Gum 3 | Gum 4 | g/4mL | Stringiness Ranking |
|---|---|---|---|---|---|---|
| 1 | Naturex | HPMC | Guar Gum | Carrageenan-K | 1% supernatant+0.0050 gr+0.0050 gr+0.0050 gr | |
| 2 | Naturex | HPMC | Guar Gum | Carrageenan-K | 1% supernatant+0.0025 gr+0.0050 gr+0.0075 gr | Best |
| 3 | Naturex | HPMC | Guar Gum | Carrageenan-K | 1% supernatant+0.0075 gr+0.0050 gr+0.0025 gr | |
| 4 | Naturex | HPMC | Guar Gum | Carrageenan-K | 1% supernatant+0.0050 gr+0.0025 gr+0.0075 gr | |
| 5 | Naturex | HPMC | Guar Gum | Carrageenan-K | 1% supernatant+0.0050 gr+0.0075 gr+0.0025 gr | |
| 6 | Naturex | HPMC | Guar Gum | Carrageenan-K | 1% supernatant+0.0025 gr+0.0075 gr+0.0050 gr | |
| 7 | Naturex | HPMC | Guar Gum | Carrageenan-K | 1% supernatant+0.0075 gr+0.0025 gr+0.0050 gr | |

| Sample | Gum 1 | Gum 2 | Gum 3 | Gum 4 | g/4mL | Stringiness Ranking |
|---|---|---|---|---|---|---|
| 1 | Naturex | HPMC | Guar Gum | Carrageenan-K | 1% supernatant+0.0025 gr+0.0050 gr+0.0075 gr | |
| 2 | Naturex | HPMC | Guar Gum | Carrageenan-K | 1% supernatant+0.0025 gr+0.0063 gr+0.0062 gr | |
| 3 | Naturex | HPMC | Guar Gum | Carrageenan-K | 1% supernatant+0.0010 gr+0.0070 gr+0.0070 gr | |
| 4 | Naturex | HPMC | Guar Gum | Carrageenan-K | 1% supernatant+0.0010 gr+0.0060 gr+0.0080 gr | Best |
| 5 | Naturex | HPMC | Guar Gum | Carrageenan-K | 1% supernatant+0.0010 gr+0.0080 gr+0.0060 gr | |
| 6 | Naturex | - | Guar Gum | Carrageenan-K | 1%supernatant+0.0075 gr+0.0075 gr | |
| 7 | Naturex | - | Guar Gum | Carrageenan-K | 1% supernatant+0.0075 gr+0.0100 gr | |

FIG. 15

| Sample | Gum 1 | Gum 2 | Gum 3 | Gum 4 | g/4mL | Stringiness Ranking |
|---|---|---|---|---|---|---|
| D8 | Naturex | HPMC | Locust bean | Carrageenan-Iota | 1% supernatant+0.0050 gr+0.0050 gr+0.0050 gr | |
| D12 | Naturex | HPMC | Locust bean | Carrageenan-Iota | 1% supernatant+0.0025 gr+0.0050 gr+0.0075 gr | |
| D13 | Naturex | HPMC | Locust bean | Carrageenan-Iota | 1% supernatant+0.0075 gr+0.0050 gr+0.0025 gr | |
| D14 | Naturex | HPMC | Locust bean | Carrageenan-Iota | 1% supernatant+0.0050 gr+0.0025 gr+0.0075 gr | |
| D15 | Naturex | HPMC | Locust bean | Carrageenan-Iota | 1% supernatant+0.0050 gr+0.0075 gr+0.0025 gr | |
| D16 | Naturex | HPMC | Locust bean | Carrageenan-Iota | 1% supernatant+0.0025 gr+0.0075 gr+0.0050 gr | |
| D17 | Naturex | HPMC | Locust bean | Carrageenan-Iota | 1% supernatant+0.0075 gr+0.0025 gr+0.0050 gr | |
| D18 | Naturex | HPMC | Locust bean | Carrageenan-Iota | 1% supernatant+0.0025 gr+0.0063 gr+0.0062 gr | |
| D19 | Naturex | HPMC | Locust bean | Carrageenan-Iota | 1% supernatant+0.0010 gr+0.0070 gr+0.0070 gr | |
| D20 | Naturex | HPMC | Locust bean | Carrageenan-Iota | 1% supernatant+0.0010 gr+0.0060 gr+0.0080 gr | |
| D21 | Naturex | HMPC | Locust bean | Carrageenan-Iota | 1% supernatant+0.0010 gr+0.0080 gr+0.0060 gr | Best |
| D22 | Naturex | - | Locust bean | Carrageenan-Iota | 1% supernatant+0.0075 gr+0.0075 gr | |
| D23 | Naturex | - | Locust bean | Carrageenan-Iota | 1% supernatant+0.0050 gr+0.0100 gr | |

FIG. 15 (Cont.)

| Sample | Gum 1 | Gum 2 | Gum 3 | Gum 4 | g/4mL | Stringiness Ranking |
|---|---|---|---|---|---|---|
| C20 | Naturex | HPMC | Guar Gum | Carrageenan-Kapa | 1% supernatant+0.0100 gr+0.0060 gr+0.0080 gr | |
| E1 | Naturex | HPMC | Guar Gum | Carrageenan-Iota | 1% supernatant+0.0100 gr+0.0060 gr+0.0080 gr | Good |
| E2 | Naturex | HPMC | Guar Gum | Caeeageenan-lambda | 1% supernatant+0.0100 gr+0.0060 gr+0.0080 gr | Good |
| E3 | Naturex | HPMC | Guar Gum | Xanthan | 1% supernatant+0.0100 gr+0.0060 gr+0.0080 gr | |
| E4 | Naturex | HPMC | Guar Gum | Gum Arabic | 1% supernatant+0.0100 gr+0.0060 gr+0.0080 gr | |
| E5 | Naturex | HPMC | Guar Gum | Tara | 1% supernatant+0.0100 gr+0.0060 gr+0.0080 gr | |
| E6 | Naturex | HPMC | Guar Gum | Konjac | 1% supernatant+0.0100 gr+0.0060 gr+0.0080 gr | Good |
| E7 | Naturex | HPMC | Guar Gum | Locust bean | 1% supernatant+0.0100 gr+0.0060 gr+0.0080 gr | Best |

| Sample | Gum 1 | Gum 2 | Gum 3 | Gum 4 | g/4mL | Stringiness Ranking |
|---|---|---|---|---|---|---|
| E7 | Naturex | HPMC | Guar Gum | Locust bean | 1% supernatant+0.0100 gr+0.0060 gr+0.0080 gr | Best |
| E8 | Naturex | HPMC | Guar Gum | sodium Alginate | 1% supernatant+0.0100 gr+0.0060 gr+0.0080 gr | |
| E9 | Naturex | HPMC | Guar Gum | chitosan | 1% supernatant+0.0100 gr+0.0060 gr+0.0080 gr | |
| E10 | Naturex | HPMC | Guar Gum | Inulin | 1% supernatant+0.0100 gr+0.0060 gr+0.0080 gr | |
| E11 | Naturex | HPMC | Guar Gum | pectin | 1% supernatant+0.0100 gr+0.0060 gr+0.0080 gr | |
| E12 | Naturex | HPMC | Guar Gum | Glucan | 1% supernatant+0.0100 gr+0.0060 gr+0.0080 gr | |
| E13 | Naturex | HPMC | Guar Gum | Gum Ghatti | 1% supernatant+0.0100 gr+0.0060 gr+0.0080 gr | |
| E14 | Naturex | HPMC | Guar Gum | Tragacanth | 1% supernatant+0.0100 gr+0.0060 gr+0.0080 gr | |

FIG. 15 (Cont.)

| Sample | Gum 1 | Gum 2 | Gum 3 | Gum 4 | g/4mL | Stringiness Ranking |
|---|---|---|---|---|---|---|
| D21 | Naturex | HPMC | Locust bean | Carrageenan-Iota | 1% supernatant+0.0010 gr+0.0060 gr+0.0080 gr | Best |
| E15 | Naturex | HPMC | Locust bean | Carrageenan-Kappa | 1% supernatant+0.0010 gr+0.0060 gr+0.0080 gr | Good |
| E16 | Naturex | HPMC | Locust bean | Carrageenan-lambda | 1% supernatant+0.0010 gr+0.0060 gr+0.0080 gr | |
| E17 | Naturex | HPMC | Locust bean | Xanthan | 1% supernatant+0.0010 gr+0.0060 gr+0.0080 gr | |
| E18 | Naturex | HPMC | Locust bean | Gum Arabic | 1% supernatant+0.0010 gr+0.0060 gr+0.0080 gr | |
| E19 | Naturex | HPMC | Locust bean | Tara | 1% supernatant+0.0010 gr+0.0060 gr+0.0080 gr | Good |
| E20 | Naturex | HPMC | Locust bean | Konjac | 1% supernatant+0.0010 gr+0.0060 gr+0.0080 gr | |
| E21 | Naturex | HPMC | Locust bean | Sodium Alginate | 1% supernatant+0.0010 gr+0.0060 gr+0.0080 gr | |

| Sample | Gum 1 | Gum 2 | Gum 3 | Gum 4 | g/4mL | Stringiness Ranking |
|---|---|---|---|---|---|---|
| D21 | Naturex | HPMC | Locust bean | Carrageenan-Iota | 1% supernatant+0.0010 gr+0.0060 gr+0.0080 gr | Best |
| E22 | Naturex | HPMC | Locust bean | Chitosan | 1% supernatant+0.0010 gr+0.0060 gr+0.0080 gr | |
| E23 | Naturex | HPMC | Locust bean | Inulin | 1% supernatant+0.0010 gr+0.0060 gr+0.0080 gr | |
| E24 | Naturex | HPMC | Locust bean | Pectin | 1% supernatant+0.0010 gr+0.0060 gr+0.0080 gr | |
| E25 | Naturex | HPMC | Locust bean | Acacia Gum | 1% supernatant+0.0010 gr+0.0060 gr+0.0080 gr | |
| E26 | Naturex | HPMC | Locust bean | Gum Ghatti | 1% supernatant+0.0010 gr+0.0060 gr+0.0080 gr | |
| E27 | Naturex | HPMC | Locust bean | Tragacanth | 1% supernatant+0.0010 gr+0.0060 gr+0.0080 gr | |

FIG. 15 (Cont.)

| Sample | Gum 1 | Gum 2 | Gum 3 | Gum 4 | g/4mL | Stringiness Ranking |
|---|---|---|---|---|---|---|
| E1 | Naturex | HPMC | Guar Gum | Carrageenan-Iota | 1% supernatant+0.0010 gr+0.0060 gr+0.0080 gr | |
| E2 | Naturex | HPMC | Guar Gum | Carrageenan-lambda | 1% supernatant+0.0010 gr+0.0060 gr+0.0080 gr | |
| E6 | Naturex | HPMC | Guar Gum | Konjac | 1% supernatant+0.0010 gr+0.0060 gr+0.0080 gr | Good |
| D21 | Naturex | HMPC | Locust bean | Carrageenan-Iota | 1% supernatant+0.0010 gr+0.0080 gr+0.0060 gr | Best |
| E15 | Naturex | HPMC | Locust bean | Carrageenan-Kappa | 1% supernatant+0.0010 gr+0.0080 gr+0.0060 gr | |
| E19 | Naturex | HPMC | Locust bean | Tara | 1% supernatant+0.0010 gr+0.0080 gr+0.0060 gr | Good |
| F1 | Naturex | HPMC | Guar Gum | Locust bean | 1%supernatant+0.0010 gr+0.0080 gr+0.0060 gr | |
| F2 | Naturex | HPMC | Guar Gum | Locust bean | 1% supernatant+0.0010 gr+0.0070 gr+0.0070 gr | |
| E7 | Naturex | HPMC | Guar Gum | Locust bean | 1% supernatant+0.0010 gr+0.0060 gr+0.0080 gr | Good |
| B1 | Naturex | - | Guar Gum | CMC | 1% supernatant+0.0100 gr+0.0050 gr | |
| B13 | Naturex | - | Locust bean | Guar Gum | 1% supernatant+0.0050 gr+0.0100 gr | |
| B17 | Naturex | HPMC | - | Carrageenan-Kappa | 1% supernatant+0.0075 gr+0.0075 gr | |
| B' | Naturex | HPMC | - | Carrageenan-Kappa | 1% supernatant+0.0040 gr+0.00110 gr | |

FIG. 15 (Cont.)

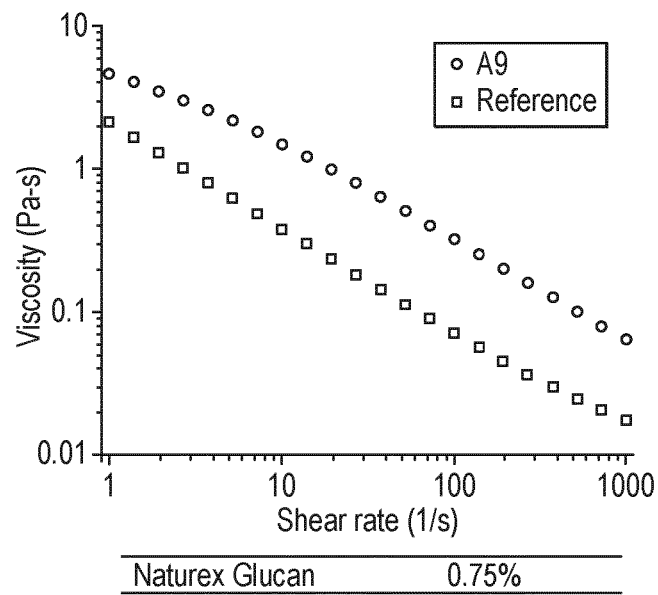
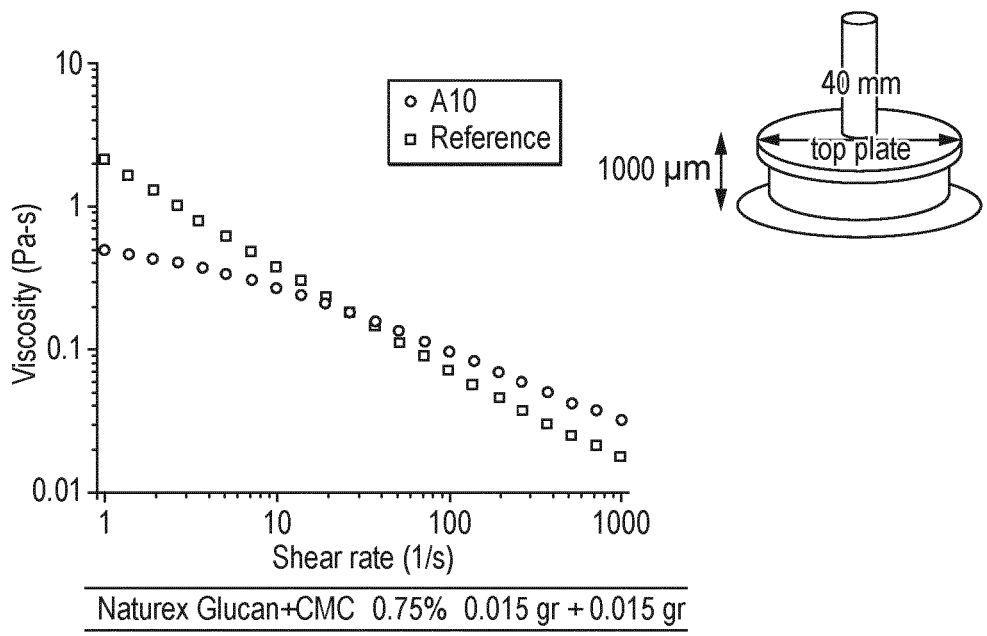
FIG. 16

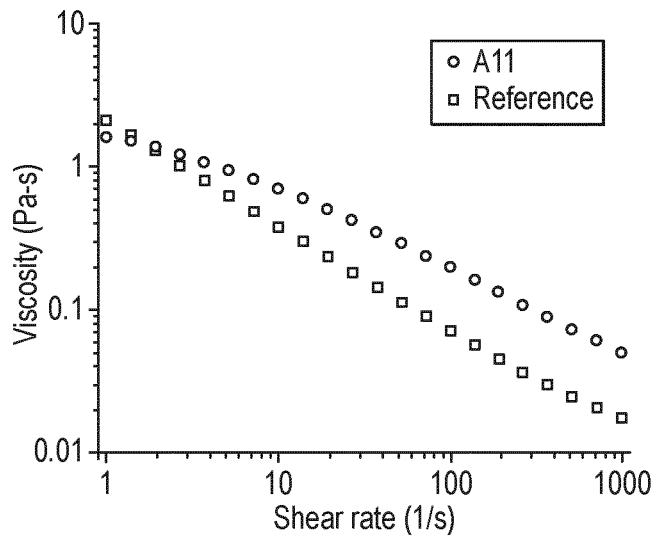
Naturex Glucan+CMC+Guar Gum 0.75%    0.015 gr + 0.005 gr + 0.01 gr
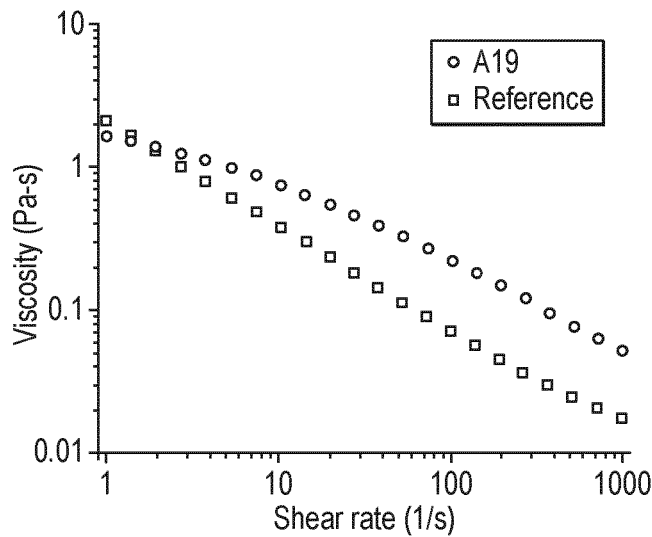
Naturex Glucan+CMC+Locust Bean 0.75%    0.015 gr + 0.005 gr + 0.01 gr
FIG. 16 (Cont.)

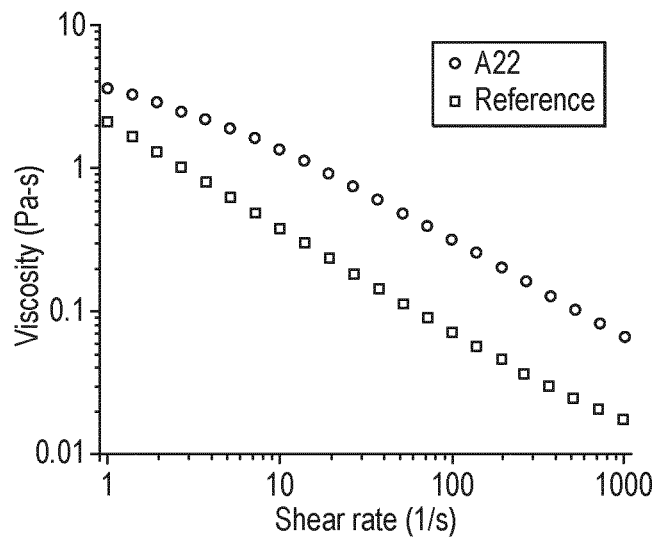
Naturex Glucan+Locust Bean+Guar Gum 0.75%
0.015 gr + 0.005 gr + 0.01 gr
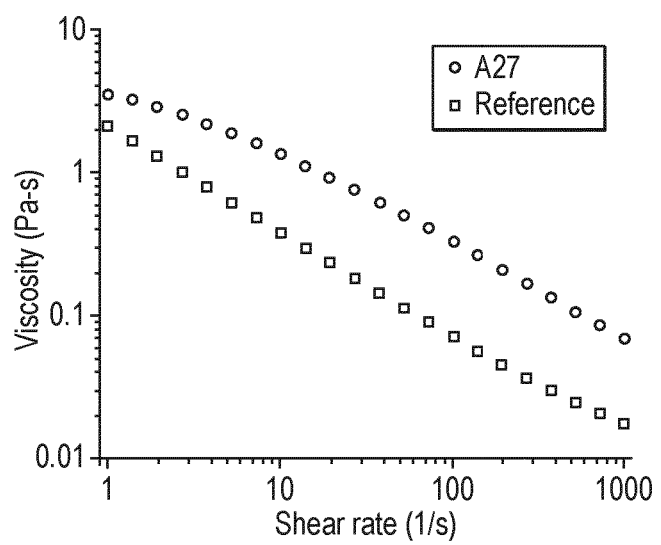
Naturex Glucan+Tara Gum+Guar Gum 0.75%
0.015 gr + 0.0zzzzz1 gr + 0.005 gr
FIG. 16 (Cont.)

| C20 | Naturex | HPMC | Guar Gum | Carrageenan-Kapa |
| E1 | Naturex | HPMC | Guar Gum | Carrageenan-Iota |
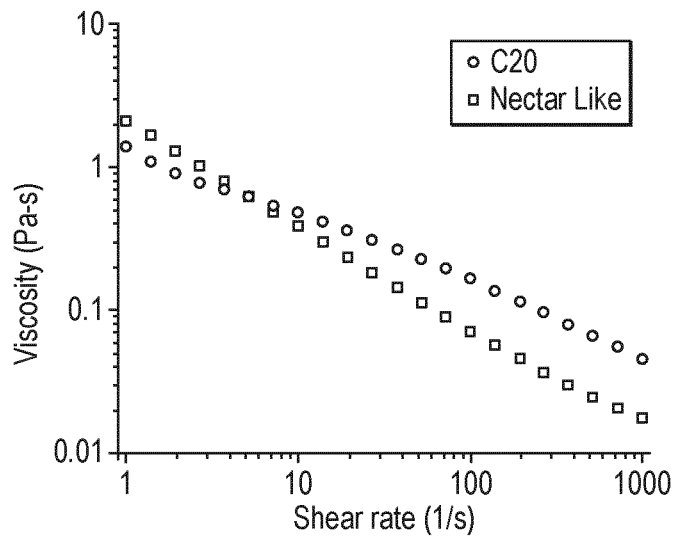
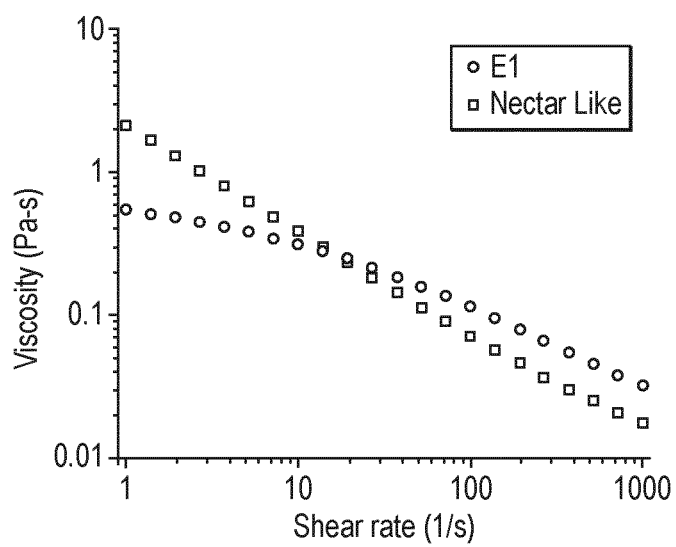
FIG. 16 (Cont.)

| E2 | Naturex | HPMC | Guar Gum | Carrageenan-lambda |
| E6 | Naturex | HPMC | Guar Gum | Konjac |
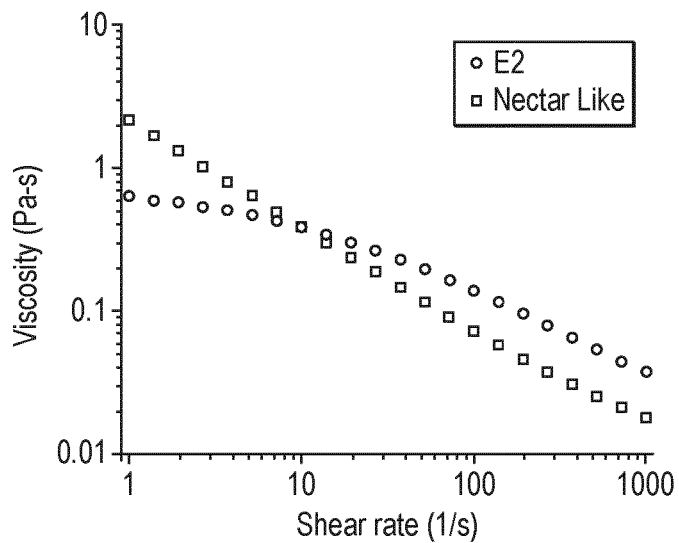
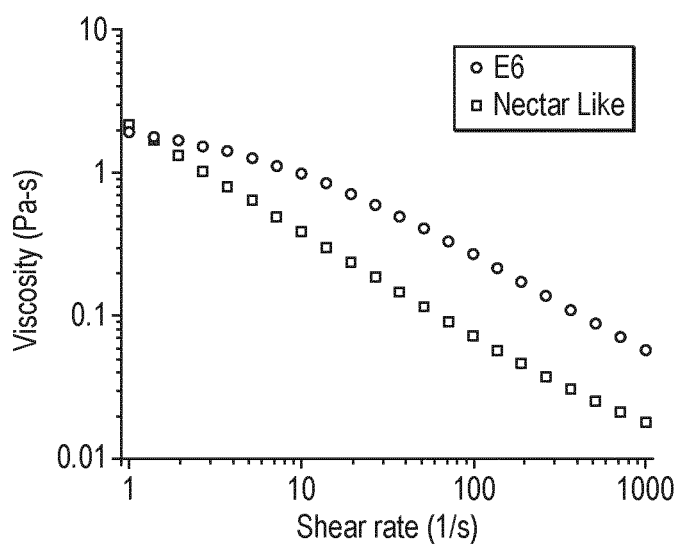
FIG. 16 (Cont.)

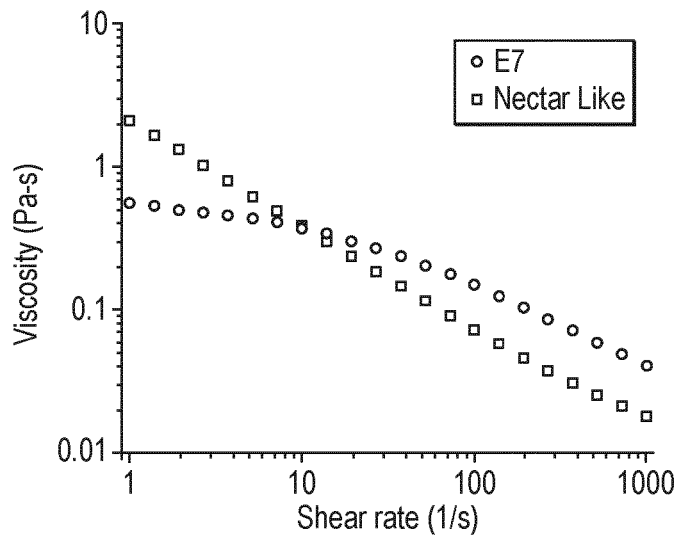
FIG. 16 (Cont.)
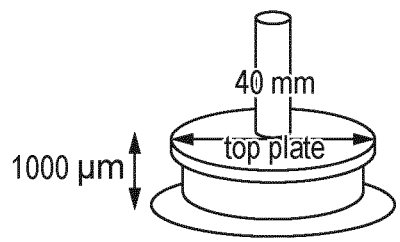
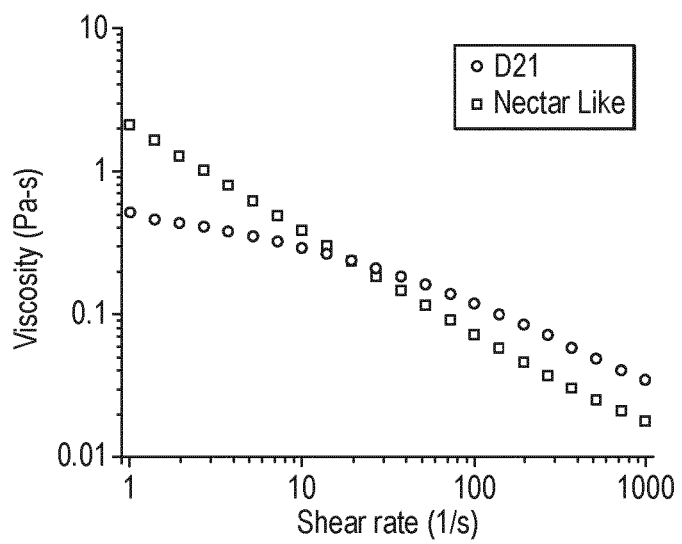
FIG. 17

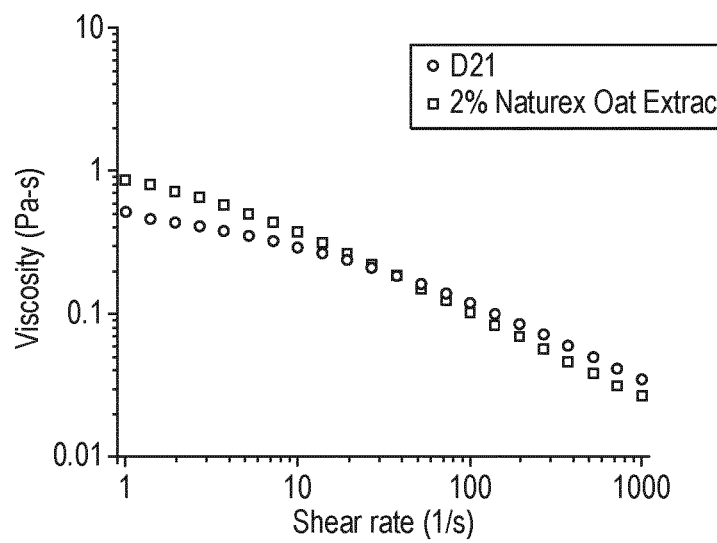
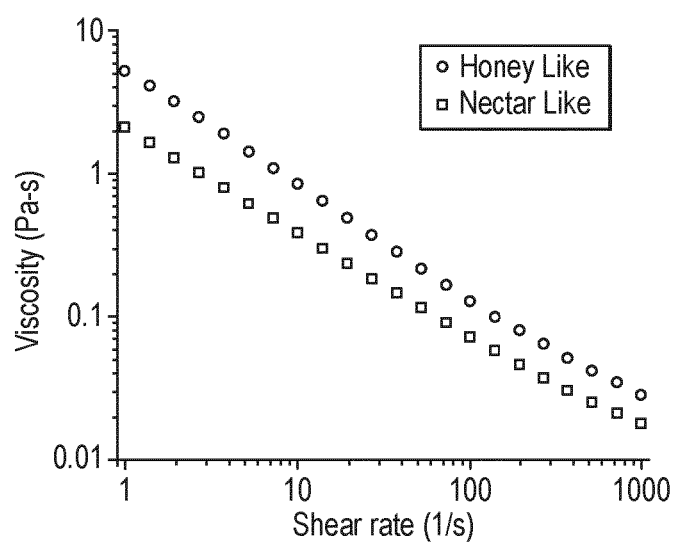
FIG. 17 (Cont.)

| Sample | Naturex + HPMC + Locust bean + Carrageenan Iota | g/4mL |
|---|---|---|
| D21 | | 1.0% supernatant+0.001 gr+0.008 gr+0.006 gr |
| 1 | Supernatant | 2.0% 4.0 ml Supernatant |
| 2 | Supernatant | 1.9% 3.8 ml Supernatant + 0.2 ml H$_2$O |
| 3 | Supernatant | 1.8% 3.6 ml Supernatant + 0.4 ml H$_2$O |
| 4 | Supernatant | 1.7% 3.4 ml Supernatant + 0.6 ml H$_2$O |
| 5 | Supernatant | 1.6% 3.2 ml Supernatant + 0.8 ml H$_2$O |
| 6 | Supernatant | 1.5% 3.0 ml Supernatant + 1.0 ml H$_2$O |
| 7 | Supernatant | 1.4% 2.8 ml Supernatant + 1.2 ml H$_2$O |
| 8 | Supernatant | 1.3% 2.6 ml Supernatant + 1.4 ml H$_2$O |
| 9 | Supernatant | 1.2% 2.4 ml Supernatant + 1.6 ml H$_2$O |
| 10 | Supernatant | 1.1% 2.2 ml Supernatant + 1.8 ml H$_2$O |
| 11 | Supernatant | 1.0% 2.0 ml Supernatant + 2.0 ml H$_2$O |

FIG. 18

| Sample | Gum 1 | Gum 2 | Gum 3 | Total Solid (%) | g/4mL | Stringiness Ranking |
|---|---|---|---|---|---|---|
| 1 | Naturex | HPMC | CMC | 0.75 | 0.0150+0.0075+0.0075 | |
| 2 | Naturex | HPMC | Locust Bean | 0.75 | 0.0150+0.0075+0.0075 | |
| 3 | Naturex | HPMC | Tara Gum | 0.75 | 0.0150+0.0075+0.0075 | |
| 4 | Naturex | HPMC | Carrageenan Lambda | 0.75 | 0.0150+0.0075+0.0075 | |
| 5 | Naturex | HPMC | Guar Gum | 0.75 | 0.0150+0.0075+0.0075 | |
| 6 | Naturex | HPMC | Carrageenan Iota | 0.75 | 0.0150+0.0075+0.0075 | |
| 7 | Naturex | HPMC | Carrageenan Kappa | 0.75 | 0.0150+0.0075+0.0075 | 1 |
| 8 | Naturex | CMC | Guar Gum | 0.75 | 0.0150+0.0075+0.0075 | |

FIG. 19

| Sample | Gum 1 | Gum 2 | Gum 3 | Gum 4 | g/4mL | Stringiness Ranking |
|---|---|---|---|---|---|---|
| E7 | Naturex | HPMC | Guar Gum | Locust bean | 1% supernatant+0.0010 gr+0.0060 gr+0.0080 gr | Best |
| E8 | Naturex | HPMC | Guar Gum | Sodium Alginate | 1% supernatant+0.0010 gr+0.0060 gr+0.0080 gr | |
| E9 | Naturex | HPMC | Guar Gum | Chitosan | 1% supernatant+0.0010 gr+0.0060 gr+0.0080 gr | |
| E10 | Naturex | HPMC | Guar Gum | Inulin | 1% supernatant+0.0010 gr+0.0060 gr+0.0080 gr | |
| E11 | Naturex | HPMC | Guar Gum | Pectin | 1% supernatant+0.0010 gr+0.0060 gr+0.0080 gr | |
| E12 | Naturex | HPMC | Guar Gum | Glucan | 1% supernatant+0.0010 gr+0.0060 gr+0.0080 gr | |
| E13 | Naturex | HPMC | Guar Gum | Gum Ghatti | 1% supernatant+0.0010 gr+0.0060 gr+0.0080 gr | |
| E14 | Naturex | HPMC | Guar Gum | Tragacanth | 1% supernatant+0.0010 gr+0.0060 gr+0.0080 gr | |

| Sample | Gum 1 | Gum 2 | Gum 3 | Gum 4 | g/4mL | Stringiness Ranking |
|---|---|---|---|---|---|---|
| C20 | Naturex | HPMC | Guar Gum | Carrageenan-Kappa | 1% supernatant+0.00100 gr+0.0060 gr+0.0080 gr | |
| E1 | Naturex | HPMC | Guar Gum | Carrageenan-Iota | 1% supernatant+0.00100 gr+0.0060 gr+0.0080 gr | Good |
| E2 | Naturex | HPMC | Guar Gum | Carrageenan-lambda | 1% supernatant+0.00100 gr+0.0060 gr+0.0080 gr | Good |
| E3 | Naturex | HPMC | Guar Gum | Xanthan | 1% supernatant+0.00100 gr+0.0060 gr+0.0080 gr | |
| E4 | Naturex | HPMC | Guar Gum | Gum Arabic | 1% supernatant+0.00100 gr+0.0060 gr+0.0080 gr | |
| E5 | Naturex | HPMC | Guar Gum | Tara | 1% supernatant+0.00100 gr+0.0060 gr+0.0080 gr | |
| E6 | Naturex | HPMC | Guar Gum | Konjac | 1% supernatant+0.00100 gr+0.0060 gr+0.0080 gr | Good |
| E7 | Naturex | HPMC | Guar Gum | Locust bean | 1% supernatant+0.00100 gr+0.0060 gr+0.0080 gr | Best |

FIG. 20

| Sample | Gum 1 | Gum 2 | Gum 3 | Gum 4 | g/4mL | Stringiness Ranking |
|---|---|---|---|---|---|---|
| D8 | Naturex | HPMC | Locust bean | Carrageenan-Iota | 1% supernatant+0.0050 gr+0.0050 gr+0.0050 gr | |
| D12 | Naturex | HPMC | Locust bean | Carrageenan-Iota | 1% supernatant+0.0025 gr+0.0050 gr+0.0075 gr | |
| D13 | Naturex | HPMC | Locust bean | Carrageenan-Iota | 1% supernatant+0.0075 gr+0.0050 gr+0.0025 gr | |
| D14 | Naturex | HPMC | Locust bean | Carrageenan-Iota | 1% supernatant+0.0050 gr+0.0025 gr+0.0075 gr | |
| D15 | Naturex | HPMC | Locust bean | Carrageenan-Iota | 1% supernatant+0.0050 gr+0.0075 gr+0.0025 gr | |
| D16 | Naturex | HPMC | Locust bean | Carrageenan-Iota | 1% supernatant+0.0025 gr+0.0075 gr+0.0050 gr | |
| D17 | Naturex | HPMC | Locust bean | Carrageenan-Iota | 1% supernatant+0.0075 gr+0.0025 gr+0.0050 gr | |
| D18 | Naturex | HPMC | Locust bean | Carrageenan-Iota | 1% supernatant+0.0025 gr+0.0063 gr+0.0062 gr | |
| D19 | Naturex | HPMC | Locust bean | Carrageenan-Iota | 1% supernatant+0.0010 gr+0.0070 gr+0.0070 gr | |
| D20 | Naturex | HPMC | Locust bean | Carrageenan-Iota | 1% supernatant+0.0010 gr+0.0060 gr+0.0080 gr | |
| D21 | Naturex | HMPC | Locust bean | Carrageenan-Iota | 1% supernatant+0.0010 gr+0.0080 gr+0.0060 gr | Best |
| D22 | Naturex | - | Locust bean | Carrageenan-Iota | 1% supernatant+0.0075 gr+0.0075 gr | |
| D23 | Naturex | - | Locust bean | Carrageenan-Iota | 1% supernatant+0.0050 gr+0.0100 gr | |

FIG. 20 (Cont.)

| Sample | Gum 1 | Gum 2 | Gum 3 | Gum 4 | g/4mL | Stringiness Ranking |
|---|---|---|---|---|---|---|
| D21 | Naturex | HPMC | Locust bean | Carrageenan-Iota | 1% supernatant+0.0010 gr+0.0060 gr+0.0080 gr | Best |
| E15 | Naturex | HPMC | Locust bean | Carrageenan-Kappa | 1% supernatant+0.0010 gr+0.0060 gr+0.0080 gr | Good |
| E16 | Naturex | HPMC | Locust bean | Carrageenan-lambda | 1% supernatant+0.0010 gr+0.0060 gr+0.0080 gr | |
| E17 | Naturex | HPMC | Locust bean | Xanthan | 1% supernatant+0.0010 gr+0.0060 gr+0.0080 gr | |
| E18 | Naturex | HPMC | Locust bean | Gum Arabic | 1% supernatant+0.0010 gr+0.0060 gr+0.0080 gr | |
| E19 | Naturex | HPMC | Locust bean | Tara | 1% supernatant+0.0010 gr+0.0060 gr+0.0080 gr | Good |
| E20 | Naturex | HPMC | Locust bean | Konjac | 1% supernatant+0.0010 gr+0.0060 gr+0.0080 gr | |
| E21 | Naturex | HPMC | Locust bean | Sodium Alginate | 1% supernatant+0.0010 gr+0.0060 gr+0.0080 gr | |

| Sample | Gum 1 | Gum 2 | Gum 3 | Gum 4 | g/4mL | Stringiness Ranking |
|---|---|---|---|---|---|---|
| D21 | Naturex | HPMC | Locust bean | Carrageenan-Iota | 1% supernatant+0.0010 gr+0.0060 gr+0.0080 gr | Best |
| E22 | Naturex | HPMC | Locust bean | Chitosan | 1% supernatant+0.0010 gr+0.0060 gr+0.0080 gr | |
| E23 | Naturex | HPMC | Locust bean | Inulin | 1% supernatant+0.0010 gr+0.0060 gr+0.0080 gr | |
| E24 | Naturex | HPMC | Locust bean | Pectin | 1% supernatant+0.0010 gr+0.0060 gr+0.0080 gr | |
| E25 | Naturex | HPMC | Locust bean | Acacia Gum | 1% supernatant+0.0010 gr+0.0060 gr+0.0080 gr | |
| E26 | Naturex | HPMC | Locust bean | Gum Ghatti | 1% supernatant+0.0010 gr+0.0060 gr+0.0080 gr | |
| E27 | Naturex | HPMC | Locust bean | Tragacanth | 1% supernatant+0.0010 gr+0.0060 gr+0.0080 gr | |

FIG. 20 (Cont.)

| Sample | Gum 1 | Gum 2 | Gum 3 | Gum 4 | g/4mL | Stringiness Ranking |
|---|---|---|---|---|---|---|
| E1 | Naturex | HPMC | Guar Gum | Carrageenan-Iota | 1% supernatant+0.0010 gr+0.0060 gr+0.0080 gr | |
| E2 | Naturex | HPMC | Guar Gum | Carrageenan-lambda | 1% supernatant+0.0010 gr+0.0060 gr+0.0080 gr | |
| E6 | Naturex | HPMC | Guar Gum | Konjac | 1% supernatant+0.0010 gr+0.0060 gr+0.0080 gr | Good |
| D21 | Naturex | HMPC | Locust bean | Carrageenan-Iota | 1% supernatant+0.0010 gr+0.0080 gr+0.0060 gr | Best |
| E15 | Naturex | HPMC | Locust bean | Carrageenan-Kappa | 1% supernatant+0.0010 gr+0.0080 gr+0.0060 gr | |
| E19 | Naturex | HPMC | Locust bean | Tara | 1% supernatant+0.0010 gr+0.0080 gr+0.0060 gr | Good |
| F1 | Naturex | HPMC | Guar Gum | Locust bean | 1% supernatant+0.0010 gr+0.0080 gr+0.0060 gr | |
| F2 | Naturex | HPMC | Guar Gum | Locust bean | 1% supernatant+0.0010 gr+0.0070 gr+0.0070 gr | |
| E7 | Naturex | HPMC | Guar Gum | Locust bean | 1% supernatant+0.0010 gr+0.0060 gr+0.0080 gr | Good |
| B1 | Naturex | - | Guar Gum | CMC | 1% supernatant+0.0100 gr+0.0050 gr | |
| B13 | Naturex | - | Locust bean | Guar Gum | 1% supernatant+0.0050 gr+0.0100 gr | |
| B17 | Naturex | HPMC | - | Carrageenan-Kappa | 1% supernatant+0.0075 gr+0.0075 gr | |
| B' | Naturex | HPMC | - | Carrageenan-Kappa | 1% supernatant+0.0040 gr+0.0110 gr | |

FIG. 20 (Cont.)

CaBER analysis:

| Sample | Relaxation Time (ms) | |
|---|---|---|
| R 1% | 7.229 | |
| R 2% | 27.74 | |
| B1 | 7.949 | |
| B13 | 14.29 | |
| B17 | 15.91 | |
| D21 | 25.05 | *It has just 1% oat extract* |
| E1 | 14.22 | |
| E2 | 17.84 | |
| E6 | 23.02 | |
| E7 | 19.12 | |
| E15 | 5.939 | |
| E19 | 15.77 | |
| F1 | 17.51 | |
| F2 | 18.93 | |

FIG. 21

| Sample | Gum 1 | Gum 2 | Gum 3 | Gum 4 | g/4mL | Stringiness Ranking |
|---|---|---|---|---|---|---|
| G1 | Naturex | HPMC | Tara Gum | Carrageenan Iota | 1% supernatant+0.0010 gr+0.008 gr+0.006 gr | |
| G2 | Naturex | HPMC | Tara Gum | Carrageenan Kappa | 1% supernatant+0.0010 gr+0.008 gr+0.006 gr | Best |
| G3 | Naturex | HPMC | Tara Gum | Carrageenan lambda | 1% supernatant+0.0010 gr+0.008 gr+0.006 gr | |
| G4 | Naturex | HMPC | Tara Gum | Xanthan | 1% supernatant+0.0010 gr+0.008 gr+0.006 gr | |
| G5 | Naturex | HPMC | Tara Gum | Gum Arabic | 1% supernatant+0.0010 gr+0.008 gr+0.006 gr | |
| G6 | Naturex | HPMC | Tara Gum | GuarGum | 1% supernatant+0.0010 gr+0.008 gr+0.006 gr | |
| G7 | Naturex | HPMC | Tara Gum | Konjac | 1% supernatant+0.0010 gr+0.008 gr+0.006 gr | Best |
| G8 | Naturex | HPMC | Tara Gum | Sodium Alginate | 1% supernatant+0.0010 gr+0.008 gr+0.006 gr | |
| G9 | Naturex | HPMC | Tara Gum | Chitosan | 1% supernatant+0.0010 gr+0.008 gr+0.006 gr | |
| G10 | Naturex | HPMC | Tara Gum | Inulin | 1% supernatant+0.0010 gr+0.008 gr+0.006 gr | |
| G11 | Naturex | HPMC | Tara Gum | Pectin | 1% supernatant+0.0010 gr+0.008 gr+0.006 gr | |
| G12 | Naturex | HPMC | Tara Gum | Acacia Gum | 1% supernatant+0.0010 gr+0.008 gr+0.006 gr | |
| G13 | Naturex | HPMC | Tara Gum | Locust Bean | 1% supernatant+0.0010 gr+0.008 gr+0.006 gr | Best |

FIG. 22

| Sample | Gum 1 | Gum 2 | Gum 3 | Gum 4 | g/4mL | Stringiness Ranking |
|---|---|---|---|---|---|---|
| G14 | Naturex | HPMC | Carrageenan Iota | Tara Gum | 1% supernatant+0.0010 gr+0.008 gr+0.006 gr | |
| G15 | Naturex | HPMC | Carrageenan Iota | Carrageenan Kappa | 1% supernatant+0.0010 gr+0.008 gr+0.006 gr | |
| G16 | Naturex | HPMC | Carrageenan Iota | Carrageenan lambda | 1% supernatant+0.0010 gr+0.008 gr+0.006 gr | |
| G17 | Naturex | HMPC | Carrageenan Iota | Xanthan | 1% supernatant+0.0010 gr+0.008 gr+0.006 gr | |
| G18 | Naturex | HPMC | Carrageenan Iota | Gum Arabic | 1% supernatant+0.0010 gr+0.008 gr+0.006 gr | |
| G19 | Naturex | HPMC | Carrageenan Iota | GuarGum | 1% supernatant+0.0010 gr+0.008 gr+0.006 gr | |
| G20 | Naturex | HPMC | Carrageenan Iota | Konjac | 1% supernatant+0.0010 gr+0.008 gr+0.006 gr | Best |
| G21 | Naturex | HPMC | Carrageenan Iota | Sodium Alginate | 1% supernatant+0.0010 gr+0.008 gr+0.006 gr | |
| G22 | Naturex | HPMC | Carrageenan Iota | Chitosan | 1% supernatant+0.0010 gr+0.008 gr+0.006 gr | |
| G23 | Naturex | HPMC | Carrageenan Iota | Inulin | 1% supernatant+0.0010 gr+0.008 gr+0.006 gr | |
| G24 | Naturex | HPMC | Carrageenan Iota | Pectin | 1% supernatant+0.0010 gr+0.008 gr+0.006 gr | |
| G25 | Naturex | HPMC | Carrageenan Iota | Acacia Gum | 1% supernatant+0.0010 gr+0.008 gr+0.006 gr | |
| G26 | Naturex | HPMC | Carrageenan Iota | Locust Bean | 1% supernatant+0.0010 gr+0.008 gr+0.006 gr | Best |

FIG. 22

| Sample | Gum 1 | Gum 2 | Gum 3 | Gum 4 | g/4mL | Stringiness Ranking |
|---|---|---|---|---|---|---|
| G27 | Naturex | HPMC | Konjac | Carrageenan Iota | 1% supernatant+0.0010 gr+0.008 gr+0.006 gr | |
| G28 | Naturex | HPMC | Konjac | Carrageenan Kappa | 1% supernatant+0.0010 gr+0.008 gr+0.006 gr | Best |
| G29 | Naturex | HPMC | Konjac | Carrageenan lambda | 1% supernatant+0.0010 gr+0.008 gr+0.006 gr | |
| G30 | Naturex | HMPC | Konjac | Xanthan | 1% supernatant+0.0010 gr+0.008 gr+0.006 gr | |
| G31 | Naturex | HPMC | Konjac | Gum Arabic | 1% supernatant+0.0010 gr+0.008 gr+0.006 gr | |
| G32 | Naturex | HPMC | Konjac | GuarGum | 1% supernatant+0.0010 gr+0.008 gr+0.006 gr | |
| G33 | Naturex | HPMC | Konjac | Sodium Alginate | 1% supernatant+0.0010 gr+0.008 gr+0.006 gr | Best |
| G34 | Naturex | HPMC | Konjac | Chitosan | 1% supernatant+0.0010 gr+0.008 gr+0.006 gr | |
| G35 | Naturex | HPMC | Konjac | Inulin | 1% supernatant+0.0010 gr+0.008 gr+0.006 gr | |
| G36 | Naturex | HPMC | Konjac | Pectin | 1% supernatant+0.0010 gr+0.008 gr+0.006 gr | |
| G37 | Naturex | HPMC | Konjac | Acacia Gum | 1% supernatant+0.0010 gr+0.008 gr+0.006 gr | |
| G38 | Naturex | HPMC | Konjac | Locust Bean | 1% supernatant+0.0010 gr+0.008 gr+0.006 gr | Best |
| G39 | Naturex | HPMC | Konjac | Tara Gum | 1% supernatant+0.0010 gr+0.008 gr+0.006 gr | |

FIG. 22 (Cont.)

| Sample | Gum 1 | Gum 2 | Gum 3 | Gum 4 | g/4mL | Stringiness Ranking |
|---|---|---|---|---|---|---|
| G2 | Naturex | HPMC | Tara Gum | Carrageenan Kappa | 1% supernatant+0.0010 gr+0.008 gr+0.006 gr | |
| G7 | Naturex | HPMC | Tara Gum | Konjac | 1% supernatant+0.0010 gr+0.008 gr+0.006 gr | |
| G13 | Naturex | HPMC | Tara Gum | Locust Bean | 1% supernatant+0.0010 gr+0.008 gr+0.006 gr | |
| G20 | Naturex | HMPC | Carrageenan Iota | Konjac | 1% supernatant+0.0010 gr+0.008 gr+0.006 gr | |
| G26 | Naturex | HPMC | Carrageenan Iota | Locust Bean | 1% supernatant+0.0010 gr+0.008 gr+0.006 gr | |
| G28 | Naturex | HPMC | Konjac | Carrageenan Kappa | 1% supernatant+0.0010 gr+0.008 gr+0.006 gr | |
| G33 | Naturex | HPMC | Konjac | Sodium Alginate | 1% supernatant+0.0010 gr+0.008 gr+0.006 gr | Best |
| G38 | Naturex | HPMC | Konjac | Locust Bean | 1% supernatant+0.0010 gr+0.008 gr+0.006 gr | |

FIG. 22 (Cont.)

| Sample | Gum 1 | Gum 2 | Gum 3 | Gum 4 | g/4mL |
|---|---|---|---|---|---|
| D21 | Naturex | HPMC | Locust Bean | Carrageenan Iota | 1% supernatant+0.0010 gr+0.008 gr+0.006 gr |
| D33 | Naturex | HPMC | Konjac | Sodium Alginate | 1% supernatant+0.0010 gr+0.008 gr+0.006 gr |
| G7 | Naturex | HPMC | Tara Gum | Konjac | 1% supernatant+0.0010 gr+0.008 gr+0.006 gr |
| G28 | Naturex | HMPC | Konjac | Carrageenan Kappa | 1% supernatant+0.0010 gr+0.008 gr+0.006 gr |
| G38 | Naturex | HPMC | Konjac | Locust Bean | 1% supernatant+0.0010 gr+0.008 gr+0.006 gr |

| Sample | Gum 1 | Gum 2 | Gum 3 | Gum 4 | g/4mL | Stringiness Ranking |
|---|---|---|---|---|---|---|
| D211 | Naturex | HPMC | Locust Bean | Carrageenan Iota | 1% supernatant+0.0010 gr+0.010 gr+0.004 gr | Best |
| D212 | Naturex | HPMC | Locust Bean | Carrageenan Iota | 1% supernatant+0.0010 gr+0.009 gr+0.005 gr | |
| D21 | Naturex | HPMC | Locust Bean | Carrageenan Iota | 1% supernatant+0.0010 gr+0.008 gr+0.006 gr | |
| D213 | Naturex | HMPC | Locust Bean | Carrageenan Iota | 1% supernatant+0.0010 gr+0.007 gr+0.007 gr | |
| D214 | Naturex | HPMC | Locust Bean | Carrageenan Iota | 1% supernatant+0.0010 gr+0.006 gr+0.008 gr | |
| D215 | Naturex | HPMC | Locust Bean | Carrageenan Iota | 1% supernatant+0.0010 gr+0.005 gr+0.009 gr | |
| D216 | Naturex | HPMC | Locust Bean | Carrageenan Iota | 1% supernatant+0.0010 gr+0.004 gr+0.010 gr | |

FIG. 23

| Sample | Gum 1 | Gum 2 | Gum 3 | Gum 4 | g/4mL | Stringiness Ranking |
|---|---|---|---|---|---|---|
| G71 | Naturex | HPMC | Tara Gum | Konjac | 1% supernatant+0.0010 gr+0.010 gr+0.004 gr | |
| G72 | Naturex | HPMC | Tara Gum | Konjac | 1% supernatant+0.0010 gr+0.009 gr+0.005 gr | |
| G7 | Naturex | HPMC | Tara Gum | Konjac | 1% supernatant+0.0010 gr+0.008 gr+0.006 gr | |
| G73 | Naturex | HMPC | Tara Gum | Konjac | 1% supernatant+0.0010 gr+0.007 gr+0.007 gr | Best |
| G74 | Naturex | HPMC | Tara Gum | Konjac | 1% supernatant+0.0010 gr+0.006 gr+0.008 gr | |
| G75 | Naturex | HPMC | Tara Gum | Konjac | 1% supernatant+0.0010 gr+0.005 gr+0.009 gr | |
| G76 | Naturex | HPMC | Tara Gum | Konjac | 1% supernatant+0.0010 gr+0.004 gr+0.010 gr | |

| Sample | Gum 1 | Gum 2 | Gum 3 | Gum 4 | g/4mL | Stringiness Ranking |
|---|---|---|---|---|---|---|
| G331 | Naturex | HPMC | Konjac | Sodium Alginate | 1% supernatant+0.0010 gr+0.010 gr+0.004 gr | Best |
| G332 | Naturex | HPMC | Konjac | Sodium Alginate | 1% supernatant+0.0010 gr+0.009 gr+0.005 gr | |
| G33 | Naturex | HPMC | Konjac | Sodium Alginate | 1% supernatant+0.0010 gr+0.008 gr+0.006 gr | |
| G333 | Naturex | HMPC | Konjac | Sodium Alginate | 1% supernatant+0.0010 gr+0.007 gr+0.007 gr | |
| G334 | Naturex | HPMC | Konjac | Sodium Alginate | 1% supernatant+0.0010 gr+0.006 gr+0.008 gr | |
| G335 | Naturex | HPMC | Konjac | Sodium Alginate | 1% supernatant+0.0010 gr+0.005 gr+0.009 gr | |
| G336 | Naturex | HPMC | Konjac | Sodium Alginate | 1% supernatant+0.0010 gr+0.004 gr+0.010 gr | |

FIG. 23 (Cont.)

| Sample | Gum 1 | Gum 2 | Gum 3 | Gum 4 | g/4mL | Stringiness Ranking |
|---|---|---|---|---|---|---|
| G281 | Naturex | HPMC | Konjac | Carrageenan Kappa | 1% supernatant+0.0010 gr+0.010 gr+0.004 gr | Best |
| G282 | Naturex | HPMC | Konjac | Carrageenan Kappa | 1% supernatant+0.0010 gr+0.009 gr+0.005 gr | |
| G28 | Naturex | HPMC | Konjac | Carrageenan Kappa | 1% supernatant+0.0010 gr+0.008 gr+0.006 gr | |
| G283 | Naturex | HMPC | Konjac | Carrageenan Kappa | 1% supernatant+0.0010 gr+0.007 gr+0.007 gr | |
| G284 | Naturex | HPMC | Konjac | Carrageenan Kappa | 1% supernatant+0.0010 gr+0.006 gr+0.008 gr | |
| G285 | Naturex | HPMC | Konjac | Carrageenan Kappa | 1% supernatant+0.0010 gr+0.005 gr+0.009 gr | |
| G286 | Naturex | HPMC | Konjac | Carrageenan Kappa | 1% supernatant+0.0010 gr+0.004 gr+0.010 gr | |

| Sample | Gum 1 | Gum 2 | Gum 3 | Gum 4 | g/4mL | Stringiness Ranking |
|---|---|---|---|---|---|---|
| G381 | Naturex | HPMC | Konjac | Locust Bean | 1% supernatant+0.0010 gr+0.010 gr+0.004 gr | |
| G382 | Naturex | HPMC | Konjac | Locust Bean | 1% supernatant+0.0010 gr+0.009 gr+0.005 gr | |
| G38 | Naturex | HPMC | Konjac | Locust Bean | 1% supernatant+0.0010 gr+0.008 gr+0.006 gr | |
| G383 | Naturex | HMPC | Konjac | Locust Bean | 1% supernatant+0.0010 gr+0.007 gr+0.007 gr | Best |
| G384 | Naturex | HPMC | Konjac | Locust Bean | 1% supernatant+0.0010 gr+0.006 gr+0.008 gr | |
| G385 | Naturex | HPMC | Konjac | Locust Bean | 1% supernatant+0.0010 gr+0.005 gr+0.009 gr | |
| G386 | Naturex | HPMC | Konjac | Locust Bean | 1% supernatant+0.0010 gr+0.004 gr+0.010 gr | |

FIG. 23 (Cont.)

| Sample | Gum 1 | Gum 2 | Gum 3 | Gum 4 | g/4mL | Stringiness Ranking |
|---|---|---|---|---|---|---|
| G331 | Naturex | HPMC | Konjac | Sodium Alginate | 1% supernatant+0.0010 gr+0.010 gr+0.004 gr | 1 |
| G211 | Naturex | HPMC | Locust Bean | Carrageenan Iota | 1% supernatant+0.0010 gr+0.009 gr+0.005 gr | |
| G73 | Naturex | HPMC | Tara Gum | Konjac | 1% supernatant+0.0010 gr+0.008 gr+0.006 gr | |
| G281 | Naturex | HMPC | Konjac | Carrageenan Kappa | 1% supernatant+0.0010 gr+0.007 gr+0.007 gr | 2 |
| G383 | Naturex | HPMC | Konjac | Locust Bean | 1% supernatant+0.0010 gr+0.006 gr+0.008 gr | 2 |

FIG. 23 (Cont.)

| Sample | Gum 1 | Gum 2 | Gum 3 | Gum 4 | g/4mL | Stringiness Ranking |
|---|---|---|---|---|---|---|
| G331 | Naturex | HPMC | Konjac | Sodium Alginate | 1% supernatant+0.0010 gr+0.010 gr+0.004 gr | 1 |
| G337 | Naturex | HPMC | Konjac | Sodium Alginate | 1% supernatant+0.0010 gr+0.011 gr+0.003 gr | 2 |
| G338 | Naturex | HPMC | Konjac | Sodium Alginate | 1% supernatant+0.0010 gr+0.012 gr+0.002 gr | 3 |
| G339 | Naturex | HMPC | Konjac | Sodium Alginate | 1% supernatant+0.0010 gr+0.013 gr+0.001 gr | 4 |

FIG. 24

| Sample | Gum 1 | Gum 2 | Gum 3 | Gum 4 | g/4mL | Stringiness Ranking |
|---|---|---|---|---|---|---|
| G331 | Naturex | HPMC | Konjac | Sodium Alginate | 1% supernatant+0.0010 gr+0.0100 gr+0.0040 gr | 1 |
| G3313 | Naturex | HPMC | Konjac | Sodium Alginate | 1% supernatant+0.00067 gr+0.0067 gr+0.0027 gr | 2 |
| G3314 | Naturex | HPMC | Konjac | Sodium Alginate | 1% supernatant+0.0005 gr+0.005 gr+0.0020 gr | 3 |

FIG. 25

| Samples | Relaxation Time (ms) | Viscosity (mPas at 50^-1 seconds) read at 30 seconds |
| --- | --- | --- |
| 1% Oat Extract Reference | 44.9 | 28.3 |
| 1% Oat Extract Reference Centrifuged | 45.3 | 29.2 |
| 2% Oat Extract Reference | 117 | 159 |
| 2% Oat Extract Reference Centrifuged | 119 | |
| D21 Cornell | 82.2 | 112 |
| D21 Centrifuged | 86.9 | |
| D211 Cornell | 94.4 | 84.9 |
| D'211 Centrifuged | 97.2 | 50.8 |
| G383 Cornell | 127 | 324 |
| G383 Centrifuged | 126 | |
| G'331 Centrifuged | 181 | not enough sample |

FIG. 26

| Sample | Gum 1 | Gum 2 | Gum 3 | Gum 4 | Gum 4 | g/4mL | Stringiness Ranking |
|---|---|---|---|---|---|---|---|
| G331 | Naturex | HPMC | Konjac | Sodium Alginate | - | 1% supernatant+0.0010 gr+0.010 gr+0.004 gr | 3 |
| H1 | Naturex | HPMC | Konjac | Sodium Alginate | Carrageenan Kappa | 1% supernatant+0.0010 gr+0.009 gr+0.004 gr+0.001 gr | |
| H2 | Naturex | HPMC | Konjac | Sodium Alginate | Carrageenan Kappa | 1% supernatant+0.0010 gr+0.009 gr+0.003 gr+0.002 gr | |
| H3 | Naturex | HMPC | Konjac | Sodium Alginate | Carrageenan Kappa | 1% supernatant+0.0010 gr+0.009 gr+0.002 gr+0.003 gr | 4 |
| H4 | Naturex | HPMC | Konjac | Sodium Alginate | Carrageenan Kappa | 1% supernatant+0.0010 gr+0.009 gr+0.001 gr+0.004 gr | |
| H5 | Naturex | HPMC | Konjac | Sodium Alginate | Carrageenan Kappa | 1% supernatant+0.0010 gr+0.010 gr+0.003 gr+0.001 gr | 2 |
| H6 | Naturex | HPMC | Konjac | Sodium Alginate | Carrageenan Kappa | 1% supernatant+0.0010 gr+0.010 gr+0.002 gr+0.002 gr | 1 |
| H7 | Naturex | HPMC | Konjac | Sodium Alginate | Carrageenan Kappa | 1% supernatant+0.0010 gr+0.010 gr+0.001 gr+0.003 gr | |

FIG. 27

| Sample | Gum 1 | Gum 2 | Gum 3 | Gum 4 | Gum 4 | g/4mL | Stringiness Ranking |
|---|---|---|---|---|---|---|---|
| H5 | Naturex | HPMC | Konjac | Sodium Alginate | Carrageenan Kappa | 1% supernatant+0.0010 gr+0.010 gr+0.003 gr+0.001 gr | 2 |
| H6 | Naturex | HPMC | Konjac | Sodium Alginate | Carrageenan Kappa | 1% supernatant+0.0010 gr+0.010 gr+0.002 gr+0.002 gr | 1 |
| H8 | Naturex | HPMC | Konjac | Sodium Alginate | Locust bean | 1% supernatant+0.0010 gr+0.010 gr+0.003 gr+0.001 gr | 2 |
| H9 | Naturex | HMPC | Konjac | Sodium Alginate | Locust bean | 1% supernatant+0.0010 gr+0.010 gr+0.002 gr+0.002 gr | |
| H10 | Naturex | HPMC | Konjac | Sodium Alginate | Locust bean | 1% supernatant+0.0010 gr+0.010 gr+0.001 gr+0.003 gr | |
| H11 | Naturex | HPMC | Konjac | Sodium Alginate | Tara Gum | 1% supernatant+0.0010 gr+0.010 gr+0.003 gr+0.001 gr | |
| H12 | Naturex | HPMC | Konjac | Sodium Alginate | Tara Gum | 1% supernatant+0.0010 gr+0.010 gr+0.002 gr+0.002 gr | |
| H13 | Naturex | HPMC | Konjac | Sodium Alginate | Tara Gum | 1% supernatant+0.0010 gr+0.010 gr+0.001 gr+0.003 gr | |

FIG. 27 (Cont.)

| Samples | Relaxation Time (ms) | Viscosity (mPas at 50^-1 seconds) read at 30 seconds |
|---|---|---|
| 1% Oat Extract Reference | 44.9 | 28.3 |
| 2% Oat Extract Reference | 117 | 159 |
| D211 Cornell | 94.4 | 84.9 |
| G383 Cornell | 127 | 324 |
| G'331 Centrifuged | 181 | not enough sample |
| H5 Cornell | 185 | not enough sample |
| H'5 Centrifuged | 193 | not enough sample |
| H6 Cornell | 185 | 483 |
| H6 Centrifuged | 205 | |
| H8 Cornell | 187 | 397 |
| H8 Centrifuged | 199 | |

FIG. 28

THICKENERS AND NUTRITIONAL PRODUCTS TO PROMOTE SAFE SWALLOWING FOR INDIVIDUALS WITH DYSPHAGIA AND METHODS OF MAKING AND USING SAME

CROSS REFERENCE TO RELATED APPLICATIONS

The present application is a National Stage of International Application No. PCT/EP2020/073570, filed on Aug. 21, 2020. which claims priority to U.S. Provisional Patent Application No. 62/890,878, filed on Aug. 23, 2019, and U.S. Provisional Patent Application No. 63/068,173, filed on Aug. 20, 2020, the entire contents of which are being incorporated herein by reference.

BACKGROUND

The present disclosure is related to a thickener formulated for dilution into a nutritional composition, a nutritional product including the thickener, a use of the nutritional product, a method for making the nutritional product, a method for improving the cohesiveness of the nutritional product, and a related system.

Dysphagia is a medical term for the symptom of difficulty in swallowing. Dysphagia may be a sensation that suggests a difficulty in a passage of a solid or a liquid (i.e., a nutritional product) from the mouth to the stomach.

During processing of a nutritional product in the mouth and during swallowing, a viscosity of the nutritional product changes due to shear forces. In most cases, the viscosity of the nutritional product decreases when the shear forces and the shear rate acting on the nutritional product (e.g., chewing forces) increase. Individuals who suffer from dysphagia often require a thickened nutritional product. Thickening of the nutritional product is achieved to increase, in particular, the shear viscosity of the product by adding a thickener such as a starch or gum thickener. The thickened nutritional product makes an individual with dysphagia less likely to aspirate during passage of the nutritional products from the mouth to the stomach.

Individuals with dysphagia may find that nutritional products cause coughing, spluttering or even choking, and therefore thickened nutritional products enable the individuals who suffer from dysphagia to swallow safely. The addition of a thickener is thought to improve a bolus control and timing of swallowing, but the resultant thickness is disliked by individuals who suffer from dysphagia due to the extra swallowing effort required. Moreover, the thickener leaves residues with high levels of viscosity, resulting in undesirable organoleptic properties. This is particularly relevant for liquids and beverages, as a dysphagia patient would expect a liquid that still has the organoleptic properties of a real thin liquid instead of a liquid product showing high viscosity. Furthermore, thickened nutritional products wherein merely shear viscosity is increased usually lack the cohesiveness that saliva typically provides to food boluses. Oral saliva has elasticity, high extensional viscosity and plays an important role in bolus formation, promoting the bolus cohesiveness of masticated particles.

Dysphagia is classified into three major types: oropharyngeal dysphagia, esophageal dysphagia and functional dysphagia.

Oropharyngeal dysphagia is generally not treatable with medication. Oropharyngeal dysphagia affects individuals of all ages but is more prevalent in older individuals. Worldwide, oropharyngeal dysphagia affects approximately 22 million people over the age of 50 years. Oropharyngeal dysphagia is often a consequence of an acute event such as a stroke, brain injury, or surgery for oral or throat cancer. In addition, radiotherapy and chemotherapy may weaken the muscles and degrade the nerves associated with the physiology and nervous innervation of the swallow reflex. Oropharyngeal dysphagia is also common for individuals with progressive neuromuscular diseases, such as Parkinson's disease, to experience increasing difficulty in swallowing initiation. Representative causes of oropharyngeal dysphagia include those associated neurological illnesses (brainstem tumors, head trauma, stroke, cerebral palsy, Guillain-Barre syndrome, Huntington's disease, multiple sclerosis, polio, post-polio syndrome, Tardive dyskinesia, metabolic encephalopathies, amyotrophic lateral sclerosis, Parkinson's disease, dementia), infectious illnesses (diphtheria, botulism, Lyme disease, syphilis, mucositis [herpetic, cytomegalovirus, candida, etc.]), autoimmune illnesses (lupus, scleroderma, Sjogren's syndrome), metabolic illnesses (amyloidosis, Cushing's syndrome, thyrotoxicosis, Wilson's disease), myopathic illnesses (connective tissue 15 disease, dermatomyositis, myasthenia gravis, myotonic dystrophy, oculopharyngeal dystrophy, polymyositis, sarcoidosis, paraneoplastic syndromes, inflammatory myopathy), iatrogenic illnesses (medication side effects [e.g., chemotherapy, neuroleptics, etc.], post surgical muscular or neurogenic, radiation therapy, corrosive [pill injury, intentional]), and structural illnesses (cricopharyngeal bar, Zenker's diverticulum, cervical webs, oropharyngeal tumors, osteophytes and skeletal abnormalities, congenital [cleft palate, diverticulae, pouches, etc.]).

Esophageal dysphagia can affect individuals of all ages. Esophageal dysphagia is generally treatable with medications and is considered a less serious form of dysphagia. Esophageal dysphagia is often a consequence of mucosal, mediastinal, or neuromuscular diseases. Mucosal (intrinsic) diseases narrow the lumen through inflammation, fibrosis, or neoplasia associated with various conditions (e.g., peptic stricture secondary to gastroesophageal reflux disease, esophageal rings and webs [e.g., sideropenic dysphagia or Plummer-Vinson syndrome], esophageal tumors, chemical injury [e.g., caustic ingestion, pill esophagitis, sclerotherapy for varices], radiation injury, infectious esophagitis, and eosinophilic esophagitis). Mediastinal (extrinsic) diseases obstruct the esophagus by direct invasion or through lymph node enlargement associated with various conditions (tumors [e.g., lung cancer, lymphoma], infections [e.g., tuberculosis, histoplasmosis], and cardiovascular [dilated auricula and vascular compression]). Neuromuscular diseases may affect the esophageal smooth muscle and its innervation, disrupting peristalsis or lower esophageal sphincter relaxation, or both, commonly associated with various conditions (achalasia [both idiopathic and associated with Chagas disease], scleroderma, other motility disorders, and a consequence of surgery [i.e., after fundoplication and antireflux interventions]). Individuals with intraluminal foreign bodies commonly experience acute esophageal dysphagia.

Functional dysphagia is defined in some patients wherein no organic cause for dysphagia can be found.

Dysphagia is not generally diagnosed. Dysphagia has major consequences on health and healthcare costs on individuals who suffer from dysphagia. Individuals who suffer from severe dysphagia experience a sensation of impaired passage of nutritional products from the mouth to the stomach, occurring immediately after swallowing. Among community dwelling individuals, perceived symptoms may bring the individuals who suffer from dysphagia to see a doctor. Among institutionalized individuals, health care practitioners may observe symptoms or hear comments from the individual who suffers from dysphagia or a family member suggestive of swallowing impairment and then recommend evaluation of the individual who suffers from dysphagia by a specialist. The general awareness of swallowing impairments is low among front-line practitioners, so dysphagia often is undiagnosed and untreated. Yet, a patient can be clinically evaluated and dysphagia diagnosis can be determined through referral to a swallowing specialist (e.g. speech language pathologist).

The general awareness of swallowing impairments is low among front-line practitioners. Many people (especially those who are elderly) suffer with undiagnosed and untreated swallowing impairments. One reason is that front-line community care practitioners (e.g., general practitioners/geriatricians, home care nurses, physical therapists, etc.) do not typically screen for the condition. If they are aware of the severity of swallowing impairments, they commonly do not use an evidence-based method of screening.

A severity of dysphagia may vary from: (i) minimal (perceived) difficulty in safely swallowing nutritional products, (ii) an inability to swallow nutritional products without significant risk for aspiration or choking, and (iii) a complete inability to swallow nutritional products. An inability to properly swallow nutritional products may be due to food boluses of the nutritional products being broken into smaller fragments, which may enter the airway or leave unwanted residues in the oropharyngeal and/or esophageal tract during the swallowing process (e.g., aspiration). If enough material enters the lungs, the patient may drown on the nutritional products that have accumulated in the lungs. Even small volumes of aspirated nutritional products may lead to bronchopneumonia infection, and chronic aspiration may lead to bronchiectasis and may cause some cases of asthma. Swallowing efficiency is linked to the amount of residues in the throat.

Silent aspiration is a common condition among the elderly and refers to the aspiration of the oropharyngeal contents during sleep. People may compensate for less-severe swallowing impairments by self-limiting the diet. The aging process itself, coupled with chronic diseases such as hypertension or osteoarthritis, predisposes the elderly to subclinical dysphagia that may go undiagnosed and untreated until a clinical complication such as pneumonia, dehydration, malnutrition and related complications occurs.

Dysphagia and aspiration impacts upon quality of life, morbidity and mortality. Twelve-month mortality is high (45%) among individuals in institutional care who have dysphagia and aspiration. The economic burden of the clinical consequences arising from lack of diagnosis and early management of dysphagia are therefore significant.

As noted, pneumonia is a common clinical consequence of dysphagia. Pneumonia may require acute hospitalisation and emergency room visits. Among those that develop pneumonia due to aspiration, the differential diagnosis of 'aspiration pneumonia' is not necessarily indicated as a result of current care practices. Based on U.S. healthcare utilisation surveys from recent years, pneumonia accounted for over one million hospital discharges and an additional 392,000 were attributable to aspiration pneumonia. Individuals who have general pneumonia as the principal diagnosis have a mean 6 day hospital length of stay and incur over $18,000 in costs for hospital care. It is expected that aspiration pneumonia would carry higher costs for hospital care, based on a mean 8 day length of hospital stay. Pneumonia is life threatening among persons with dysphagia, the odds of death within 3 months is about 50% (van der Steen et al. 2002). In addition, an acute insult such as pneumonia often initiates the downward spiral in health among elderly. An insult is associated with poor intakes and inactivity, resulting in malnutrition, functional decline, and frailty. Specific interventions (e.g., to promote oral health, help restore normal swallow, or reinforce a swallow-safe bolus) would benefit persons at risk for (due to aspiration of oropharyngeal contents, including silent aspiration) or experiencing recurrent pneumonia. Swallowing safety is linked to aspiration pneumonia, quantified on the Penetration-Aspiration Scale (PAS) or Rosenbek scale.

Similar to pneumonia, dehydration is a life-threatening clinical complication of dysphagia. Dehydration is a common co-morbidity among hospitalised individuals with neurodegenerative diseases (thus, likely to have a swallowing impairment). The conditions of Alzheimer's disease, Parkinson's disease, and multiple sclerosis account for nearly 400,000 U.S. hospital discharges annually, and up to 15% of these patients suffer dehydration. Having dehydration as the principal diagnosis is associated with a mean 4 day length of hospital stay and over $11,000 in costs for hospital care. Nevertheless, dehydration is an avoidable clinical complication of dysphagia.

Malnutrition and related complications (e.g., [urinary tract] infections, pressure ulcers, increased severity of dysphagia [need for more-restricted food options, tube feeding, and/or Percutaneous Endoscopic Gastrostomy (PEG) tube placement and reduced quality of life], dehydration, functional decline and related consequences [falls, dementia, frailty, loss of mobility, and loss of autonomy]) can arise when swallowing impairment leads to fear of choking on food and liquids, slowed rate of consumption, and self-limited food choices. If uncorrected, inadequate nutritional intake exacerbates dysphagia as the muscles that help facilitate normal swallow weaken as physiological reserves are depleted. Malnutrition is associated with having more than 3-times greater risk of infection. Infections are common in individuals with neurodegenerative diseases (thus, likely to have a chronic swallowing impairment that jeopardizes dietary adequacy). The conditions of Alzheimer's disease, Parkinson's disease, and multiple sclerosis account for nearly 400,000 U.S. hospital discharges annually, and up to 32% of these patients suffer urinary tract infection.

Malnutrition has serious implications for patient recovery. Malnourished patients have longer length of hospital stay, are more likely to be re-hospitalized, and have higher costs for hospital care. Having malnutrition as the principal diagnosis is associated with a mean 8 day length of hospital stay and nearly $22,000 in costs for hospital care. Furthermore, malnutrition leads to unintentional weight loss and predominant loss of muscle and strength, ultimately impairing mobility and the ability to care for oneself. With the loss of functionality, caregiver burden becomes generally more severe, necessitating informal caregivers, then formal caregivers, and then institutionalization. However, malnutrition is an avoidable clinical complication of dysphagia.

Among persons with neurodegenerative conditions (e.g., Alzheimer's disease), unintentional weight loss (a marker of malnutrition) precedes cognitive decline. In addition, physical activity can help stabilize cognitive health. Thus, nutritional adequacy is important among persons with neurodegenerative conditions to help them have the strength and endurance to participate in regular therapeutic exercise and guard against unintentional weight loss, muscle wasting, loss of physical and cognitive functionality, frailty, dementia, and progressive increase in caregiver burden.

Falls and related injuries are a special concern among elderly with neurodegenerative conditions, associated with loss of functionality. Falls are the leading cause of injury deaths among older adults. Furthermore, fall-related injuries among elderly accounted for more than 1.8M U.S. emergency room visits in a recent year. Direct medical costs totaled $179M for fatal and $19.3B for nonfatal fall-related injuries in the period of a year. As an effect of an ambitious non-payment for performance initiative introduced in U.S. hospitals in October 2008, Medicare will no longer pay hospitals for treatment cost of falls and related injuries that occur during the hospital stay. Hospitals will face a loss of about $50,000 for each elderly patient who falls and suffers hip fracture while in hospital care. This new quality initiative is based on the premise that falls are an avoidable medical error. In other words, falls are preventable within reason by applying evidence-based practices including medical nutrition therapy as nutritional interventions are efficacious in the prevention of falls and related injuries (e.g., fractures) among the elderly.

Chewing and swallowing difficulties are recognised risk factors for pressure ulcer development. Pressure ulcers are considered an avoidable medical error, preventable within reason by applying evidence-based practices (including nutritional care, as pressure ulcers are more likely when nutrition is inadequate). Pressure ulcers are a significant burden to the health care system. In U.S. hospitals in 2006, there were 322,946 cases of medical error connected with pressure ulcer development. The average cost of healing pressure ulcers depends on the stage, ranging from about $1,100 (for stage II) to about $10,000 (for stage III & IV pressure ulcers). Thus, the estimated cost of healing the cases of medical error connected with pressure ulcer development in one year, is in the range of $323M to $3.2B. As an effect of an ambitious non-payment for performance initiative introduced in U.S. hospitals in October 2008, Medicare will no longer pay hospitals for treatment cost of pressure ulcers that develop during the hospital stay (up to $3.2B annually). Pressure ulcers are preventable within reason, in part, by assuring nutritional intakes are adequate. Furthermore, specific interventions including the use of specialised nutritional supplements help reduce the expected time to heal pressure ulcers once they've developed.

These conditions as discussed above may result in social isolation of individuals who suffer from these conditions. Social isolation is a state of complete or near-complete lack of contact between an individual and society. It can be an issue for individuals of any age, though symptoms may differ by age group. Individuals with dysphagia often need being tube fed and/or require PEG placement and thus may need to stay home or in care facilities and/or hospitals for lengthy periods of time. They cannot experience the psycho-social aspects of nutritional products associated with general well-being due to lack of adequate swallowing ability, which can result in very negative psychological and/or emotional effects. These individuals may tend to have limited to no communication with family, acquaintances or friends, and/or willfully avoid any contact with other humans when those opportunities do arise because of their physical isolation and/or negative psychological and/or emotional state. Social isolation in turn can further lead to feelings of loneliness, fear of others, or negative self-esteem, which further aggravates the individuals' negative psychological and/or emotional state.

In U.S. long-term care facilities, quality of care standards are enforced via the frequent regulatory survey. Surveyors will consider facilities out of compliance when they uncover evidence of actual or potential harm/negative outcomes. The range of penalties includes fines, forced closure, as well as lawsuits and settlement fees. The Tag F325 (nutrition) survey considers significant unplanned weight change, inadequate food/fluid intake, impairment of anticipated wound healing, failure to provide a therapeutic diet as ordered, functional decline, and fluid/electrolyte imbalance as evidence for providing sub-standard nutritional care. The Tag F314 (pressure ulcers) survey mandates that the facility must ensure that a resident who is admitted without pressure ulcers does not develop pressure ulcers unless deemed unavoidable. In addition, that a resident having pressure ulcers receives necessary treatment and services to promote healing, prevent infection and prevent new pressure ulcers from developing.

Therefore considering the prevalence of dysphagia and the possible complications related thereto, and the costs associated with same, it would be beneficial to provide nutritional products that promote safer swallowing of boluses of the nutritional products in individuals who suffer from dysphagia. Such nutritional products would improve the lives of a large and growing number of individuals who suffer from dysphagia. Specific interventions (e.g., to promote oral health, help restore normal swallowing, or reinforce a swallow-safe bolus) can enable individuals to eat orally as opposed to being tube fed and/or requiring PEG placement) and experience the psycho-social aspects of nutritional products associated with general well-being while guarding against the potentially negative consequences that result from lack of adequate swallowing ability. Improvements in the intake of nutritional products by individuals who suffer from dysphagia may also enable such individuals to swallow a wider variety of nutritional products safely and comfortably, which may lead to an overall healthier condition of the individual and prevent further health-related decline. There is therefore a need to overcome the aforementioned drawbacks and to provide natural cohesiveness that saliva provides to food boluses of nutritional products when being consumed by an individual. Further, commercial products, such as high molecular weight beta-glucan, can be very expensive. Therefore, there is also a need to provide more affordable nutritional products.

SUMMARY

The present disclosure is related to a thickener formulated for dilution into a nutritional composition, a nutritional product including the thickener, a use of the nutritional product, a method for making the nutritional product, a method for improving the cohesiveness of the nutritional product, and a related system.

In a first aspect, the present disclosure provides a thickener comprising a beta-glucan and an additive, wherein the thickener is formulated for providing a nutritional product a relaxation time, determined by a Capillary Breakup Extensional Rheometry (CaBER) experiment, of more than 10 ms (milliseconds) at a temperature of 20° C. The additive may comprise a gum. The gum may comprise at least one of gum arabic, carrageenan lambda, carrageenan iota, carrageenan kappa, sodium alginate, konjac, locust bean gum, carboxymethyl cellulose (CMC), chitosan, inulin, pectin, acacia gum, hydroxypropyl methylcellulose (HPMC), tara gum, guar gum, or xanthan. A weight ratio of the beta-glucan and the additive may be from about 1:1 to about 1:10. The beta-glucan may have a molecular weight (MW) above about 1,200,000 Da. The thickener may be a powder or a concentrated gel.

In another aspect, the present disclosure provides a nutritional product comprising a diluent and further comprising a beta-glucan and an additive, the nutritional product having a relaxation time, determined by a Capillary Breakup Extensional Rheometry (CaBER) experiment, of more than 10 ms (milliseconds), preferably more than 50 ms, at a temperature of 20° C.

In a further aspect, the nutritional product is used for preventing, alleviating, and/or compensating swallowing dysfunction in a patient in need thereof.

In a further aspect, the nutritional product is used for promoting swallowing safety and/or efficiency of a nutritional product in a patient in need thereof.

In a further aspect, the nutritional product is used for mitigating a risk of aspiration during swallowing of a nutritional product in a patient in need thereof.

In another aspect, the present disclosure provides a method of making a nutritional product, the method comprising diluting an amount of a thickener into the nutritional composition, the thickener comprising a beta-glucan and an additive, the amount of the thickener that is diluted provides to the nutritional composition a relaxation time, determined by a Capillary Breakup Extensional Rheometry (CaBER) experiment, of more than 50 ms (milliseconds) at a temperature of 20° C.

In another aspect, the present disclosure provides a method of improving cohesiveness of a nutritional product, the method comprising diluting an amount of a thickener into the nutritional product, the thickener comprising a beta-glucan and an additive, the amount of the thickener that is diluted provides to the nutritional product a relaxation time, determined by a Capillary Breakup Extensional Rheometry (CaBER) experiment, of more than 50 ms (milliseconds) at a temperature of 20° C.

In another aspect, the present disclosure provides use of a thickener and a liquid in preparation of an orally administrable nutritional product consisting essentially of the thickener and the liquid, the liquid is suitable for consumption by an individual without dysphagia, the orally administrable nutritional product is suitable for administration to an individual having dysphagia, the thickener comprising a beta-glucan and an additive, the thickener provides to the nutritional product a relaxation time, determined by a Capillary Breakup Extensional Rheometry (CaBER) experiment, of more than 10 ms (milliseconds) at a temperature of 20° C.

In another aspect, the present disclosure provides a system for production of a homogenous single phase beverage for administration to an individual having dysphagia, the system comprising: a container containing a thickener comprising a beta-glucan and an additive, the thickener formulated for dilution into a nutritional product having a relaxation time, determined by a Capillary Breakup Extensional Rheometry (CaBER) experiment, of more than 10 ms (milliseconds) at a temperature of 20° C.; and a metering device connected to the container and configured to dispense an amount of the thickener that is approximately equal to a predetermined amount.

An advantage of one or more embodiments provided by the present disclosure is promoting both safer and more effective swallowing of boluses of a palatable nutritional product in an individual suffering from dysphagia.

For example, a starch-based product has decreased PAS and can be safe to swallow, but has high shear viscosity, which slows the flow of the liquid, and thus can be perceived as "sticky" by the patient. A starch-based product also has low cohesiveness, and the bolus can break up and thus has high risk of leaving residues in the throat. Such a product has low shear thinning and is hard to swallow and therefore, does not promote swallowing efficiency. A xanthan-based product has shear thinning and is easy to swallow and easier to clear; it glides throughout swallow without increased rates of residues; and it has decreased PAS and is safe to swallow. However, such a product also has high shear viscosity and can be perceived as "slimy," too viscous and not pleasant to consume.

In contrast, one or more embodiments provided by the present disclosure have enhanced bolus cohesiveness, which prevents spillage and promotes swallowing safety; and the high cohesiveness improves bolus integrity and prevents bolus breakup, and thus avoids residues in the throat, which promotes swallowing efficiency. In the one or more embodiments provided by the present disclosure, viscosity is substituted by cohesiveness, which makes the nutritional product more palatable to the patient because it can have the same behavior as saliva and thus is perceived as more natural and is easy to swallow.

However, cohesive ingredients can be extremely expensive. The present disclosure provides more economic products that still have full rheological characteristics of cohesiveness but without significant increase in viscosity and thus more palatable than existing products, such as those xanthan based products. For example, ingredients that "boost" cohesiveness may be included in one or more embodiments provided by the present disclosure.

Another advantage of one or more embodiments provided by the present disclosure is reducing the cost of the nutritional product for swallowing safety and efficiency, for example, by replacing at least a portion of an expensive ingredient with cheaper ingredients. For example, beta-glucan has been proven to improve swallowing safety and efficiency clinically. However, beta-glucan is very expensive. By doping the beta-glucan with certain additives according to the present disclosure, the cost of the nutritional product can be reduced while limiting the increase in viscosity.

Another advantage of one or more embodiments provided by the present disclosure is improving the cohesiveness of the nutritional product for safer swallowing while at the same time minimizing undesirable attendant increase in viscosity of such a nutritional product. The cohesiveness "replaces" the viscosity property as some thickened nutritional products may not be very palatable, which may result in a compliance issue. For example, cohesiveness is achieved by using beta-glucan. According to one or more embodiments provided by the present disclosure, doping the beta-glucan with additives, such as proteins and/or gums, may increase the cohesiveness without increasing the viscosity significantly. Certain gums and combinations of gums may surprisingly increase the cohesiveness dramatically.

Another advantage of one or more embodiments provided by the present disclosure is to improve the lives of a large and growing number of individuals who suffer from dysphagia.

Yet another advantage of one or more embodiments provided by the present disclosure is to support specific interventions (e.g., to promote oral health, help restore normal swallowing, or reinforce a swallow-safe bolus) that can enable individuals to eat orally instead of being tube fed and/or requiring PEG placement and experience the psychosocial aspects of nutritional products associated with general well-being while guarding against the potentially negative consequences that result from lack of adequate swallowing ability, and therefore, prevent social isolation.

Still another advantage of one or more embodiments provided by the present disclosure is to improve the intake of nutritional products by individuals who suffer from dysphagia and thus enable such individuals to swallow a wider variety of nutritional products safely and comfortably, which may lead to an overall healthier condition of the individual and prevent further health-related decline.

Furthermore, another advantage of one or more embodiments provided by the present disclosure is to provide natural cohesiveness that saliva typically provides to food boluses of nutritional products when being consumed by an individual. One or more embodiments of the present disclosure may provide even better cohesiveness than saliva.

Moreover, another advantage of one or more embodiments provided by the present disclosure is to modify rheological properties of a nutritional product to prevent bolus penetration and aspiration.

Another advantage of one or more embodiments provided by the present disclosure is a nutritional product having cohesiveness akin to saliva produced in the mouth and thus providing a more natural sensation to individuals who suffer from dysphagia.

Yet another advantage of one or more embodiments provided by the present disclosure is a nutritional product devoid of the thickened sensation from conventional thickeners because one or more embodiments provided by the present disclosure leave no residue in the mouth of the individuals who suffer from dysphagia. This advantage is particularly relevant for liquid products that are intended to maintain their thin liquid properties.

Still another advantage of one or more embodiments provided by the present disclosure is a nutritional product having organoleptic properties superior to known thickened nutritional products.

Furthermore, another advantage of one or more embodiments provided by the present disclosure is improved cohesiveness of food boluses to prevent a food bolus from being broken into smaller fragments which may enter the airway or leave unwanted residues in the oropharyngeal and/or esophageal tract during the swallowing process.

Moreover, another advantage of one or more embodiments provided by the present disclosure is reduction of swallowing effort for individuals who suffer from dysphagia.

Another advantage of one or more embodiments provided by the present disclosure is reduced risk of residue build-up in the oropharyngeal and/or esophageal tracts of a dysphagia patient.

Yet another advantage of one or more embodiments provided by the present disclosure is increased cohesiveness and improved nutritional intake for individuals who suffer from dysphagia by enabling the individuals to swallow a wider variety of food and beverage products safely and comfortably, e.g., by improving bolus integrity ("cohesiveness") and thus lending confidence to the individuals who suffer from dysphagia that the individual is able to consume a wider range of products.

Still another advantage of one or more embodiments provided by the present disclosure is improved ability and efficiency to swallow and thus improved safety through reduced risk of pulmonary aspiration.

Furthermore, another advantage of one or more embodiments provided by the present disclosure is greater independence from feeding assistance and/or reduced length of time spent in feeding-assistance during meal consumption.

Additional features and advantages are described herein and will be apparent from the following Figures and Detailed Description.

BRIEF DESCRIPTION OF THE FIGURES

FIG. 6 shows more stringiness results of Naturex™ beta-glucan mixed with two other different gums.

FIG. 7 shows the relaxation time results of Naturex™ beta-glucan alone, mixed with CMC, and mixed with CMC and another different gum.

FIG. 8 shows the multi-probe texture analyzer used for investigating the rheological behavior of the samples.

FIG. 12 shows the combinations in FIG. 10 but with different weight ratios, namely, 3:1:2 and 3:2:1.

FIG. 13 shows sample mixtures of Naturex™ beta-glucan, HPMC, and Carrageenan Iota or Kappa with different weight ratios and different total solids content.

FIG. 15 shows the stringiness results of different mixtures of the Naturex™ oat extract supernatant and two or three different gums.

FIG. 16 shows the viscosity results of Naturex™ beta-glucan alone or mixed with different gums in reference to Nestle ThickenUp Clear™, which has nectar-like consistency.

FIG. 17 shows the viscosity results of the mixture of Naturex™ oat extract supernatant (1%) and a combination of HPMC, Locust Bean, and Carrageenan Iota in a weight ratio of 1:8:6.

FIG. 20 shows the stringiness results of different mixtures of a Naturex™ extract supernatant and three different gums.

FIG. 21 shows the CaBER results of some of the samples in FIG. 2.

FIG. 22 shows the stringiness results of more mixtures of β-Glucan with three different gums.

FIG. 23 shows the stringiness results of samples D21, G33, G7, G28, and G38.

FIG. 24 shows the stringiness results of different compositions of the G33 combination of Naturex™ oat extract supernatant (1%), HPMC, Konjac, and Sodium Alginate.

FIG. 25 shows the stringiness results of different compositions of Naturex™ oat extract supernatant (1%), HPMC, Konjac, and Sodium Alginate.

FIG. 26 shows the CaBER results of some of the samples in the examples in comparison to references samples.

FIG. 28 shows the CaBER analysis of some of the samples in the examples in comparison to references samples.

DETAILED DESCRIPTION

Figure 1:
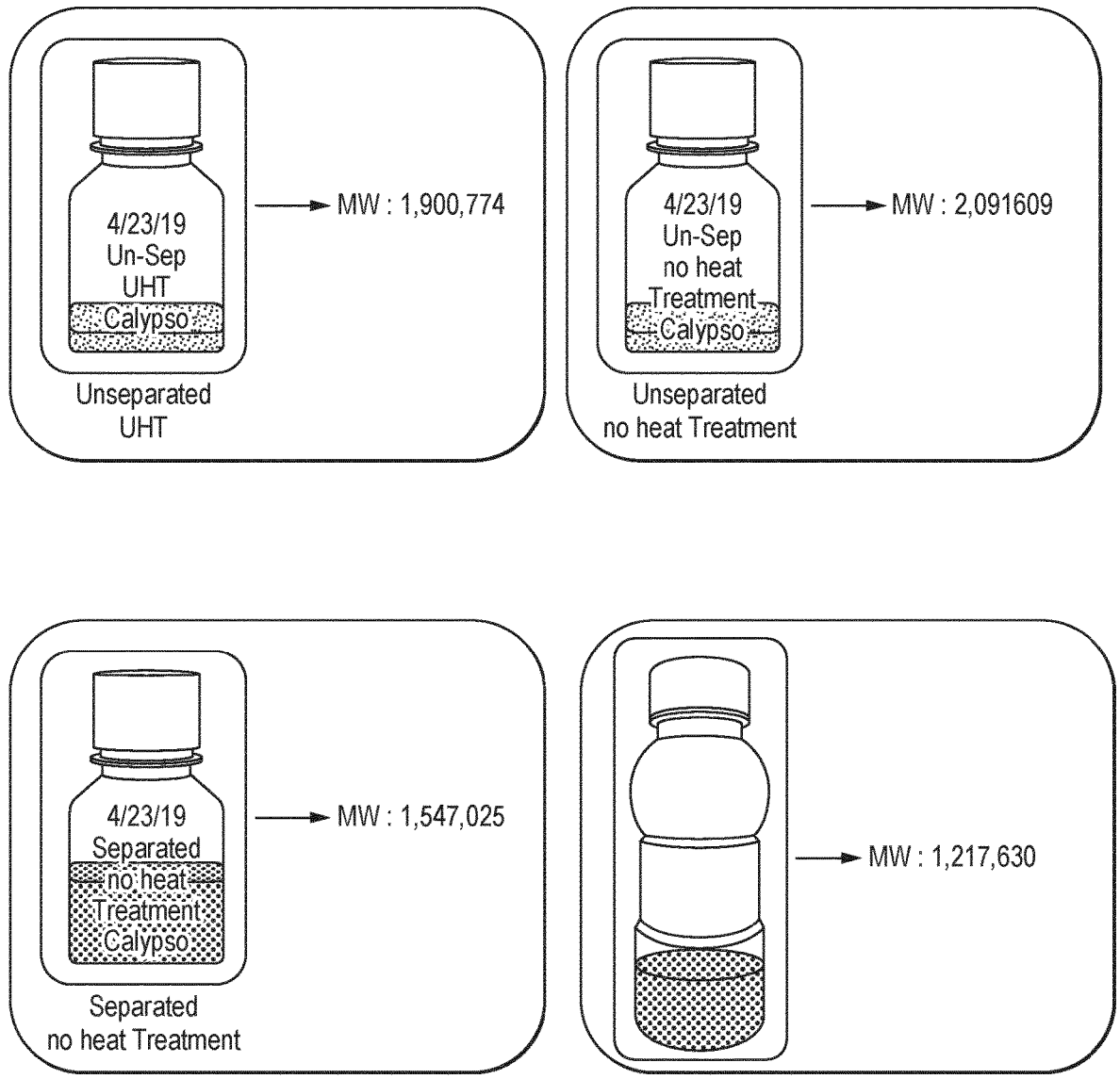
FIG. 1 shows examples of beta-glucan samples used in this disclosure.
Figure 1:
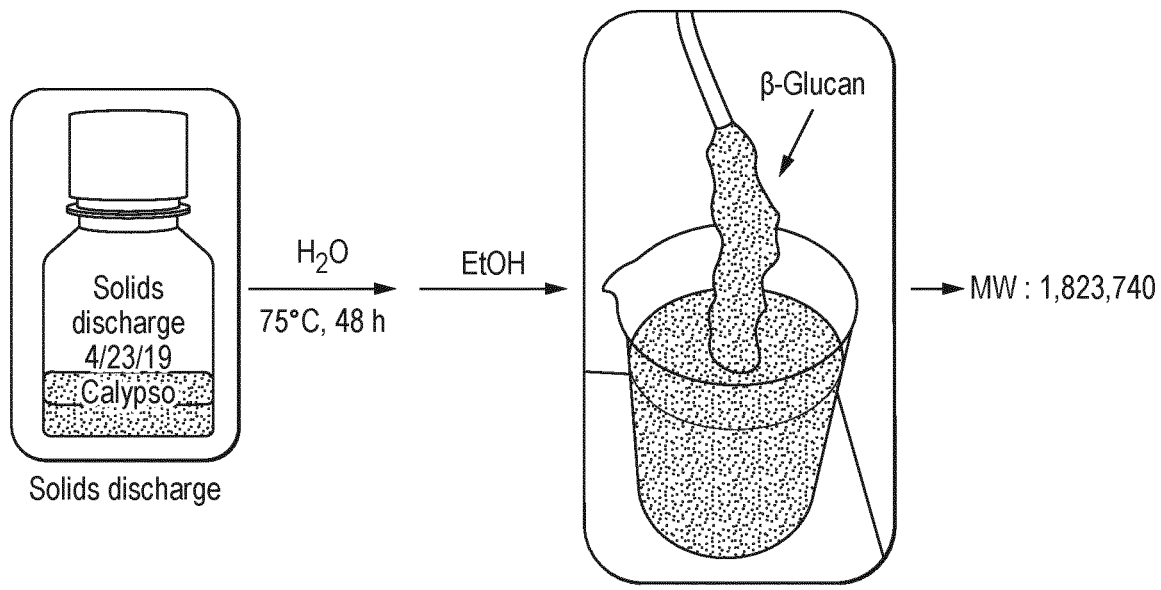

The various aspects and embodiments according to the present disclosure, as set forth herein, are illustrative of the specific ways to make and use the invention and do not limit the scope of invention when taken into consideration with the claims and the detailed description. It will also be appreciated that features from aspects and embodiments of the invention may be combined with further features from the same or different aspects and embodiments of the invention.

As used in this detailed description and the appended claims, the singular forms "a," "an" and "the" include plural referents unless the context clearly dictates otherwise. For example, reference to "an ingredient" or "a method" includes a plurality of such "ingredients" or "methods." The term "and/or" used in the context of "X and/or Y" should be interpreted as "X," or "Y," or "X and Y." Similarly, "at least one of X or Y" should be interpreted as "X," or "Y," or "both X and Y." Similarly, the words "comprise," "comprises," and "comprising" are to be interpreted inclusively rather than exclusively. Likewise, the terms "include," "including" and "or" should all be construed to be inclusive, unless such a construction is clearly prohibited from the context. However, the embodiments provided by the present disclosure may lack any element that is not specifically disclosed herein. Thus, a disclosure of an embodiment defined using the term "comprising" is also a disclosure of embodiments "consisting essentially of" and "consisting of" the disclosed components. "Consisting essentially of" means that the embodiment or component thereof comprises more than 50 wt. % of the individually identified components, preferably at least 75 wt. % of the individually identified components, more preferably at least 85 wt. % of the individually identified components, most preferably at least 95 wt. % of the individually identified components, for example at least 99 wt. % of the individually identified components.

All ranges described are intended to include all numbers, whole or fractions, contained within the said range. As used herein, "about," "approximately" and "substantially" are understood to refer to numbers in a range of numerals, for example the range of −10% to +10% of the referenced number, preferably −5% to +5% of the referenced number, more preferably −1% to +1% of the referenced number, most preferably −0.1% to +0.1% of the referenced number. Moreover, these numerical ranges should be construed as providing support for a claim directed to any number or subset of numbers in that range. For example, a disclosure of from 1 to 10 should be construed as supporting a range of from 1 to 8, from 3 to 7, from 1 to 9, from 3.6 to 4.6, from 3.5 to 9.9, and so forth. As used herein, wt. % refers to the weight of a particular component relative to total weight of the referenced composition.

In a first aspect, a thickener may comprise a beta-glucan and an additive. The additive and the beta-glucan may have a weight ratio of up to about 1:1, for example, from about 10:1 to about 1:1. The additive may comprise a protein and/or a gum and/or a stabilizer. The thickener is formulated for dilution in a diluent to form a nutritional product. The amount of the thickener may provide to the nutritional product a relaxation time, determined by a Capillary Breakup Extensional Rheometry (CaBER) experiment, of more than 10 ms, preferably more than 50 ms, such as from 50 ms to 450 ms, more preferably more than 100 ms, such as from 100 ms to 450 ms, most preferably more than 400 ms, such as from 400 ms to 450 ms, at a temperature of 20° C. The amount of the thickener may provide to the nutritional product a shear viscosity up to about 2,000 mPas, preferably up to about 500 mPas, more preferably up to about 200 mPas, most preferably up to about 50 mPas, all values measured at a shear rate of 50 s$^{-1}$ at 20° C.

It is appreciated that measurement of shear viscosity can be performed at a different shear rate, for example another shear rate from 0 to 100 s$^{-1}$, or at different temperature, for example another temperature from 0 to 100° C.; nevertheless, such measurements must be related back to the standard conditions of 50 s$^{-1}$ at 20° C. disclosed herein.

The thickener can be a power or a liquid concentrate of the powder. As used herein, a "powder" is a solid that is formulated to be diluted before administration. Further in this regard, the powders disclosed herein are only administered after addition of another ingredient, such as a liquid diluent, preferably water. A "liquid concentrate" is a liquid that is formulated to be diluted before administration. Further in this regard, the liquid concentrates disclosed herein are only administered after addition of another ingredient, such as a liquid diluent, preferably water.

As used herein, the term "nutritional product" refers to a nutritional composition for oral administration by an individual who suffers from dysphagia. The nutritional product is envisaged for supplemental nutrition, for hydration, or for replacement of one or more full meals of the individual who suffers from dysphagia. The nutritional product is also understood to include any number of optional ingredients (e.g., ingredients additional to the liquid concentrate from which the nutritional product is made). Non-limiting examples of suitable optional ingredients include conventional food additives, for example one or more, acidulants, additional thickeners, buffers or agents for pH adjustment, chelating agents, colorants, emulsifiers, excipient, flavour agent, minerals, osmotic agents, a pharmaceutically acceptable carrier, preservatives, stabilisers, sugar(s), sweetener (s), texturiser(s), and/or vitamin(s). The optional ingredients can be added in any suitable amount. Preferably, the liquid concentrate is a homogeneous single phase liquid comprising water, and preferably the nutritional product is a homogeneous single phase beverage comprising water. Nevertheless, the present disclosure is not limited to a specific embodiment of the nutritional product. Furthermore, the present disclosure is not limited to a specific embodiment of the diluent in which the liquid concentrate is reconstituted, and the diluent can be any liquid suitable for consumption by an animal or human.

A "ready to drink" beverage or "RTD" beverage is a beverage in liquid form that can be consumed without further addition of liquid. Preferably an RTD beverage is aseptic. An "oral nutrition supplement" or "ONS" is a composition comprising at least one macronutrient and/or at least one micro nutrient, for example in a form of sterile liquids, semi-solids or powders, and intended to supplement other nutritional intake such as that from food. Non-limiting examples of commercially available ONS products include, for example, MERITENE®, BOOST®, NUTREN® SUSTAGEN®, RESOURCE®, and CLINUTREN®. The term "unit dosage form," as used herein, refers to physically discrete units suitable as unitary dosages for human and animal subjects, each unit containing a predetermined quantity of the composition disclosed herein in an amount sufficient to produce the desired effect, preferably in association with a pharmaceutically acceptable diluent, carrier or vehicle. The specifications for the unit dosage form depend on the particular compounds employed, the effect to be achieved, and the pharmacodynamics associated with each compound in the host. In an embodiment, the unit dosage form can be a predetermined amount of liquid concentrate dispensed by a dispenser or housed within a container such as a pouch.

The term individual refers to any human, animal, mammal or who suffers from dysphagia that can benefit from the nutritional product. It is to be appreciated that animal includes, but is not limited to, mammals. Mammal includes, but is not limited to, rodents, aquatic mammals, domestic animals such as dogs and cats, farm animals such as sheep, pigs, cows and horses, and humans.

As used herein, an "effective amount" is an amount that prevents a deficiency, treats a disease or medical condition in an individual or, more generally, reduces symptoms, manages progression of the diseases or provides a nutritional, physiological, or medical benefit to the individual. The relative terms "promote," "improve," "increase," "enhance" and the like refer to the effects of a nutritional product comprising the thickener disclosed herein relative to a nutritional product lacking the thickener, but otherwise identical.

As used herein, a beta-glucan (β-glucan) refers to homopolysaccharides of D-glucopyranose monomers linked by (1→3), (1→4)-β-glycosidic bonds. A beta-glucan is derivable from plant or microbial origin, e.g. from oat or barley, by methods known to the skilled person, for example as described by Lazaridou et al. in 'A comparative study on structure-function relations of mixed-linkage (1→3), (1→4) linear β-D-glucans' in Food Hydrocolloids, 18 (2004), 837-855. The beta-glucan may have a molecular weight (MW) above about 1,200,000 Da, for example, from about 1,200,000 Da to about 2,500,000 Da, preferably, from about 1,200,000 Da to about 1,500,000 Da, from about 1,200,000 Da to about 1,800,000 Da, from about 1,200,000 Da to about 1,900,000 Da, from about 1,200,000 Da to about 2,000,000 Da, more preferably from about 1,500,000 Da to about 1,800,000 Da, from about 1,500,000 Da to about 1,900,000 Da, from about 1,500,000 Da to about 2,000,000 Da, from about 1,500,000 Da to about 2,100,000 Da, even more preferably about 1,800,000 Da to about 1,900,000 Da, from about 1,800,000 Da to about 2,000,000 Da, from about 1,800,000 Da to about 2,100,000 Da, from about 1,900,000 Da to about 2,000,000 Da, from about 1,900,000 Da to about 2,500,000 Da, from about 2,000,000 Da to about 2,500,000 Da. The beta-glucan having a MW from about 1,200,000 Da to about 1,600,000 Da can be non-cohesive, and the beta-glucan having a MW from about 1,800,000 Da to about 2,500,000 Da can be cohesive, as measured by their relaxation times. Additionally or alternatively to the beta-glucan, the thickener may comprise a plant-extracted gum selected from the group consisting of okra gum, konjac mannan, tara gum, locust bean gum, guar gum, fenugreek gum, tamarind gum, cassia gum, acacia gum, gum ghatti, pectins, cellulosics, tragacanth gum, karaya gum, and combinations thereof; and/or a plant-derived mucilages selected from the group consisting of cactus mucilage, psyllium mucilage, mallow mucilage, flax seed mucilage, marshmallow mucilage, ribwort mucilage, mullein mucilage, cetraria mucilage, and combinations thereof.

In some embodiments, the thickener may comprise the beta-glucan and a gum or stabilizer such as preferably gum arabic, carrageenan (lambda), carrageenan (iota), carrageenan (kappa), sodium alginate, konjac, locust bean gum, carboxymethyl cellulose (CMC), chitosan, inulin, pectin (from citrus), pectin (from apple), acacia gum, hydroxypropyl methylcellulose (HPMC), tara gum, guar gum, xanthan, and combinations thereof.

Hypromellose, short for hydroxypropyl methylcellulose (HPMC), is a semisynthetic, inert, viscoelastic polymer used as eye drops, as well as an excipient and controlled-delivery component in oral medicaments, found in a variety of commercial products. It is also used in gluten free products.

In an embodiment, the thickener may comprise a combination of beta-glucan, CMC, and locust bean gum. In another embodiment, the thickener may comprise a combination of beta-glucan, CMC, and guar gum. In another embodiment, the thickener may comprise a combination of beta-glucan, HPMC, and one of carrageenan (iota) or carrageenan (kappa). In yet another embodiment, the thickener may comprise a combination of beta-glucan, HPMC, guar gum, and carrageenan (iota). In yet another embodiment, the thickener may comprise a combination of beta-glucan, HPMC, guar gum, and carrageenan (lambda). In yet another embodiment, the thickener may comprise a combination of beta-glucan, HPMC, locust bean gum, and one of carrageenan (kappa), konjac, guar gum, or tara gum. In yet another embodiment, the thickener may comprise a combination of beta-glucan, HPMC, locust bean gum, and carrageenan (iota).

In an embodiment, the thickener may comprise the beta-glucan, the CMC, and the guar gum in a weight ratio from about 5:2:3 to about 2:1:1, for example, from about 3:1:2 to about 5:2:3, from about 3:1:2 to about 2:1:1 preferably about 3:1:2, about 5:2:3, and about 2:1:1. It is understood that, when comparing 2 ratios, the phrase "a:b:c to d:e:f includes all variations within the ranges a to d; b to e and c to f, in any combinations. When comparing 3 ratios or more, the phrase "a:b:c to d:e:f and g:h:i includes all variations within the ranges a to d; b to e and c to f, a to g; b to h; c to i; d to g; e to h and f to i, in any combinations.

In an embodiment, the thickener may comprise the beta-glucan, the CMC, and the tara gum in a weight ratio from about 10:3:7 to about 2:1:1. In an embodiment, the thickener may comprise the beta-glucan, the CMC, and the locust bean gum in a weight ratio from about 10:3:7 to about 2:1:1, for example, from about 10:3:7 to about 3:1:2, from about 3:1:2 to about 2:1:1, about 10:3:7, about 3:1:2, and about 2:1:1.

In an embodiment, the thickener may comprise the beta-glucan, the locust bean gum, and the guar gum in a weight ratio of about 5:2:3. In an embodiment, the thickener may comprise the beta-glucan, the tara gum, and the guar gum in a weight ratio of about 5:3:2. In an embodiment, the thickener may comprise the beta-glucan, the HPMC, and the one of carrageenan (iota) or carrageenan (kappa) in a weight ratio from about 3:1:2 to about 3:2:1, for example, from about 3:1:2 to about 2:1:1, from about 2:1:1 to about 3:2:1 about 2:1:1, about 3:1:2, and about 3:2:1.

In an embodiment, the thickener may comprise the beta-glucan, HPMC, guar gum, and one of carrageenan (kappa), carrageenan (lambda), konjac, or locust bean gum, wherein the HPMC, the guar gum, and the one of carrageenan (kappa), carrageenan (lambda), konjac, or locust bean gum are in a weight ratio from about 1:2:3 to about 1:6:8.

In an embodiment, the thickener may comprise the beta-glucan, HPMC, locust bean gum, and one of carrageenan (iota), carrageenan (kappa), or tara gum, wherein the HPMC, the locust bean gum, and the one of carrageenan (iota), carrageenan (kappa), or tara gum are in a weight ratio from about 1:6:8 to about 1:8:6. The ranges described herein include all variations between the two end points.

In an embodiment, the additive may comprise HPMC and carrageenan kappa. A weight ratio of the beta-glucan, the HPMC, and the carrageenan kappa may be from about 3:1:2 to about 3:2:1, preferably about 2:1:1.

In an embodiment, the additive may comprise HPMC, guar gum, and at least one of carrageenan kappa, carrageenan lambda, konjac, or locust bean gum. A weight ratio of the HPMC, the guar gum, and the at least one of kappa carrageenan, lambda carrageenan, konjac, or locust bean gum may be from about 1:2:3 to about 1:6:8. The additive may comprise HPMC, guar gum, and locust bean gum in a weight ratio of about 1:6:8.

In an embodiment, the additive may comprise HPMC, locust bean gum, and at least one of carrageenan iota, carrageenan kappa, or tara gum. A weight ratio of the HPMC, the locust bean gum, and the at least one of carrageenan iota, carrageenan kappa, or tara gum may be from about 1:6:8 to about 1:8:6.

In an embodiment, the additive may comprise a combination of HPMC, locust bean gum, and carrageenan iota. A weight ratio of the HPMC, the locust bean gum, and the carrageenan iota may be from about 1:4:10 to about 1:10:4, preferably about 1:6:8, about 1:8:6, or about 1:10:4.

In an embodiment, the additive may comprise a combination of HPMC, tara gum, and at least one of carrageenan kappa, konjac, or locust bean gum. A weight ratio of the HPMC, the tara gum, and the at least one of carrageenan kappa, konjac, or locust bean gum may be about 1:8:6.

In an embodiment, the additive may comprise a combination of HPMC, tara gum, and konjac. A weight ratio of the HPMC, the tara gum, and the konjac is from about 1:4:10 to about 1:10:4, preferably about 1:7:7.

In an embodiment, the additive may comprise a combination of HPMC, carrageenan kappa, and at least one of konjac or locust bean gum. A weight ratio of the HPMC, the carrageenan kappa, and the at least one of konjac or locust bean gum may be about 1:8:6.

In an embodiment, the additive may comprise a combination of HPMC, konjac, and at least one of carrageenan kappa, sodium alginate, or locust bean gum. A weight ratio of the HPMC, the konjac, and the at least one of carrageenan kappa, sodium alginate, or locust bean gum may be about 1:8:6.

In an embodiment, the additive may comprise a combination of HPMC, konjac, and sodium alginate. A weight ratio of the HPMC, the konjac, and the sodium alginate may be from about 1:4:10 to about 1:13:1, preferably about 1:8:6 or about 1:10:4.

In an embodiment, the additive may comprise a combination of HPMC, konjac, and carrageenan kappa. A weight ratio of the HPMC, the konjac, and the carrageenan kappa may be from about 1:4:10 to about 1:10:4, preferably about 1:10:4.

In an embodiment, the additive may comprise a combination of HPMC, konjac, and locust bean gum. A weight ratio of the HPMC, the konjac, and the locust bean gum may be from about 1:4:10 to about 1:10:4, preferably about 1:7:7.

In an embodiment, the additive may comprise a combination of HPMC, konjac, sodium alginate, and at least one of carrageenan kappa or locus bean gum. A weight ratio of the HPMC, the konjac, the sodium alginate, and the at least one of carrageenan kappa or locus bean gum may be from about 1:10:2:2 to about 1:10:3:1.

In some embodiments, the liquid nutritional product may have a total solids content up to 1%, preferably from about 0.2% to about 0.75%, for example, from about 0.2% to about 0.3%, from about 0.2% to about 0.5%, from about 0.3% to about 0.5%, from about 0.3% to about 0.75%, from about 0.5% to about 0.75%, and about 0.75%. As used herein, the total solids content is measured by assuming 100% dry matter of powder (no moisture). For example, a liquid obtained by dissolving about 0.03 g dry powder (no moisture) in about 4 grams of water would have a total solids content of about 0.75%.

As used herein, the feature "bolus" includes any entity of the nutritional product formed in the mouth in preparation for swallowing. The bolus may be of any shape, size, composition and/or texture, and thus it may also be a liquid.

A shear flow is a flow of a solution in which parallel planes are displaced in a direction parallel to each other. Shear viscosity is a measurable rheological property. Shear viscosity, often referred to as viscosity, describes the action of a material to applied shear stress. In other words, shear stress is the ratio between "stress" (force per unit area) exerted on the surface of a fluid, in the lateral or horizontal direction, to the change in velocity of the fluid as you move down in the fluid (a "velocity gradient"). Shear viscosity of a nutritional product can be determined by any method that can accurately control the shear rate applied to the product and simultaneously determine the shear stress or vice versa. Often used are rheometers which generally impose a specific stress field or deformation to the fluid and monitor the resultant deformation or stress. These instruments may operate in steady flow or oscillatory flow, as well as shear. Standard methods include the use of concentric cylinders, cone-and-plate and plate-plate geometries.

Another rheological property of a material is its extensional viscosity. An extensional flow is the behavior of a solution to resist extension and return to a coil structure while being squeezed or pulled. Extensional viscosity is the ratio of the stress required to extend a liquid in its flow direction to the extension rate. Extensional viscosity coefficients are widely used for characterising polymers, where they cannot be simply calculated or estimated from the shear viscosity.

Extensional viscosity is often measured by the relaxation time determined using the Capillary Breakup Extensional Rheometer (CaBER), which is an example for a rheometer applying extensional stress. During the CaBER experiment as performed herein for measuring the relaxation time of the nutritional product, a drop of said product is placed between two vertically aligned and parallel circular metal surfaces, both having a diameter of 6 mm. The metal surfaces are then rapidly separated linearly over a time interval of 50 ms. The filament formed by this stretching action subsequently thins under the action of interfacial tension and the thinning process is followed quantitatively using a digital camera and/or laser sheet measuring the filament diameter at its mid-point. The relaxation time in a CaBER experiment is determined by plotting the normalised natural logarithm of the filament diameter during the thinning process versus time and determining the slope of the linear portion ($d_{ln}(D/D_0)/d_t$) of this curve, where D is the filament diameter, Do the filament diameter at time zero and t the time of filament thinning. The relaxation time in this context is then defined as minus one third (-⅓) times the inverse of this slope, i.e. $-1/(3\ d_{ln}(D/D_0)/d_t)$.

The cohesion or cohesiveness of a nutritional product or a bolus thereof is the ability of the nutritional product or the bolus thereof to bind and stay together in the oral cavity and through the swallowing process. It may be measured by the "stringiness" of the nutritional product or the bolus thereof, which is a proxy of and directly related to the relaxation time. It is preferred that in the present nutritional product, the relaxation time is from 10 ms to 2000 ms, preferably from 20 ms to 1000 ms, likewise preferably from 50 ms to 450 ms, from 100 ms to 2000 ms, from 100 ms to 450 ms, and more preferably from 400 ms to 2000 ms, from 400 ms to 450 ms, each at a temperature of 20° C.

Moreover, in a preferred embodiment, a filament diameter of the nutritional product decreases less than linearly, and preferably exponentially in time during the CaBER experiment. The filament diameter can be measured using a digital camera and/or laser sheet measuring device.

In some embodiments, the nutritional product may further comprise a diluent to dissolve the thickener. The diluent can be one or more of water, milk, a beverage comprising water and further comprising at least one component additional to the water, a liquid oral nutritional supplement (ONS), or a food product. The dilution of the thickener in the diluent directly forms the nutritional product such that the nutritional product consists essentially of or consists of the diluent and the thickener. In some embodiments, the dilution of the thickener in the diluent forms an aqueous solution followed by addition of the aqueous solution to at least one other orally administrable composition to form the nutritional product, such that the nutritional product consists essentially of or consists of the diluent, the thickener, and the at least one other orally administrable composition. In some embodiments, the nutritional product is a ready-to-drink beverage.

In some embodiments, the nutritional product is in a unit dosage form comprising an amount of the thickening component effective for administration of the nutritional product to an individual who suffers from dysphagia to achieve at least one of (i) supplemental nutrition, (ii) hydration and (ii) replacement of one or more full meals.

The nutritional product may furthermore comprise one or more of a protein, a fat, a fiber, a carbohydrate, a prebiotic, a probiotic, an amino acid, a fatty acid, a phytonutrient, an antioxidant, and/or combinations thereof.

The protein can be a dairy-based protein, a plant-based protein or an animal-based protein or any combination thereof. Dairy-based proteins include, for example, casein, caseinates (e.g., all forms including sodium, calcium, potassium caseinates), casein hydrolysates, whey (e.g., all forms including concentrate, isolate, demineralized), whey hydrolysates, milk protein concentrate, and milk protein isolate. Plant-based proteins include, for example, soy protein (e.g., all forms including concentrate and isolate), pea protein (e.g., all forms including concentrate and isolate), canola protein (e.g., all forms including concentrate and isolate), other plant proteins that commercially are wheat and fractionated wheat proteins, corn and it fractions including zein, rice, oat, potato, peanut, green pea powder, green bean powder, and any proteins derived from beans, lentils, and pulses. Animal-based proteins may be selected from the group consisting of beef, poultry, fish, lamb, seafood, or combinations thereof. Preferably, the protein is at least one of rice protein or lentil protein.

The fat can be vegetable fat (such as olive oil, corn oil, sunflower oil, rapeseed oil, hazelnut oil, soy oil, palm oil, coconut oil, canola oil, lecithins, and the like), animal fat (such as milk fat) or any combinations thereof.

The fiber can be a fiber blend that may contain a mixture of soluble and insoluble fiber. Soluble fibers may include, for example, fructooligosaccharides, acacia gum, inulin, and the like. Insoluble fibers may include, for example, pea outer fiber.

The carbohydrate can comprise sucrose, lactose, glucose, fructose, corn syrup solids, maltodextrin, modified starch, amylose starch, tapioca starch, corn starch or any combinations thereof.

The nutritional product can comprise at least one the following prebiotics or any combination thereof: acacia gum, alpha glucan, arabinogalactans, dextrans, fructooligosaccharides, fucosyllactose, galactooligosaccharides, galactomannans, gentiooligosaccharides, glucooligosaccharides, guar gum, inulin, isomalto-oligosaccharides, lactoneotetraose, lactosucrose, lactulose, levan, maltodextrins, milk oligosaccharides, partially hydrolyzed guar gum, pecticoligosaccharides, resistant starches, retrograded starch, sialooligosaccharides, sialyllactose, soyoligosaccharides, sugar alcohols, xylooligosaccharides, or their hydrolysates, or combinations thereof. The prebiotic is a food substance that selectively promotes the growth of beneficial bacteria or inhibits the growth or mucosal adhesion of pathogenic bacteria in the intestines. The prebiotic are not inactivated in the stomach and/or upper intestine or absorbed in the gastrointestinal tract of the individual ingesting them, but they are fermented by the gastrointestinal microflora and/or by probiotics.

The nutritional product can comprise at least one probiotic. Probiotics are food-grade microorganisms (alive, including semi-viable or weakened, and/or non-replicating), metabolites, microbial cell preparations or components of microbial cells that could confer health benefits on a host when administered, more specifically probiotics beneficially affect the host by improving intestinal microbial balance, leading to effects on the health or well-being of the host. In general, it is believed that these probiotics inhibit or influence the growth and/or metabolism of pathogenic bacteria in the intestinal tract. The probiotics may also activate the immune function of the host. The probiotics may include *Aerococcus, Aspergillus, Bacillus, Bacteroides, Bifidobacterium, Candida, Clostridium, Debaromyces, Enterococcus, Fusobacterium, Lactobacillus, Lactococcus, Leuconostoc, Melissococcus, Micrococcus, Mucor, Oenococcus, Pediococcus, Penicillium, Peptostrepococcus, Pichia, Propionibacterium, Pseudocatenulatum, Rhizopus, Saccharomyces, Staphylococcus, Streptococcus, Torulopsis, Weissella*, or any combination thereof.

The nutritional product may comprise a synbiotic. A synbiotic is a supplement that comprises both a prebiotic (at least one of the aforementioned) and a probiotic (at least one of the aforementioned) that work together to improve the microflora of the intestine.

The nutritional product can comprise at least one the following amino acids or any combination thereof: alanine, arginine, asparagine, aspartate, citrulline, cysteine, glutamate, glutamine, glycine, histidine, hydroxyproline, hydroxyserine, hydroxytyrosine, hydroxylysine, isoleucine, leucine, lysine, methionine, phenylalanine, proline, serine, taurine, threonine, tryptophan, tyrosine and valine.

In a further embodiment, the nutritional product can comprise at least one fatty acid or any combination thereof, for example ω-3 fatty acids such α-linolenic acid ("ALA"), docosahexaenoic acid ("DHA") and eicosapentaenoic acid ("EPA"). The fatty acid can be derived from fish oil, krill, poultry, eggs, a plant source, algae and/or a nut source, e.g., flax seed, walnuts, almonds.

The nutritional product can comprise at least one phytonutrient. The phytonutrient can be at least one of flavanoids, allied phenolic compounds, polyphenolic compounds, terpenoids, alkaloids, or sulphur-containing compounds. Phytonutrients are non-nutritive compounds that are found in many foods. Phytonutrients are functional foods that have health benefits beyond basic nutrition, and are health promoting compounds that come from plant sources. Phytonutrient refers to any chemical produced by a plant that imparts one or more health benefit on a user. Non-limiting examples of suitable phytonutrients include:

i) phenolic compounds which include monophenols (such as, for example, apiole, carnosol, carvacrol, dillapiole, rosemarinol); flavonoids (polyphenols) including flavonols (such as, for example, quercetin, fingerol, kaempferol, myricetin, rutin, isorhamnetin), flavanones (such as, for example, fesperidin, naringenin, silybin, eriodictyol), flavones (such as, for example, apigenin, tangeritin, luteolin), flavan-3-ols (such as, for example, catechins, (+)-catechin, (+)-gallocatechin, (−)-epicatechin, (−)-epigallocatechin, (−)-epigallocatechin gallate (EGCG), (−)-epicatechin 3-gallate, theaflavin, theaflavin-3-gallate, theaflavin-3'-gallate, theaflavin-3,3'-digallate, thearubigins), anthocyanins (flavonals) and anthocyanidins (such as, for example, pelargonidin, peonidin, cyanidin, delphinidin, malvidin, petunidin), isoflavones (phytoestrogens) (such as, for example, daidzein (formononetin), genistein (biochanin A), glycitein), dihydroflavonols, chalcones, coumestans (phytoestrogens), and Coumestrol; Phenolic acids (such as: Ellagic acid, Gallic acid, Tannic acid, Vanillin, curcumin); hydroxycinnamic acids (such as, for example, caffeic acid, chlorogenic acid, cinnamic acid, ferulic acid, coumarin); lignans (phytoestrogens), silymarin, secoisolariciresinol, pinoresinol and lariciresinol); tyrosol esters (such as, for example, tyrosol, hydroxytyrosol, oleocanthal, oleuropein); stilbenoids (such as, for example, resveratrol, pterostilbene, piceatannol) and punicalagins.

ii) terpenes (isoprenoids) which include carotenoids (tetraterpenoids) including carotenes (such as, for example, α-carotene, β-carotene, γ-carotene, δ-carotene, lycopene, neurosporene, phytofluene, phytoene), and xanthophylls (such as, for example, canthaxanthin, cryptoxanthin, aeaxanthin, astaxanthin, lutein, rubixanthin); monoterpenes (such as, for example, limonene, perillyl alcohol); saponins; lipids including: phytosterols (such as, for example, campesterol, beta-sitosterol, gamma-sitosterol, stigmasterol), tocopherols (vitamin E), and γ-3, γ-6, and γ-9 fatty acids (such as, for example, gamma-linolenic acid); triterpenoid (such as, for example, oleanolic acid, ursolic acid, betulinic acid, moronic acid).

iii) betalains which include Betacyanins (such as: betanin, isobetanin, probetanin, neobetanin); and betaxanthins (non glycosidic versions) (such as, for example, indicaxanthin, and vulgaxanthin).

iv) organosulfides, which include, for example, dithiolthiones (isothiocyanates) (such as, for example, sulphoraphane); and thiosulphonates (allium compounds) (such as, for example, allyl methyl trisulfide, and diallyl sulfide), indoles, glucosinolates, which include, for example, indole-3-carbinol; sulforaphane; 3,3'-diindolylmethane; sinigrin; allicin; alliin; allyl isothiocyanate; piperine; syn-propanethial-S-oxide.

v) protein inhibitors, which include, for example, protease inhibitors.

vi) other organic acids which include oxalic acid, phytic acid (inositol hexaphosphate); tartaric acid; and anacardic acid.

The nutritional product can comprise at least one antioxidant. Antioxidants are molecules capable of slowing or preventing the oxidation of other molecules. The antioxidant can be any one of astaxanthin, carotenoids, coenzyme Q10 ("CoQ10"), flavonoids, glutathione Goji (wolfberry), hesperidin, lactowolfberry, lignan, lutein, lycopene, polyphenols, selenium, vitamin A, vitamin C, vitamin E, zeaxanthin, or any combinations thereof.

The nutritional product is preferably in an administrable form, for example an orally administrable form. The administrable form can be any one of a pharmaceutical formulation, a nutritional formulation, a dietary supplement, a functional food and a beverage product, or any combinations thereof.

The optional ingredients such as the mineral(s) includes boron, calcium, chromium, copper, iodine, iron, magnesium, manganese, molybdenum, nickel, phosphorus, potassium, selenium, silicon, tin, vanadium, zinc, or any combinations thereof.

The optional ingredients such as vitamin(s) includes vitamin A, Vitamin B1 (thiamine), Vitamin B2 (riboflavin), Vitamin B3 (niacin or niacinamide), Vitamin B5 (pantothenic acid), Vitamin B6 (pyridoxine, pyridoxal, or pyridoxamine, or pyridoxine hydrochloride), Vitamin B7 (biotin), Vitamin B9 (folic acid), and Vitamin B12 (various cobalamins; commonly cyanocobalamin in vitamin supplements), vitamin C, vitamin D, vitamin E, vitamin K, folic acid and biotin) essential in amounts for normal growth and activity of the body, or any combinations thereof.

In a further aspect, the nutritional product is used for preventing and/or alleviating, and/or compensating swallowing dysfunction in a patient in need of such treatment. As used herein, the terms prevent, prevention, alleviate, and compensate, and compensation include prophylactic or preventive treatment (that prevent and/or slow the development of a targeted pathologic condition or disorder) and therapeutic or disease-modifying/compensation treatment, including therapeutic measures that slow down, lessen symptoms of, and/or halt progression of a diagnosed pathologic condition or disorder; and treatment of patients at risk of contracting a disease or suspected to have contracted a disease, as well as patients who are ill or have been diagnosed as suffering from a disease or medical condition. The term does not necessarily imply that a subject is treated until total recovery. The terms prevent, prevention, alleviate, and compensate, and compensation also refer to the maintenance and/or promotion of health in an individual not suffering from a disease but who may be susceptible to the development of an unhealthy condition, such as nitrogen imbalance or muscle loss. The terms prevent, prevention, alleviate, and compensate, and compensation are also intended to include the potentiation or otherwise enhancement of one or more primary prophylactic or therapeutic measure. The terms prevent, prevention, alleviate, and compensate, and compensation are further intended to include the dietary management of a disease or condition or the dietary management for prophylaxis or prevention a disease or condition.

In a further aspect, the nutritional product is used for promoting swallowing safety and/or efficiency of nutritional products in a patient in need of same.

In a further aspect, the nutritional product is used for mitigating the risks of aspiration during swallowing of nutritional products in a patient in need of same.

In a further aspect, a method for making the nutritional product comprises providing a thickener comprising a beta-glucan and a gum such as preferably at least one of gum arabic, carrageenan lambda, carrageenan iota, carrageenan kappa, sodium alginate, konjac, locust bean gum, carboxymethyl cellulose (CMC), chitosan, inulin, pectin, acacia gum, hydroxypropyl methylcellulose tara gum, guar gum, or xanthan, and the amount of the thickener that is diluted provides to the nutritional product a relaxation time, determined by a Capillary Breakup Extensional Rheometry (CaBER) experiment, of more than 10 ms (milliseconds) at a temperature of 20° C.

In a further aspect, a method for improving the cohesiveness of a nutritional product comprises adding to a nutritional product a thickener comprising a beta-glucan and a gum such as preferably at least one of gum arabic, carrageenan lambda, carrageenan iota, carrageenan kappa, sodium alginate, konjac, locust bean gum, carboxymethyl cellulose (CMC), chitosan, inulin, pectin, acacia gum, hydroxypropyl methylcellulose (HPMC), tara gum, guar gum, or xanthan, and the amount of the thickener that is diluted provides to the nutritional product a relaxation time, determined by a Capillary Breakup Extensional Rheometry (CaBER) experiment, of more than 10 ms (milliseconds) at a temperature of 20° C.

Typically a sufficient quantity of the thickener is admixed with a diluent in a suitable mixing vessel. A preferred mixing vessel can comprise a container having a size accommodating the amounts of the thickener and diluent desired to be suitably mixed. The vessel can be a commercially sized tank which may optionally include a cover, a particular shape, baffles, and/or a heat jacket. Other suitable useful mixing vessels include a drinking cup, bowls, household containers which can be opened or closed, a kitchen top mixer system, as well as any suitably sized container which can accommodate the amounts of the diluent and thickener to be suitably admixed.

Generally, the temperature of the diluent is not critical to the preparation of the nutritional product and may include, without limitation: hot, cold, or room temperature diluent. With some particular thickeners, the inherent properties will make the choice of temperature more critical than with others.

As necessary or desired, minor components such as acids, bases, acidulates, chelating agents, flavors, colors, vitamins, minerals, sweeteners, insoluble foods and/or preservatives may be incorporated into the thickener and diluent admixture at any appropriate point during the preparation. Such minor components are preferably present in minor amounts and concentrations, i.e. a non-substantial amount as relates to thickening.

In an exemplary embodiment, depending on the specific admixing equipment used and the appropriate handling of the materials, the time for admixing the nutritional product is from about 2 minutes to about 180 minutes and preferably from about 5 minutes to about 60 minutes, although greater and lesser times may be employed if desired or necessary.

Optionally, as necessary or desired, the nutritional product may be treated to provide shelf stability. Most commonly, but not limiting, the treatment is heat in combination with one or more of the minor components mentioned above.

The packaging of the nutritional product is not critical as long as it delivers a thickness effective for a person afflicted with dysphagia. Illustratively, packaging may be totes, bins, foil pouches, buckets, bags, syringes or the like. If desired, use of a thickener can facilitate in-line mixing and preparation of thickened beverages in a beverage dispenser or container. Such a system can include a metering device and an in-line mixing system to dispense thickened beverages. Preferably the system is designed to dispense thickened or non-thickened beverages at the turn of a switch.

In an aspect, the thickener is effective for liquid foods. For example, an effective amount of the thickener can admixed with a liquid food which illustratively is selected from at least one of milk, human breast milk, cow's milk, soda, coffee, tea, juice (lemon, citrus, orange, apple), alcohol (beer, wine, or mixed drinks with less than about 20% alcohol), nutritional supplements, mixtures thereof and the like or a soup, broth, or food puree and the like. As used herein, the term "juice" includes puree, fruit juices including orange juice, vegetable juice and apple juice strained and unstrained, concentrated and fresh.

Non-limiting examples of suitable vessels to effectively admix the thickener and the liquid food include drinking cups, coffee cups, bowls, household containers which can be open top or closed top, a kitchen blender, a kitchen top mixer system, as well as any suitably sized container which can accommodate the materials to be admixed. Non-limiting examples of suitable instruments to carry out the admixing include forks, spoons, knives, hand mixers, kitchen blenders, kitchen top mixers, whisks, and any other appropriate agitation devices. Particularly suitable mixing containers have a lid or cover that can be attached to the container to allow the liquid food and the thickener to be shaken together with containment.

In an exemplary process, the amount of thickener employed in the admixture is that amount which provides a thickened liquid food which is capable of being consumed by effectively swallowing by a person afflicted with dysphagia.

Another advantage is that the nutritional products disclosed herein are safer to eat and to leave in the presence of persons with impaired mental judgment. Consumption of the nutritional products does not present a choking hazard. Dry powders put in the mouth and/or attempted to be swallowed before dissolving could present a danger to a patient with impaired mental judgment. In many facilities, open containers of powder are left on tables or in rooms or individual sized packets are served on trays. If a caregiver is somehow distracted, an impulsive eater, such as an individual afflicted with Huntington's chorea, could quickly try to consume the dry powder, at serious risk. The nutritional products disclosed herein are reconstituted and/or completely hydrated and thus face no such problems.

The thickener disclosed herein can be delivered to the end user fully, completely, and totally hydrated, and may minimize or avoid settling or separation when shipped. Preferably, the density will not change over time, and the product is stable. Consequently, in such embodiments, the same volume of thickener would thicken a liquid food to the same level of thickness whether the thickener is from the top or the bottom of a container. Liquid foods thickened by a thickener preferably do not continue to thicken after preparation. The thickener can be already hydrated in the nutritional product, and thus any concern over the fluid environment and its impact on hydration time is minimized or eliminated.

A radiological technique known commonly as the modified barium swallow or videofluoroscopic Swallow Study (VFSS) can be used to diagnose and to make therapeutic recommendations on thickened diets to those patients afflicted with dysphagia. Currently, hospitals or nursing homes or mobile diagnostic units prepare the test solutions in their own manner. There is little standardization on the thickness of these solutions. There are no means in place to ensure that the mealtime preparations served to diagnosed patients actually are the same thickness as the test preparations.

The thickener compositions disclosed herein can provide the opportunity to link the thicknesses prepared during the modified barium swallow to what is prepared in food service and/or bedside and/or at home. The thickener compositions disclosed herein can reduce the variability of final thickness in different liquid foods and thus reduce the variability of mixing technique. The elimination of clumping and mixing time factors can reduce the variability between what happens during a modified barium swallow and in food service and/or bedside and/or at home for actual consumption.

Another common diagnostic technique of dysphagia is the fiberoptic endoscopic evaluation of swallow (FEES). In this technique, an endoscope is inserted through the patient's nasal passage into the throat to directly observe the patient's swallow function. In an aspect, the thickener disclosed herein can be used to thicken test preparations used in this evaluation technique.

In some embodiments of the methods disclosed herein, the method comprises identifying a level of severity of the swallowing disorder in the patient; and selecting, based on the level of severity of the swallowing disorder in the patient, the amount of the thickener for diluting, wherein the amount of the thickener is selected from a plurality of predetermined amounts that each corresponds to a different level of swallowing disorder severity. As a non-limiting example, the thickener can be provided in a container attached to a metering pump; one pump of the metering pump can dispense a predetermined amount of the thickener that is suitable for an individual with mild dysphagia, two pumps of the metering pump can dispense a predetermined amount of the thickener that is suitable for an individual with moderate dysphagia, and three pumps of the metering pump can dispense a predetermined amount of the thickener that is suitable for an individual with severe dysphagia.

In another aspect, the present disclosure provides a use of a thickener and a liquid in preparation of an orally administrable nutritional product consisting essentially of the thickener and the liquid, the liquid is suitable for consumption by an individual without dysphagia, the orally administrable nutritional product is suitable for administration to an individual having dysphagia, the thickener comprising a beta-glucan and a gum such as preferably at least one of gum arabic, carrageenan lambda, carrageenan iota, carrageenan kappa, sodium alginate, konjac, locust bean gum, carboxymethyl cellulose (CMC), chitosan, inulin, pectin, acacia gum, hydroxypropyl methylcellulose (HPMC), tara gum, guar gum, or xanthan. The thickener provides to the nutritional product a relaxation time, determined by a Capillary Breakup Extensional Rheometry (CaBER) experiment, of more than 10 ms (milliseconds) at a temperature of 20° C.

In another aspect, the present disclosure provides a system for production of a homogenous single phase beverage for administration to an individual having dysphagia, the system comprising: a container comprising a thickener comprising a beta-glucan and a gum such as preferably at least one of gum arabic, carrageenan lambda, carrageenan iota, carrageenan kappa, sodium alginate, konjac, locust bean gum, carboxymethyl cellulose (CMC), chitosan, inulin, pectin, acacia gum, hydroxypropyl methylcellulose tara gum, guar gum, or xanthan, the thickener formulated for dilution into a nutritional product having a relaxation time, determined by a Capillary Breakup Extensional Rheometry (CaBER) experiment, of more than 10 ms (milliseconds) at a temperature of 20° C.; and a metering device connected to the container and configured to dispense an amount of the thickener that is approximately equal to a predetermined amount. The system can further comprise a static in-line mixer configured to mix the thickener into the nutritional product and/or a nozzle configured to dispense the homogenous single phase beverage.

EXAMPLES

The following non-limiting examples are experimental examples supporting one or more embodiments provided by the present disclosure.

Example 1: Beta-Glucan Samples

FIG. 1 shows examples of beta-glucan samples used in this disclosure.

To prepare the beta-glucan samples used in this disclosure, for example, 10 g OatWell® 28 was mixed in 500 mL water, followed by centrifugation, to obtain a 2% extract. Then, an ethanol extraction was performed to the 2% extract to separate beta-glucan, and further centrifugation was performed to obtain the beta-glucan powder. The beta-glucan powder was reconstituted in water to obtain the beta-glucan samples, e.g., 0.75% or 1% Naturex™ beta-glucan. For example, 0.04 g of the beta-glucan powder was reconstituted in 4 g of water to obtain the 1% Naturex™ beta-glucan. The 2% extract was directly used in the present disclosure as the 2% supernatant. The 2% extract was also diluted by half to be used in the present disclosure as the 1% supernatant. For example, 100 mL of 2% supernatant was combined with 100 mL of water to obtain the 1% supernatant.

As used in the present disclosure, the beta-glucan powder obtained as described above includes about 100% beta-glucan. The powder composition of OatWell® 28 includes about 28% beta-glucan, about 5% fat, about 9% carbohydrate, about 52% fiber, and about 23% protein. Therefore, the concentration of beta-glucan in the 2% supernatant is up to about 0.56%, and the concentration of beta-glucan in the 1% supernatant is up to about 0.28%.

Example 2: Mixtures of Beta-Glucan and Proteins

Figure 2:
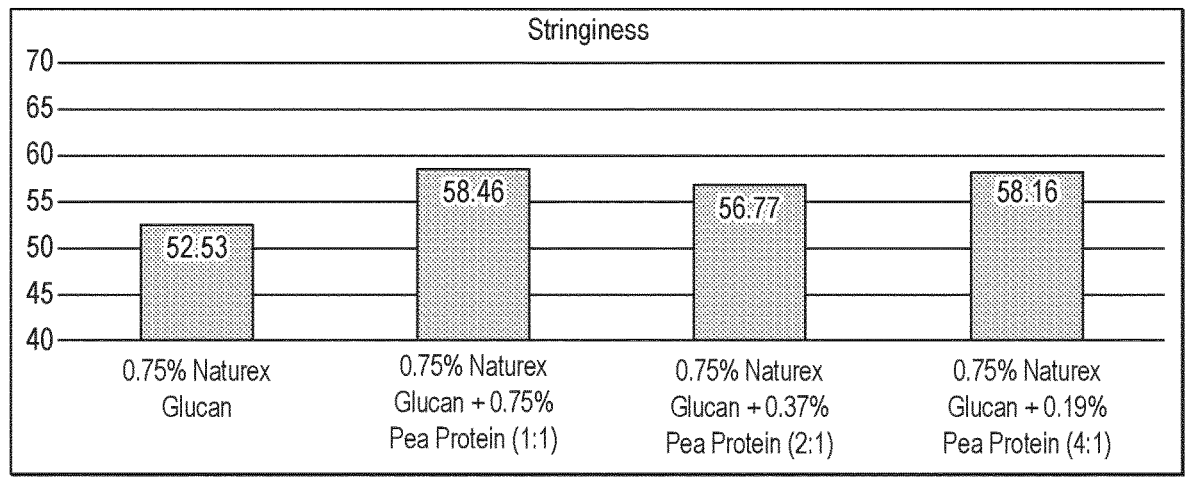
FIG. 2 shows the surface stickiness and stringiness results of the Naturex glucan mixed with different proteins.

FIG. 2 shows the surface stickiness and stringiness results of the Naturex™ beta-glucan mixed with different proteins. The stickiness is measured on a relative scale based on the viscosity. The stringiness is measured on a relative scale based on the relaxation time determined by CaBER as described herein. The stringiness is a proxy measurement of cohesiveness. The results show that rice and lentil proteins increased the stringiness of the oat extracts.

Example 3: Mixtures of Tate & Lyle™ Beta-Glucan and One or Two Different Gums

Figure 3:
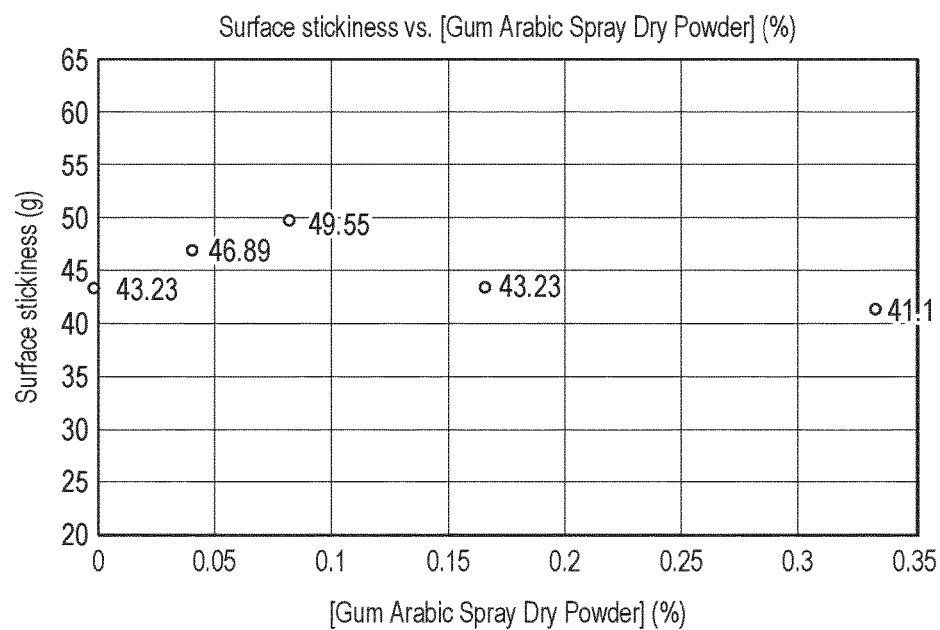
FIG. 3 shows the surface stickiness and stringiness results of Tate & Lyle™ beta-glucan mixed with different gums.
Figure 3:
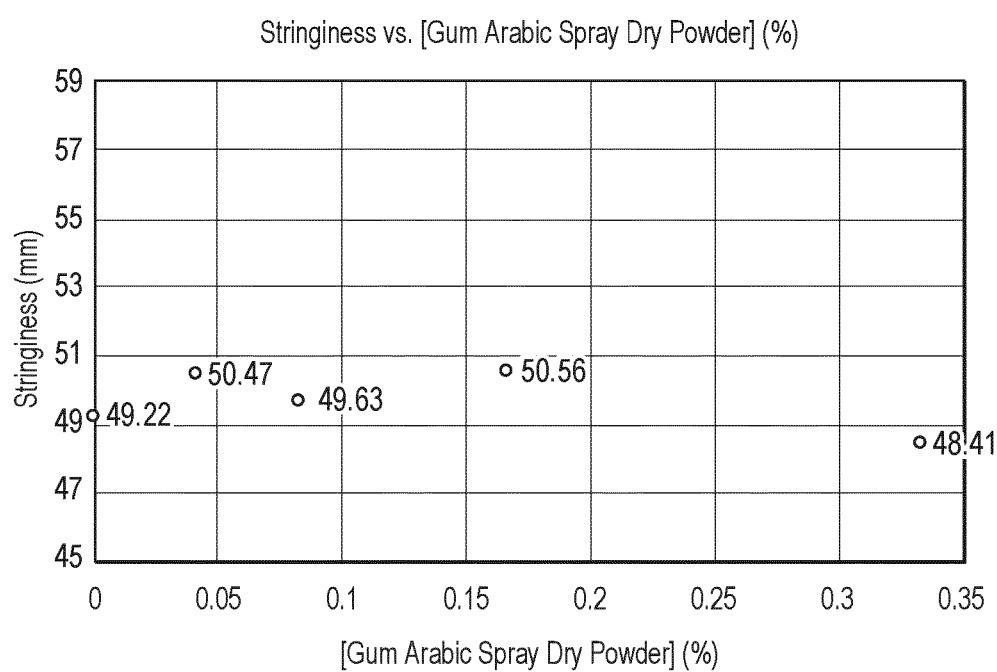
Figure 3:
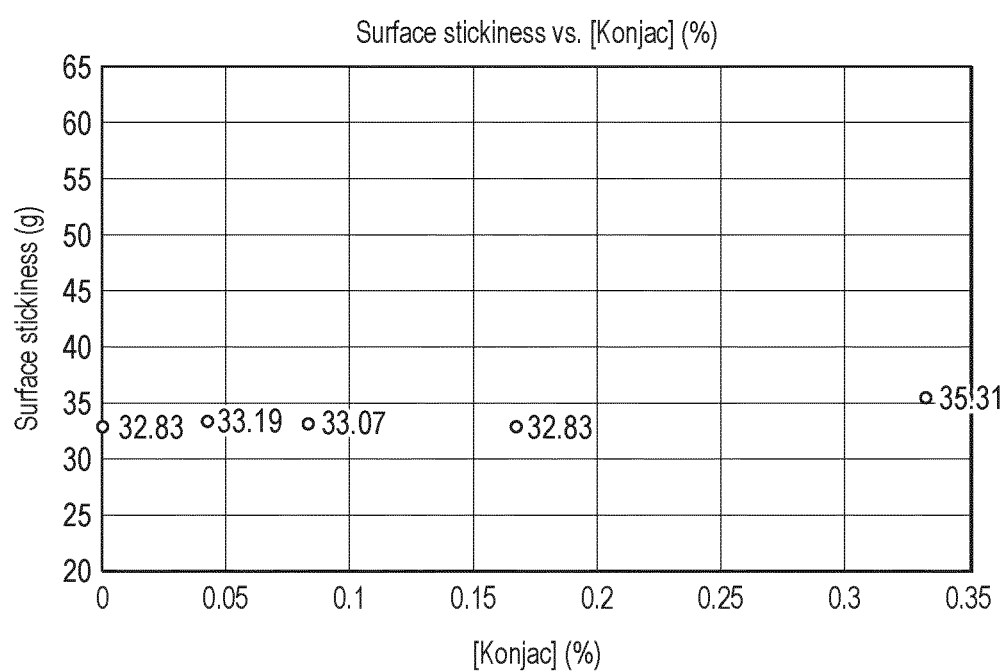
Figure 3:
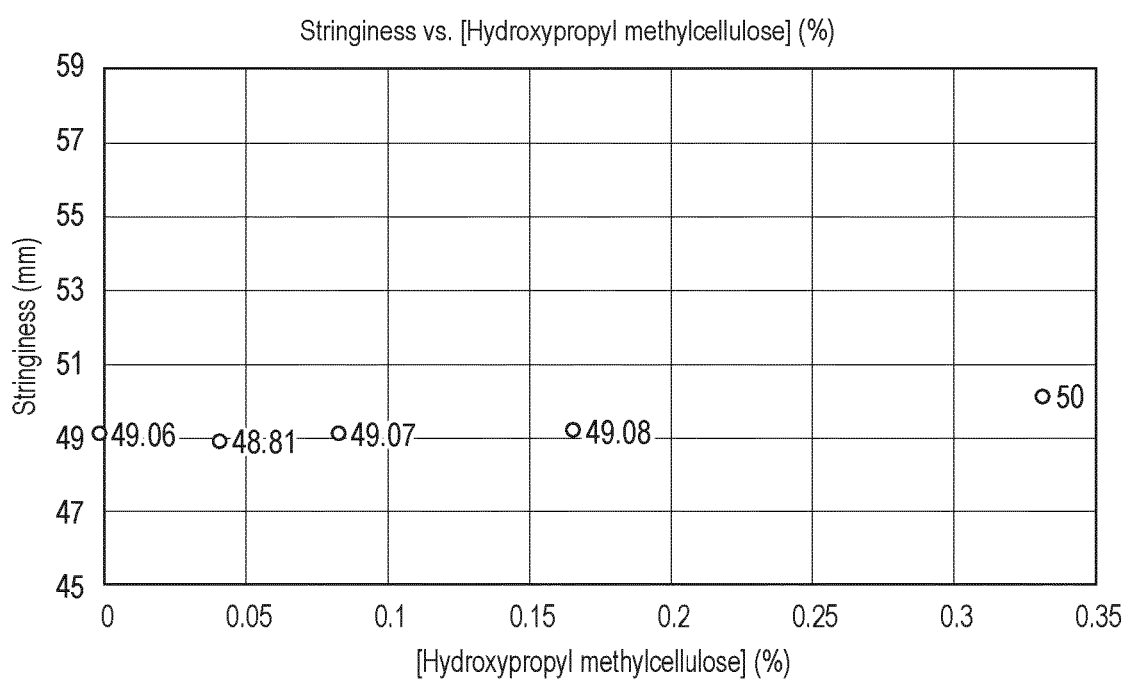

Tate & Lyle™ beta-glucan samples each have a MW from about 900,000 Da to about 1,200,000 Da, lower than that of the Naturex™ beta-glucan. FIG. 3 shows the surface stickiness and stringiness results of Tate & Lyle™ beta-glucan mixed with different gums. The results show that doping Tate & Lyle™ beta-glucan with different gums does not have much obvious effect on the surface stickiness and stringiness.

Example 4: Mixtures of Naturex™ Beta-Glucan and Different Gums

Figure 4:
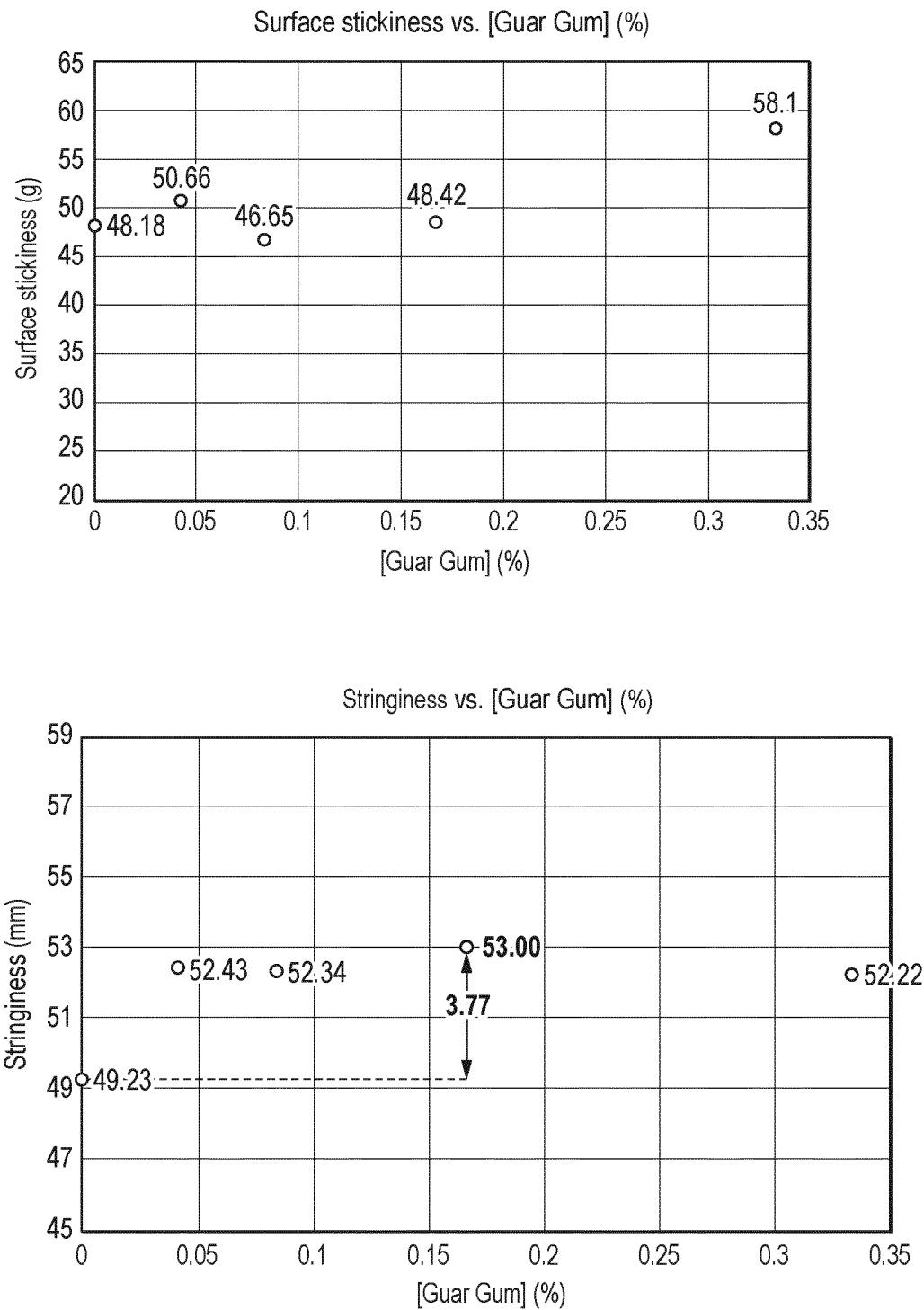
FIG. 4 shows the surface stickiness and stringiness results of Naturex™ beta-glucan mixed with a different gum.
Figure 5:
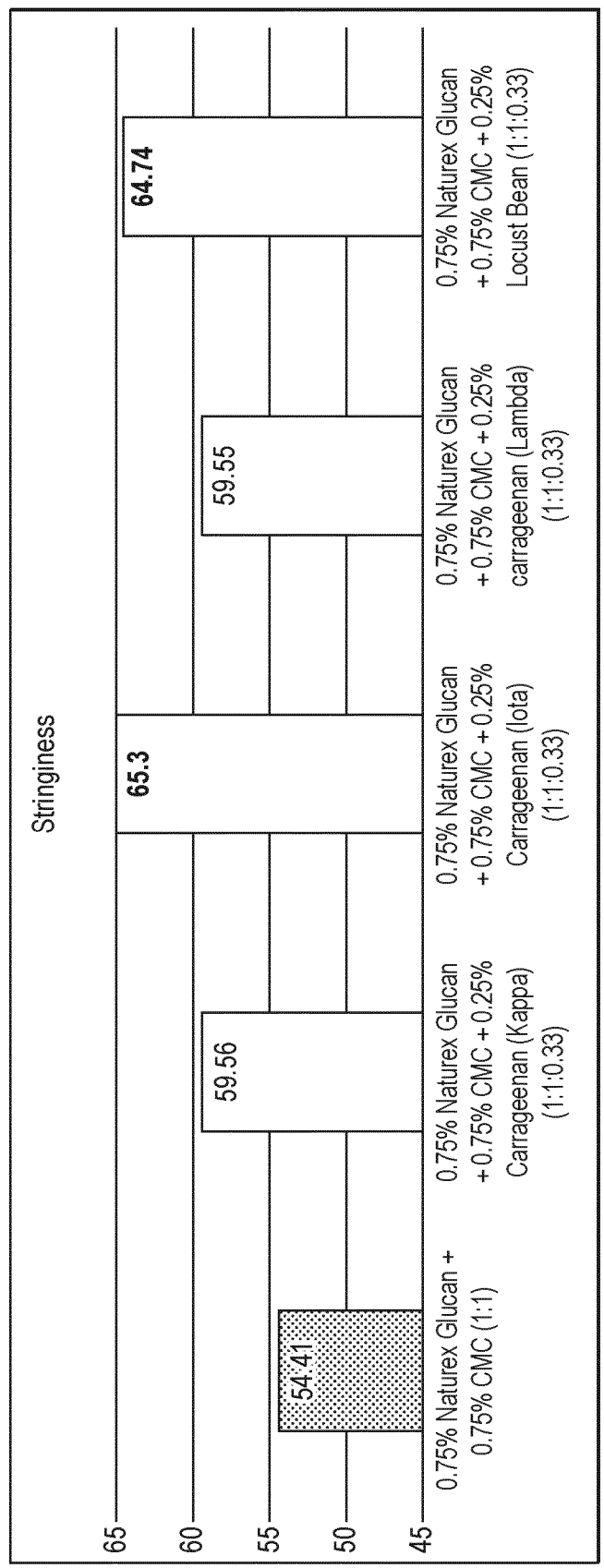
FIG. 5 shows the stringiness results of Naturex™ beta-glucan mixed with two other different gums.
Figure 5:
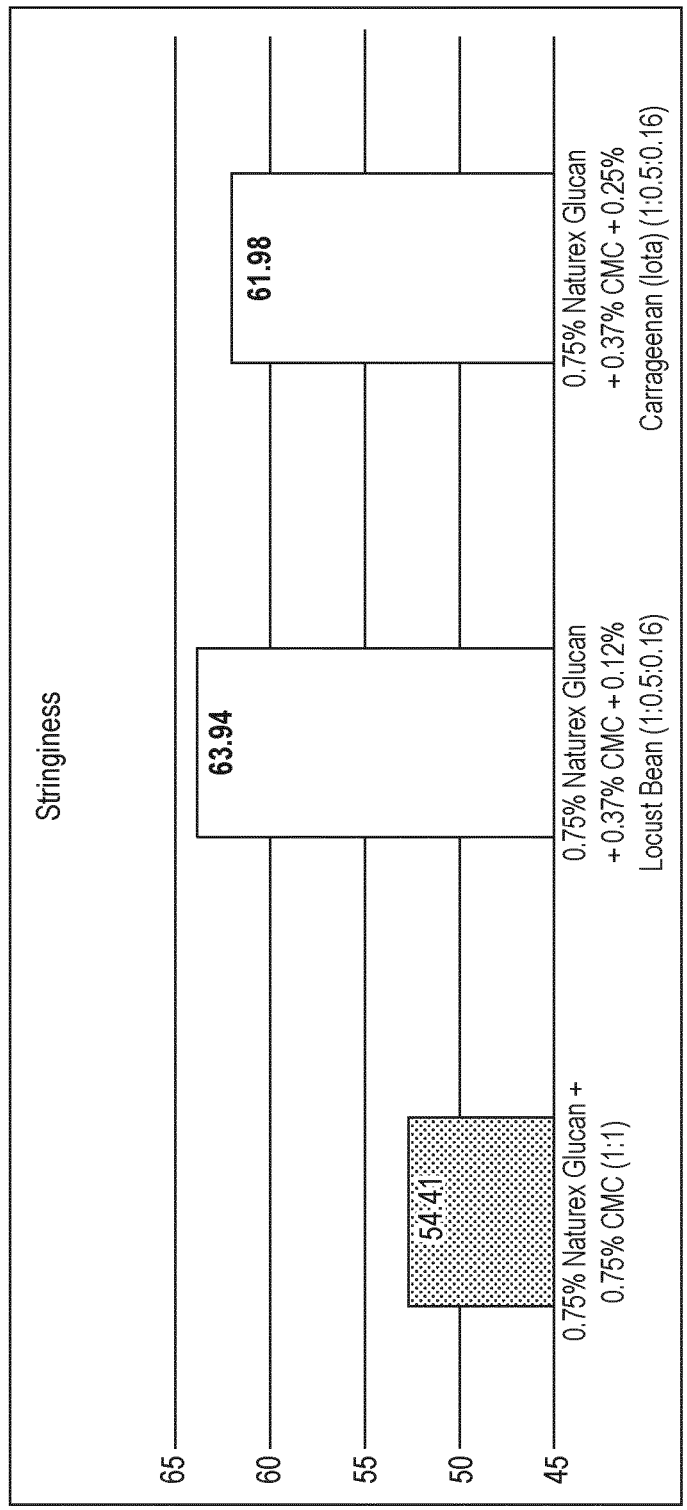

FIG. 4 shows the surface stickiness and stringiness results of Naturex™ beta-glucan mixed with a different gum. FIG. 5 shows the stringiness results of Naturex™ beta-glucan mixed with two other different gums. FIG. 6 shows more stringiness results of Naturex™ beta-glucan mixed with two other different gums in different weight ratios. The samples indicated in red show the highest stringiness among the samples in each table.

FIG. 7 shows the relaxation time results of Naturex™ beta-glucan alone, mixed with CMC, and mixed with CMC and another different gum. The highlighted sample A11, which includes a combination of Naturex™ beta-glucan, CMC, and guar gum in a wright ratio of 2:1:1, shows the best relaxation time, i.e., 1674 ms.

The above results surprisingly show that doping Naturex™ beta-glucan with different gums could have significant effects on the rheology property, e.g., stringiness. A difference between Naturex™ beta-glucan and Tate & Lyle™ beta-glucan is the MW. Naturex™ beta-glucan has a MW from about 1,200,000 Da to about 2,100,000 Da, higher than that of the Tate & Lyle™ beta-glucan samples, which is from about 900,000 Da to about 1,200,000 Da. These results surprisingly show that cohesiveness may be a function of MW of the beta-glucan. The results also show that the weight ratio and total solids content could also have some effect on cohesiveness of mixtures of beta-glucan and at least one additional gum.

Figure 9:
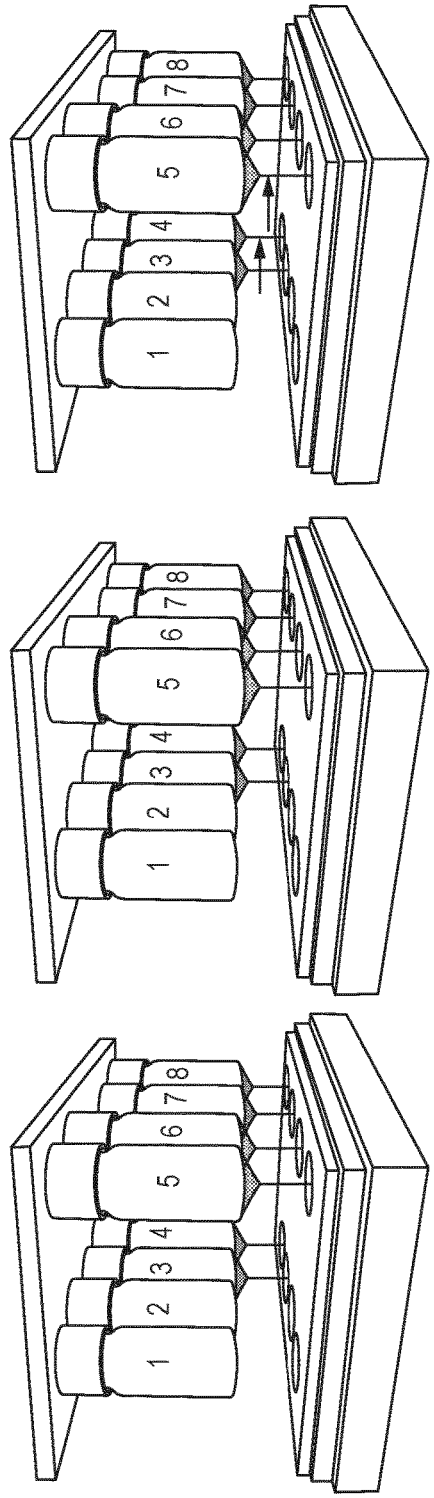
FIG. 9 shows the visual results demonstrating the stringiness of Naturex™ beta-glucan alone, mixed with CMC, and mixed with two different gums using the multi-probe texture analyzer shown in FIG. 8.

FIG. 8 shows the multi-probe texture analyzer used for investigating the rheological behavior of the samples. FIG. 9 shows the visual results demonstrating the stringiness of Naturex™ beta-glucan alone, mixed with CMC, and mixed with two different gums using the multi-probe texture analyzer. The results show that the combination of Naturex™ beta-glucan, CMC, and Guar Gum or Locust Bean with a weight ratio of 3:1:2 and a total solid percentage of 0.75% have the best stringiness. However, the mixture of Naturex™ beta-glucan and CMC alone does not show a significant increase in stringiness. This is unexpected because from the results of Naturex™ beta-glucan, CMC, and Guar Gum or Locust Bean, one may expect that CMC, which does not increase viscosity, would have effects on cohesiveness, but the mixture of Naturex™ beta-glucan and CMC demonstrates that CMC surprisingly has no effect on cohesiveness.

Figure 10:
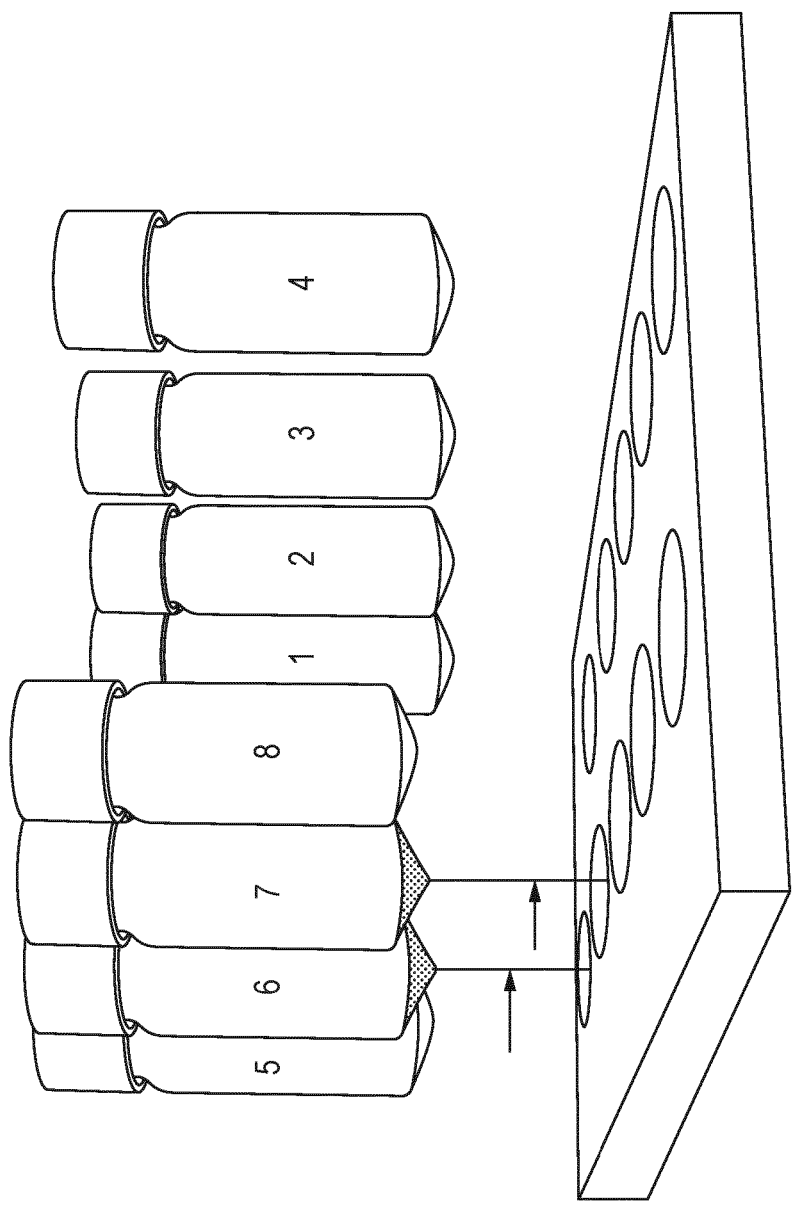
FIG. 10 shows some sample mixtures of Naturex™ beta-glucan and two other gums.
Figure 11:
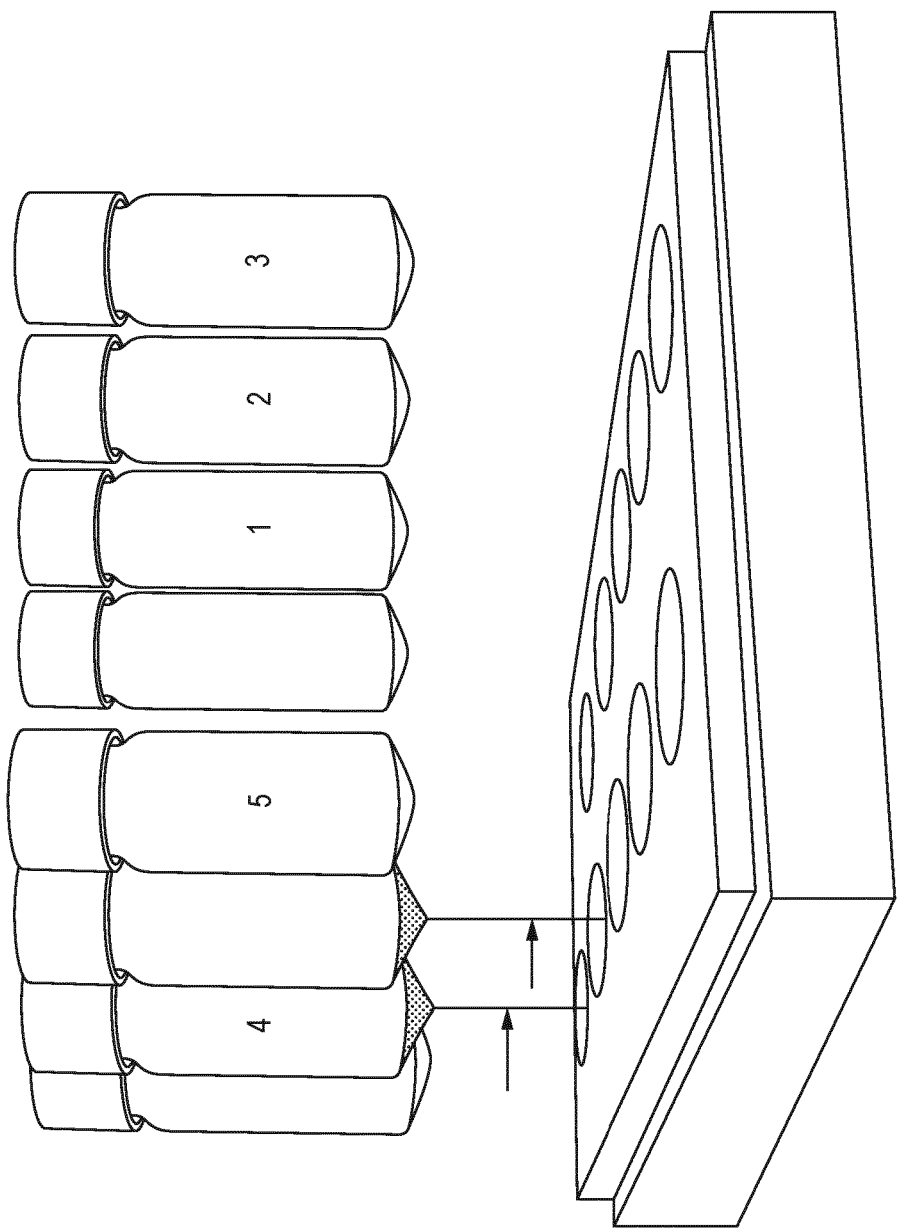
FIG. 11 shows more sample mixtures of Naturex™ beta-glucan and two other gums.

FIGS. 10-11 show more sample mixtures of Naturex™ beta-glucan and two other gums. The results show that the combination of Naturex™ beta-glucan, HPMC, and Carrageenan Iota or Kappa with a weight ratio of about 2:1:1 and a total solids content of 0.75% had the best stringiness among the samples. FIG. 12 shows the combinations in FIG. 10 but with different weight ratios, namely, 3:1:2 and 3:2:1. The results show that the combination of Naturex™ beta-glucan, HPMC, and Carrageenan Iota or Kappa still had the best stringiness among the samples.

FIG. 13 shows sample mixtures of Naturex™ beta-glucan, HPMC, and Carrageenan Iota or Kappa with different weight ratios and different total solids content. The results show that the weight ratio of 3:1:2 showed the highest stringiness, and decreasing the total solids content from 0.75% to 0.5% with lower viscosity showed the same trend, namely, the weight ratio of 3:1:2 showed the highest stringiness.

Figure 14:
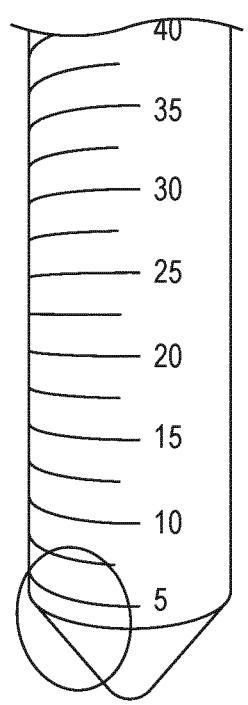
FIG. 14 shows the Naturex™ oat extract, of which the supernatant includes up to 28% beta-glucan.

Example 5: Mixtures of a Naturex™ Oat Extract Supernatant with Two or Three Different Gums FIG. 14 shows the Naturex™ oat extract. FIG. 15 shows the stringiness results of different mixtures of the Naturex™ extract supernatant and two or three different gums. The results show that the mixture of Naturex™ oat extract supernatant (1%) and a combination of HPMC, Guar Gum, and Carrageenan Kappa in a weight ratio of 1:2:3 or 1:6:8, a combination of HPMC, Locust Bean, and Carrageenan Iota in a weight ratio of 1:8:6 or 1:6:8, or a combination of HPMC, Guar Gum, and Locust Bean in a weight ratio of 1:6:8 showed the best stringiness.

Further, the mixture of Naturex™ oat extract supernatant (1%) and a combination of 0.001 g HPMC, 0.006 g Guar Gum, and 0.008 g Carrageenan Kappa showed better stringiness than the mixture of Naturex™ oat extract supernatant (1%) and a combination of 0.001 g 0.007 g Guar Gum, and 0.007 g Carrageenan Kappa. The mixture of Naturex™ oat extract supernatant (1%) and a combination of 0.001 g HPMC, 0.007 g Guar Gum, and 0.007 g Carrageenan Kappa showed better stringiness than the mixture of Naturex™ oat extract supernatant (1%) and a combination of 0.001 g HPMC, 0.008 g Guar Gum, and 0.006 g Carrageenan Kappa.

These three mixtures all showed better stringiness than the mixtures with higher concentrations of HPMC and lower concentrations of Carrageenan Kappa. This is surprising because HPMC increases the stringiness, and it was expected that higher concentrations of HPMC would result in better stringiness. However, the results show the opposite.

Example 6: Viscosity of Naturex™ Beta-Glucan Alone or Mixed with Different Gums

FIG. 16 shows the viscosity results of Naturex™ beta-glucan alone or mixed with different gums in reference to Nestle ThickenUp Clear™, which has nectar-like consistency. FIG. 17 shows the viscosity results of the mixture of Naturex™ oat extract supernatant (1%) and a combination of HPMC, Locust Bean, and Carrageenan Iota in a weight ratio of 1:8:6. The results show that the mixture of Naturex™ oat extract supernatant (1%) and a combination of HPMC, Locust Bean, and Carrageenan Iota in a weight ratio of 1:8:6 (sample D21) has a consistency close to Nectar like and at a shear rate of 50 s$^{-1}$ at 20° C.

Figure 18:
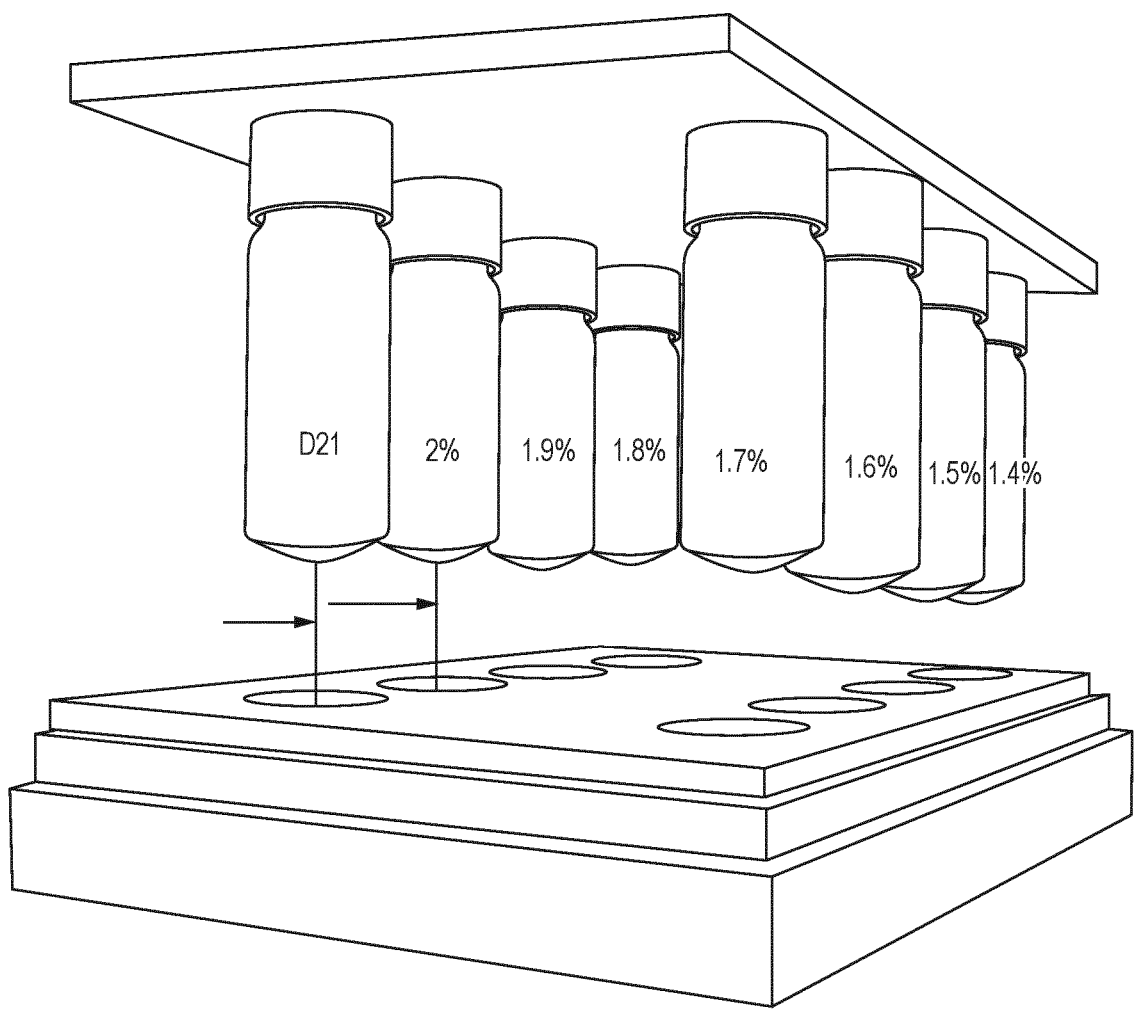
FIG. 18 illustrates the texture of sample D21 compared to other mixtures with different amounts of Naturex™ oat extract supernatant.

FIG. 18 illustrates the stringiness of sample D21 compared to other mixtures with different amounts of Naturex™ oat extract supernatant. The results show that this sample has almost the same stringiness as the 2% Naturex™ oat extract.

It should be understood that the stringiness is an indication of the cohesiveness, which is directly related to the relaxation time determined by a Capillary Breakup Extensional Rheometry (CaBER) experiment.

Figure 19:
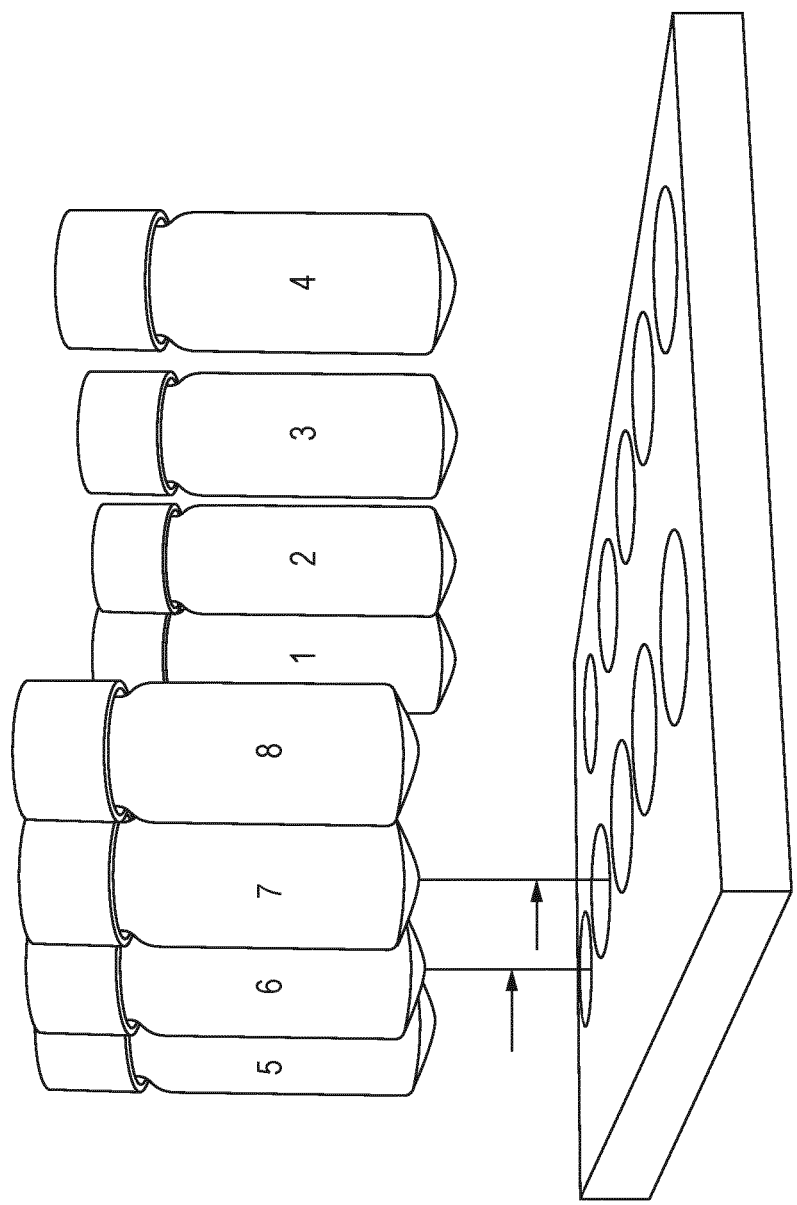
FIG. 19 shows the stringiness results of different mixtures of a Naturex™ extract supernatant and two different gums.

Example 7: Rheological Behaviors of Mixtures of β-Glucan with Two Different Gums FIG. 19 shows the stringiness results of different mixtures of a Naturex™ extract supernatant and two different gums. The stringiness is measured on a relative scale based on the relaxation time determined by CaBER as described herein. It should be understood that stringiness is an indication of cohesiveness, which is directly related to the relaxation time determined by a Capillary Breakup Extensional Rheometry (CaBER) experiment.

The results show that the mixture of the Naturex™ oat extract supernatant (0.75%) and a combination of HPMC and Carrageenan Kappa in a weight ratio of 2:1:1 showed the best cohesiveness. Further, HPMC is more effective than CMC.

It should be understood that the stringiness is an indication of the cohesiveness, which is directly related to the relaxation time determined by a Capillary Breakup Extensional Rheometry (CaBER) experiment.

Example 8-1: Rheological Behaviors of Mixtures of β-Glucan with Three Different Gums FIG. 20 shows the stringiness results of different mixtures of a Naturex™ extract supernatant and three different gums. FIG. 21 shows the CaBER results of some of the samples in FIG. 20. The results show that some mixtures have better cohesiveness than some others. For example, the following samples showed good stringiness and thus cohesiveness:

Naturex™ oat extract supernatant (1%) and a combination of 0.001 g HPMC, 0.006 g Guar Gum, and 0.008 g Carrageenan Iota (E1);

Naturex™ oat extract supernatant (1%) and a combination of 0.001 g HPMC, 0.006 g Guar Gum, and 0.008 g Carrageenan Lambda (E2);

Naturex™ oat extract supernatant (1%) and a combination of 0.001 g HPMC, 0.006 g Guar Gum, and 0.008 g Konjac (E6);

Naturex™ oat extract supernatant (1%) and a combination of 0.001 g HPMC, 0.006 g Guar Gum, and 0.008 g Locust Bean (E7);

Naturex™ oat extract supernatant (1%) and a combination of 0.001 g HPMC, 0.008 g Locust Bean, and 0.006 g Carrageenan Iota or Naturex™ oat extract supernatant (1%) and a combination of 0.001 g HPMC, 0.006 g Locust Bean, and 0.008 g Carrageenan Iota (D21);

Naturex™ oat extract supernatant (1%) and a combination of 0.001 g HPMC, 0.006 g Locust Bean, and 0.008 g Carrageenan Kappa (E15); and Naturex™ oat extract supernatant (1%) and a combination of 0.001 g HPMC, 0.006 g Locust Bean, and 0.008 g Tara Gum or Naturex™ oat extract supernatant (1%) and a combination of 0.001 g HPMC, 0.008 g Locust Bean, and 0.006 g Tara Gum (E19).

As shown in FIG. 21, the CaBER analysis of the samples showed that the sample D21 has a relaxation time of about 25.05 ms, as compared to the 1% oat extract, which has a relaxation time of about 7.229 ms. The sample D21 includes 1% oat extract and 0.375% other salts and has a total solid of 1.38%.

Among the samples tested in this example, the mixture of Naturex™ oat extract supernatant (1%) and a combination of HPMC, Locust Bean, and Carrageenan Iota has the best stringiness and thus the highest cohesiveness.

Example 8-2: Rheological Behaviors of Mixtures of β-Glucan with Three Different Gums More mixtures of β-Glucan with three different gums were tested in this example, as shown in FIG. 22. The results show that the following samples showed good stringiness and thus cohesiveness:

Naturex™ oat extract supernatant (1%) and a combination of 0.001 g HPMC, 0.008 g Tara Gum, and 0.006 g Carrageenan Kappa (G2);

Naturex™ oat extract supernatant (1%) and a combination of 0.001 g HPMC, 0.008 g Tara Gum, and 0.006 g Konjac (G7);

Naturex™ oat extract supernatant (1%) and a combination of 0.001 g HPMC, 0.008 g Carrageenan Iota, and 0.006 g Konjac (G20);

Naturex™ oat extract supernatant (1%) and a combination of 0.001 g HPMC, 0.008 g Carrageenan Iota, and 0.006 g Locus Bean (G26);

Naturex™ oat extract supernatant (1%) and a combination of 0.001 g HPMC, 0.008 g Konjac, and 0.006 g Carrageenan Kappa (G28);

Naturex™ oat extract supernatant (1%) and a combination of 0.001 g HPMC, 0.008 g Konjac, and 0.006 g Sodium Alginate (G33); and Naturex™ oat extract supernatant (1%) and a combination of 0.001 g HPMC, 0.008 g Konjac, and 0.006 g Locus Bean (G38).

Among these samples, Naturex™ oat extract supernatant (1%) and a combination of 0.001 g HPMC, 0.008 g Konjac, and 0.006 g Sodium Alginate (G33) showed the best stringiness and thus cohesiveness.

The combinations of gums in samples D21, G33, G7, G28, and G38 were further investigated, as shown in FIG. 23. With each combination, the following compositions were found to have the best stringiness:

Naturex™ oat extract supernatant (1%) and a combination of 0.001 g HPMC, 0.01 g Locust Bean, and 0.004 g Carrageenan Iota (D211);

Naturex™ oat extract supernatant (1%) and a combination of 0.001 g HPMC, 0.01 g Konjac, and 0.004 g Sodium Alginate (G331);

Naturex™ oat extract supernatant (1%) and a combination of 0.001 g HPMC, 0.007 g Tara Gum, and 0.007 g Konjac (G7);

Naturex™ oat extract supernatant (1%) and a combination of 0.001 g HPMC, 0.01 g Konjac, and 0.004 g Carrageenan Kappa (G281); and Naturex™ oat extract supernatant (1%) and a combination of 0.001 g HPMC, 0.007 g Konjac, and 0.007 g Locus Bean (G383).

Among these samples, Naturex™ oat extract supernatant (1%) and a combination of 0.001 g HPMC, 0.01 g Konjac, and 0.004 g Sodium Alginate (G331) showed the best stringiness. Naturex™ oat extract supernatant (1%) and a combination of 0.001 g HPMC, 0.01 g Konjac, and 0.004 g Carrageenan Kappa (G281) and Naturex™ oat extract supernatant (1%) and a combination of 0.001 g HPMC, 0.007 g Konjac, and 0.007 g Locus Bean (G383) ranked the second in terms of the stringiness.

FIG. 24 compared different compositions of the G33 combination of Naturex™ oat extract supernatant (1%), HPMC, Konjac, and Sodium Alginate. The results showed that among the different compositions, the composition of Naturex™ oat extract supernatant (1%)+0.001 g HPMC+0.01 g Konjac+0.004 g Sodium Alginate (G331) has better stringiness than Naturex™ oat extract supernatant (1%)+0.001 g HPMC+0.012 g Konjac+0.002 g Sodium Alginate (G338), which has better stringiness than Naturex™ oat extract supernatant (1%)+0.001 g HPMC+0.011 g Konjac+0.003 g Sodium Alginate (G337), which has better stringiness than Naturex™ oat extract supernatant (1%)+0.001 g HPMC+0.013 g Konjac+0.001 g Sodium Alginate (G337).

FIG. 25 further compared different compositions of the G33 combination of Naturex™ oat extract supernatant (1%), HPMC, Konjac, and Sodium Alginate. The results showed that the composition of Naturex™ oat extract supernatant (1%)+0.001 g HPMC+0.01 g Konjac+0.004 g Sodium Alginate (G331) has better stringiness than Naturex™ oat extract supernatant (1%)+0.0067 g HPMC+0.0067 g Konjac+0.0027 g Sodium Alginate (G3313), which has better stringiness than Naturex™ oat extract supernatant (1%)+0.0005 g HPMC+0.005 g Konjac+0.002 g Sodium Alginate (G3314). Among these samples, G331 has the highest total solid of 1.4%, which is higher than that of G3313 of 1.3%, which is higher than that of G3314 of 1.2%. Moreover, G3313 has better stringiness than 2% and 1.8% oat extract and also has lower viscosity compared to G331.

The results also showed that Naturex™ oat extract supernatant (1%)+0.001 g HPMC+0.01 g Konjac+0.004 g Sodium Alginate (G331) has even higher stringiness/cohesiveness than Naturex™ oat extract supernatant (1%) and a combination of 0.001 g HPMC, 0.008 g Locust Bean, and 0.006 g Carrageenan Iota or Naturex™ oat extract supernatant (1%) and a combination of 0.001 g HPMC, 0.006 g Locust Bean, and 0.008 g Carrageenan Iota (D21) in the above Example 8-1.

FIG. 26 shows the results of the CaBER analysis of some of the above samples in comparison to the references samples. The results showed that the sample G331, namely, the mixture of Naturex™ oat extract supernatant (1%)+0.001 g HPMC+0.01 g Konjac+0.004 g Sodium Alginate, has a relaxation time of about 181 ms.

Figure 27:
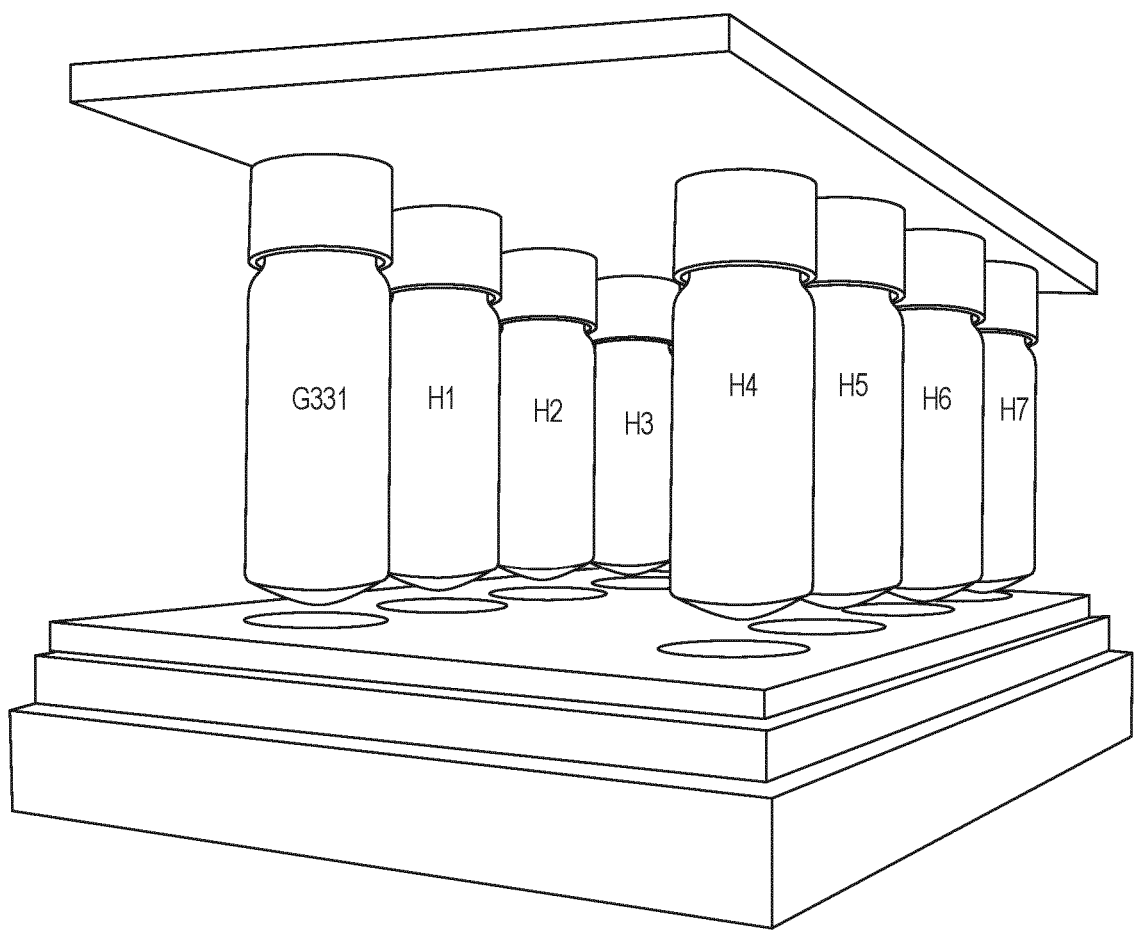
FIG. 27 shows the stringiness results of mixtures of β-Glucan with four different gums, in comparison with the G331 mixture of Naturex™ oat extract supernatant (1%), HPMC, Konjac, and Sodium Alginate.
Figure 27:
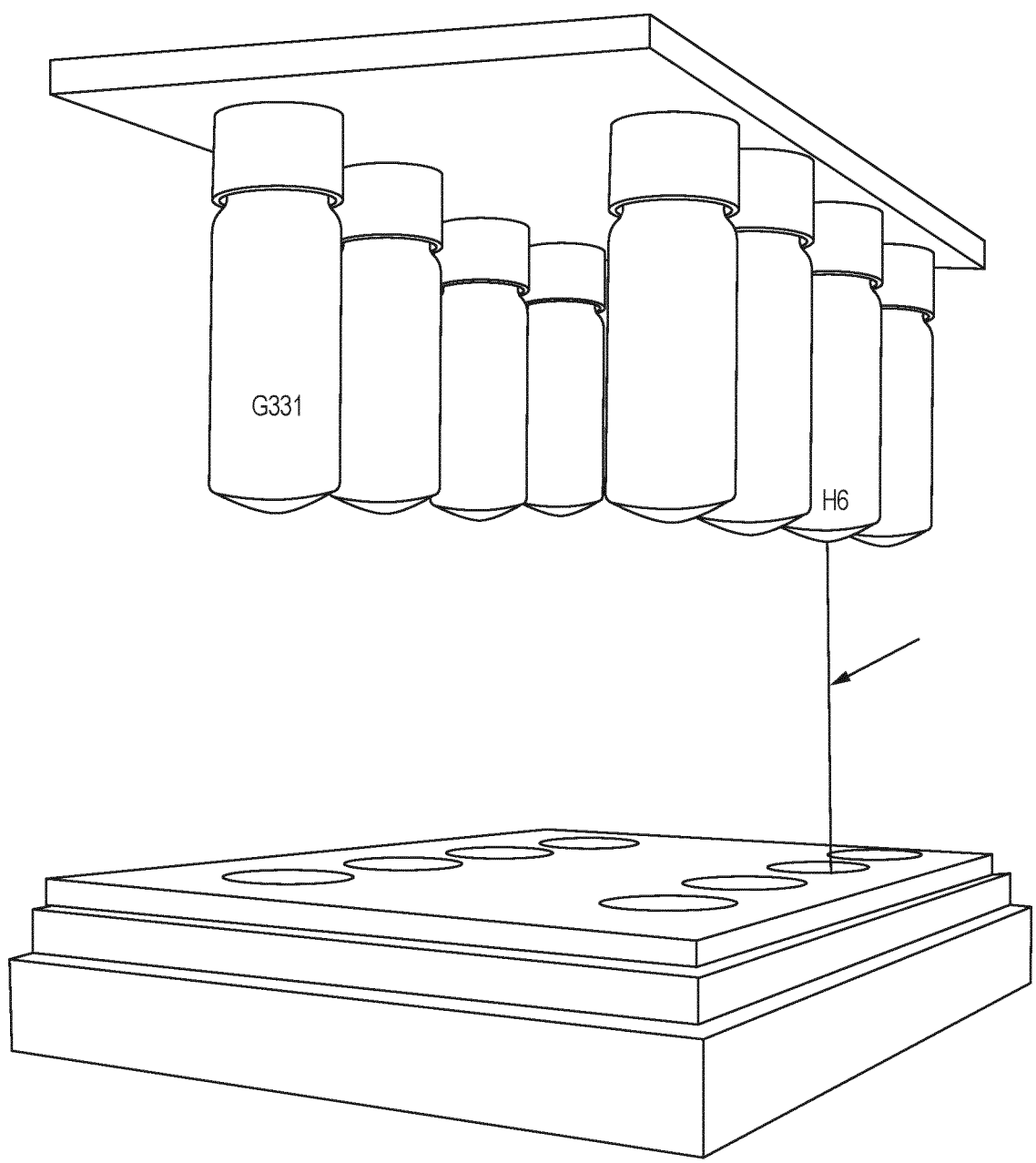

Example 9: Rheological Behaviors of Mixtures of β-Glucan with Four Different Gums Mixtures of β-Glucan with four different gums were tested, in comparison with the best mixture of β-Glucan with three different gums (G331) from the above examples, as shown in FIG. 27. The results show that Naturex™ oat extract supernatant (1%)+0.001 g HPMC+0.01 g Konjac+0.002 g Sodium Alginate+0.002 g Carrageenan Kappa (H6) has better stringiness than Naturex™ oat extract supernatant (1%)+0.001 g HPMC+0.01 g Konjac+0.003 g Sodium Alginate+0.001 g Carrageenan Kappa (H5), which has better stringiness than Naturex™ oat extract supernatant (1%)+0.001 g HPMC+0.01 g Konjac+0.004 g Sodium Alginate (G331), which has better stringiness than Naturex™ oat extract supernatant (1%)+0.001 g HPMC+0.009 g Konjac+0.002 g Sodium Alginate+0.003 g Carrageenan Kappa (H3).

Further, the stringiness of Naturex™ oat extract supernatant (1%)+0.001 g HPMC+0.01 g Konjac+0.003 g Sodium Alginate+0.001 g Locus Bean (H8) is comparable to Naturex™ oat extract supernatant (1%)+0.001 g HPMC+0.01 g Konjac+0.003 g Sodium Alginate+0.001 g Carrageenan Kappa (H5).

These results showed that among the tested mixtures of Naturex™ oat extract with four different gums, Naturex™ oat extract supernatant (1%)+0.001 g HPMC+0.01 g Konjac+0.002 g Sodium Alginate+0.002 g Carrageenan Kappa (H6) has the best stringiness and thus the highest cohesiveness.

FIG. 28 shows the results of the CaBER analysis of some of the above samples in comparison to the references samples. The results showed that the sample H6, namely, the mixture of Naturex™ oat extract supernatant (1%)+0.001 g HPMC+0.01 g Konjac+0.002 g Sodium Alginate+0.002 g Carrageenan Kappa, has a relaxation time of about 205 ms and a viscosity of about 483 mPas at $50^{-1}$ seconds read at 30 seconds.

Figure 29:
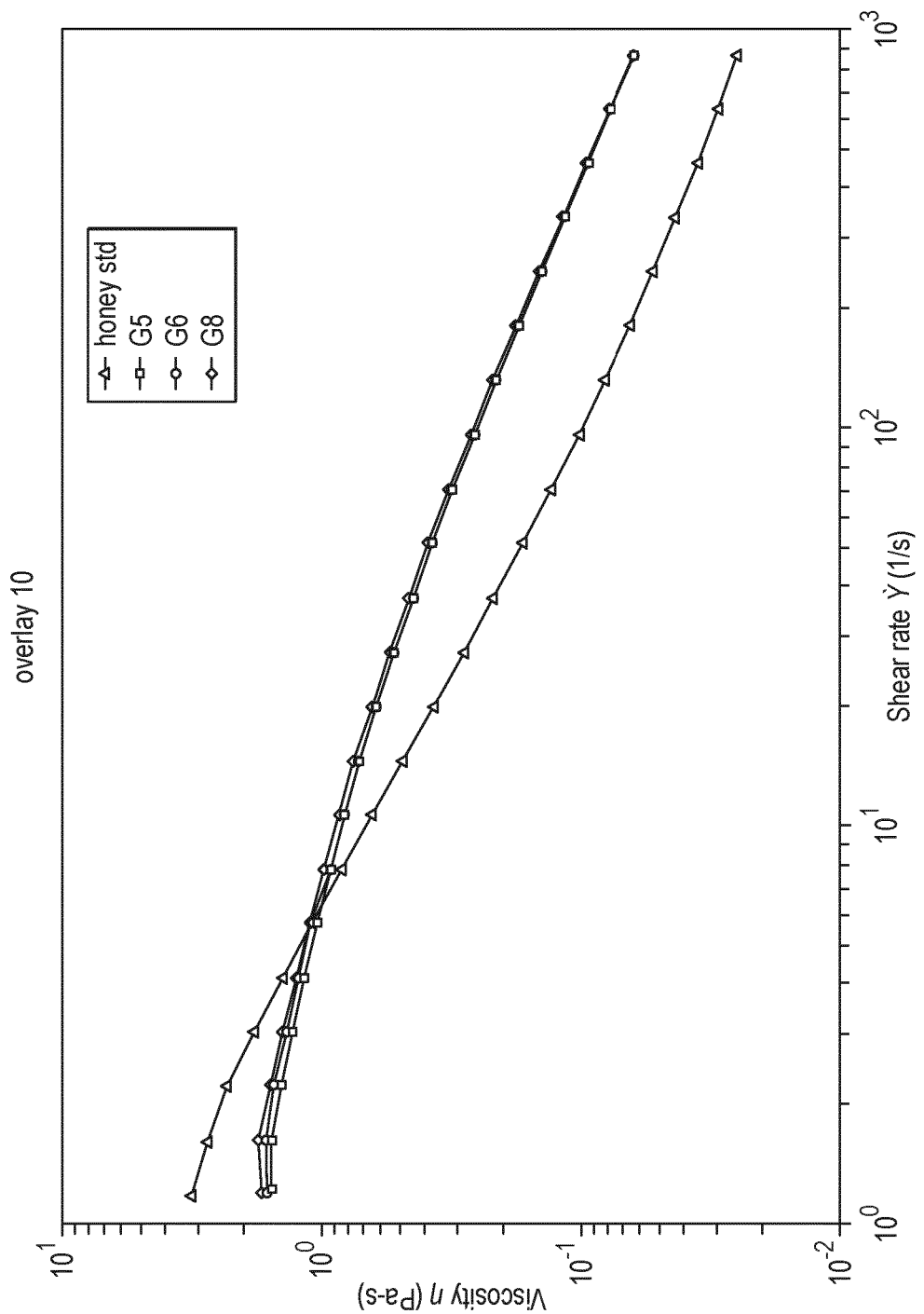
FIG. 29 shows the viscosity results of 3 combinations (G5, G6 and G8 in FIG. 22), compared to the baseline TUC honey level.

FIG. 29 shows the viscosity results of 3 combinations G5, G6 and G8 in FIG. 22, compared to the baseline TUC honey level. At 50/s (standard measurement conditions), the sample viscosities are similar to each other, and have only slightly more viscosity than the TUC base, in spite of the increased cohesiveness (TUC has no cohesiveness at all).

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A thickener comprising a beta-glucan and an additive, wherein the thickener is formulated for providing a nutritional product a relaxation time, determined by a Capillary Breakup Extensional Rheometry (CaBER) experiment, of more than 10 ms (milliseconds) at a temperature of 20° C., wherein the additive comprises a combination selected from the group consisting of
   (1a) CMC in combination with guar gum, or locust bean gum;
   (1b) locust bean gum in combination with guar gum;
   (1c) Tara gum in combination with guar gum;
   (1d(i)) HPMC in combination with carrageenan iota or carrageenan kappa;
   (1d(ii)) HPMC in combination with guar gum, and at least one of carrageenan iota, carrageenan kappa, carrageenan lambda, konjac, or locust bean gum;
   (1d(iii)) HPMC in combination with locust bean gum, and at least one of carrageenan iota, carrageenan kappa, or tara gum;
   (1d(iv)) HPMC in combination with tara gum, and at least one of carrageenan kappa, konjac, or locust bean gum;
   (1d(v)) HPMC in combination with carrageenan iota, and at least one of konjac or locust bean gum; and
   (1d(vi)) HPMC in combination with konjac, and at least one of carrageenan kappa, sodium alginate, or locust bean gum.

2. The thickener of claim 1, wherein the additive comprises a gum.

3. The thickener of claim 1, wherein a weight ratio of the beta-glucan and the additive is from about 1:1 to about 1:10.

4. The thickener of claim 1, wherein the additive comprises a combination of HPMC, konjac, and at least one of carrageenan kappa, sodium alginate, or locust bean gum.

5. The thickener of claim 1, wherein the beta-glucan has a molecular weight (MW) above about 1,200,000 Da.

6. A nutritional product comprising a diluent and further comprising a beta-glucan and an additive, the nutritional product having a relaxation time, determined by a Capillary Breakup Extensional Rheometry (CaBER) experiment, of more than 10 ms (milliseconds) at a temperature of 20° C., wherein the additive comprises at least two gums selected from the group of gum arabic, carrageenan lambda, carrageenan iota, carrageenan kappa, sodium alginate, konjac, locust bean gum, carboxymethyl cellulose (CMC), chitosan, pectin, acacia gum, hydroxypropyl methylcellulose (HPMC), tara gum, guar gum, and xanthan.

7. The nutritional product of claim 6, wherein a weight ratio of the beta-glucan and the additive is from about 1:1 to about 1:10.

8. The nutritional product of claim 6, wherein the additive comprises at least one of a protein or a carbohydrate.

9. The nutritional product of claim 6, wherein the additive comprises a combination of HPMC and at least one of iota carrageenan or kappa carageenan.

10. The nutritional product of claim 6, wherein the additive comprises a combination of HPMC, guar gum, and at least one of carrageenan kappa, carrageenan lambda, konjac, or locust bean gum.

11. The nutritional product of claim 6, wherein the additive comprises a combination of HPMC, guar gum, and locust bean gum.

12. The nutritional product of claim 6, wherein the additive comprises a combination of HPMC, carrageenan kappa, and at least one of konjac or locust bean gum.

13. The nutritional product of claim 6, wherein the additive comprises a combination of HPMC, konjac, sodium alginate, and at least one of carrageenan kappa or locus bean gum.

14. The nutritional product of claim 6, wherein the nutritional product is in an administrable form selected from the group consisting of a pharmaceutical formulation, a nutritional formulation, a dietary supplement, a functional food and beverage product, and a ready-to-drink (RTD) beverage.

15. The nutritional product of claim 6, wherein the relaxation time of the nutritional product is more than about 100 ms, determined by a Capillary Breakup Extensional Rheometry (CaBER) experiment, at a temperature of 20° C.

16. A method of preventing, alleviating, and/or compensating swallowing dysfunction in a patient in need thereof, the method comprising: providing a nutritional product comprising a thickener comprising a beta-glucan and an additive, an amount of the thickener providing to the nutritional product a relaxation time, determined by a Capillary Breakup Extensional Rheometry (CaBER) experiment, of more than 10 ms (milliseconds), wherein the additive comprises at least two gums selected from the group of gum arabic, carrageenan lambda, carrageenan iota, carrageenan kappa, sodium alginate, konjac, locust bean gum, carboxymethyl cellulose (CMC), chitosan, pectin, acacia gum, hydroxypropyl methylcellulose (HPMC), tara gum, guar gum, and xanthan; and
orally administering the nutritional product to the patient.

17. The method of claim 16, comprising:
identifying a level of severity of the swallowing disorder in the patient; and
selecting, based on the level of severity of the swallowing disorder in the patient, the amount of the thickener for diluting into the nutritional product, wherein the amount of the thickener is selected from a plurality of predetermined amounts that each corresponds to a different level of swallowing disorder severity.

18. The method of claim 16, wherein the thickener is diluted from a unit dosage form of the thickener that is an amount effective for administration of the nutritional product to an individual who suffers from dysphagia to achieve at least one of (i) supplemental nutrition, (ii) hydration or (iii) replacement of one or more full meals.

19. The thickener of claim 1, wherein the additive comprises a combination selected from the group consisting of
(1) a combination of CMC and guar gum, wherein a weight ratio of the beta-glucan, the CMC, and the guar gum is from about 5:2:3 to about 2:1:1;
(2) a combination of CMC and locust bean gum, wherein a weight ratio of the beta-glucan, the CMC, and the locust bean gum is from about 10:3:7 to about 2:1:1;
(3) a combination of locust bean gum and guar gum, wherein a weight ratio of the beta-glucan, the locust bean gum, and the guar gum is about 5:2:3;
(4) a combination of tara gum and guar gum, wherein a weight ratio of the beta-glucan, the tara gum, and the guar gum is about 5:3:2;
(5) a combination of HPMC and at least one of carrageenan iota or carrageenan kappa, wherein a weight ratio of the beta-glucan, the HPMC, and the at least one of iota carrageenan or kappa carrageenan is from about 3:1:2 to about 3:2:1;
(6) a combination of HPMC and carrageenan kappa, wherein a weight ratio of the beta-glucan, the HPMC, and the carrageenan kappa is from about 3:1:2 to about 3:2:1;
(7) a combination of HPMC, guar gum, and at least one of carrageenan kappa, carrageenan lambda, konjac, or locust bean gum, wherein a weight ratio of the HPMC, the guar gum, and the at least one of kappa carrageenan, lambda carrageenan, konjac, or locust bean gum is from about 1:2:3 to about 1:6:8;
(8) a combination of HPMC, guar gum, and locust bean gum, wherein a weight ratio of the HPMC, the guar gum, and the locust bean gum is about 1:6:8;
(9) a combination of HPMC, locust bean gum, and at least one of carrageenan iota, carrageenan kappa, or tara gum, wherein a weight ratio of the HPMC, the locust bean gum, and the at least one of carrageenan iota, carrageenan kappa, or tara gum is from about 1:6:8 to about 1:8:6;
(10) a combination of HPMC, locust bean gum, and carrageenan iota, wherein a weight ratio of the HPMC, the locust bean gum, and the carrageenan iota is about 1:4:10 to about 1:10:4;
(11) a combination of HPMC, tara gum, and at least one of carrageenan kappa, konjac, or locust bean gum, wherein a weight ratio of the HPMC, the tara gum, and the at least one of carrageenan kappa, konjac, or locust bean gum is about 1:8:6;
(12) a combination of HPMC, tara gum, and konjac, wherein a weight ratio of the HPMC, the tara gum, and the konjac is from about 1:4:10 to about 1:10:4;
(13) a combination of HPMC, carrageenan iota, and at least one of konjac or locust bean gum, wherein a weight ratio of the carrageenan kappa, and the at least one of konjac or locust bean gum is about 1:8:6;
(14) a combination of HPMC, konjac, and at least one of carrageenan kappa, sodium alginate, or locust bean gum, wherein a weight ratio of the HPMC, the konjac, and the at least one of carrageenan kappa, sodium alginate, or locust bean gum is about 1:8:6;
(15) a combination of HPMC, konjac, and sodium alginate, wherein a weight ratio of the HPMC, the konjac, and the sodium alginate is from about 1:4:10 to about 1:13:1;
(16) a combination of HPMC, konjac, and carrageenan kappa, wherein a weight ratio of the wherein a weight ratio of the HPMC, the konjac, and the carrageenan kappa is from about 1:4:10 to about 1:10:4;
(17) a combination of HPMC, konjac, and locust bean gum, wherein a weight ratio of the HPMC, the konjac, and the locust bean gum is from about 1:4:10 to about 1:10:4; and
(18) a combination of HPMC, konjac, sodium alginate, and at least one of carrageenan kappa or locus bean gum, wherein a weight ratio of the HPMC, the konjac, the sodium alginate, and the at least one of carrageenan kappa or locus bean gum is from about 1:10:2:2 to about 1:10:3:1.

\* \* \* \* \*